United States Patent [19]

McCann et al.

[11] Patent Number: 4,777,651
[45] Date of Patent: Oct. 11, 1988

[54] METHOD OF PIXEL TO VECTOR CONVERSION IN AN AUTOMATIC PICTURE CODING SYSTEM

[75] Inventors: Benjamin E. McCann, Arlington, Mass.; Michael L. Rieger, Portland, Oreg.

[73] Assignee: Tektronix, Inc., Beaverton, Oreg.

[21] Appl. No.: 624,434

[22] Filed: Jun. 25, 1984

[51] Int. Cl.$^4$ .............................................. G06K 9/48
[52] U.S. Cl. .................................... 382/21; 382/56
[58] Field of Search .................. 382/21, 22, 25, 55, 382/56

[56] References Cited

U.S. PATENT DOCUMENTS

| | | | |
|---|---|---|---|
| 4,020,463 | 4/1977 | Himmel | 382/21 |
| 4,103,287 | 7/1978 | Frank | 382/22 |
| 4,493,105 | 1/1985 | Beall et al. | 382/21 |
| 4,566,128 | 1/1986 | Araki | 382/56 |
| 4,630,306 | 12/1986 | West et al. | 382/21 |

Primary Examiner—Leo H. Boudreau
Attorney, Agent, or Firm—John P. Dellett; Robert S. Hulse

[57] ABSTRACT

An automatic picture coding system including a method for converting a bit-map image of the picture to vectors as the picture is being scanned. The bit map is delayed as it is being generated to form a series of tessellations or windows of data. The windows are propagated through a series of neighborhood-logic elements which perform data transformation operations such as growing, smoothing and thinning of the bit-map image. A bit stream output from the neighborhood logic which output includes only line and edge features of the original picture is transferred serially to a microcomputer where the features are partitioned into a plurality of line segments. Each line segment is chain coded and temporarily stored, as it is acquired, in a corresponding one of a plurality of lists, the lists being linked in an order corresponding with the order in which the segments are acquired. When the storage of each chain-coded segment is completed, the segment is converted to vectors and transmitted to a user device for display, storage, or further processing, the lists in which the converted segments were stored being unlinked and deallocated. The process is continued until the entire document has been scanned and converted to vectorial data.

18 Claims, 27 Drawing Sheets

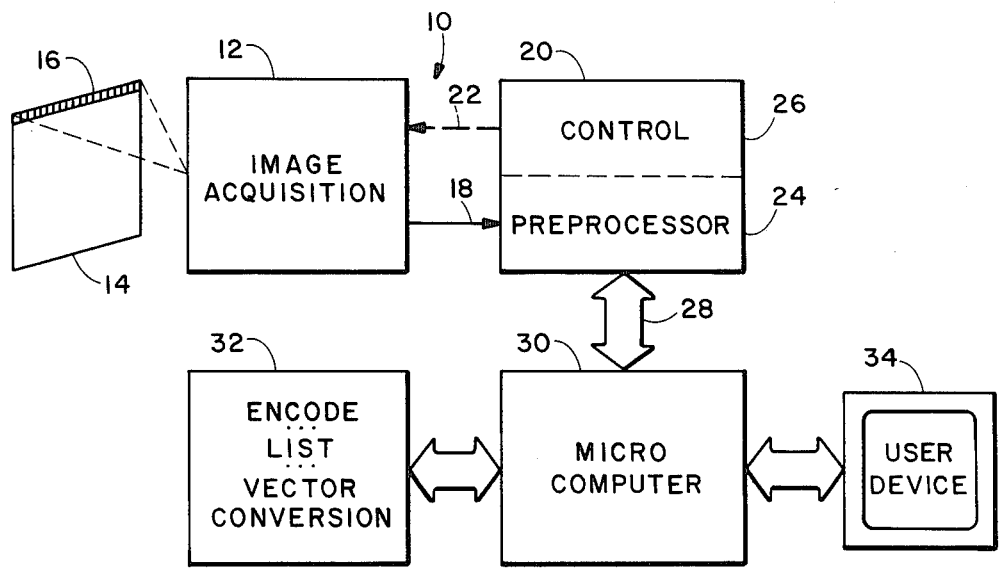
FIG. 1
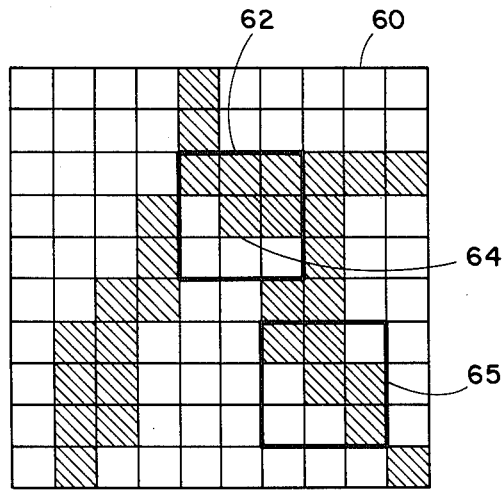
FIG. 3
FIG. 4

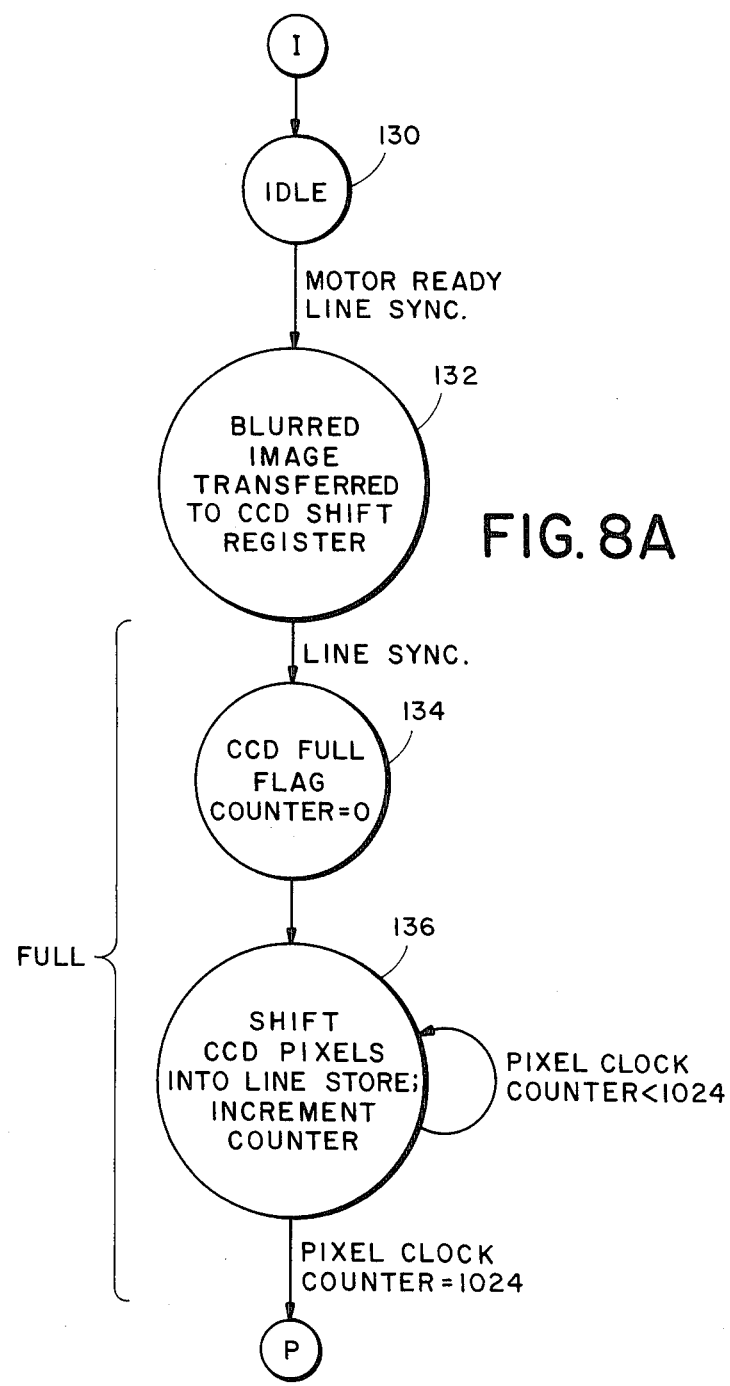

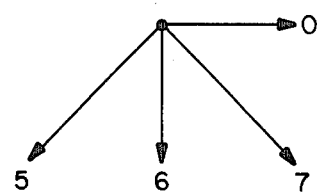
FIG. 10
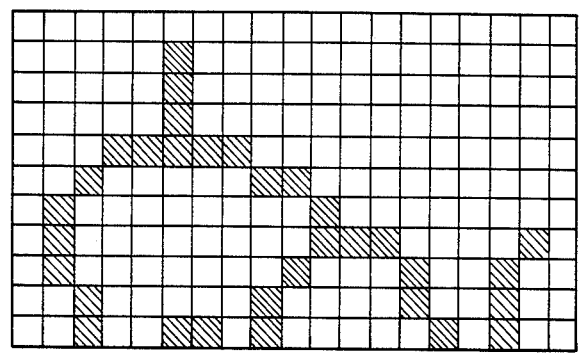
FIG. 12
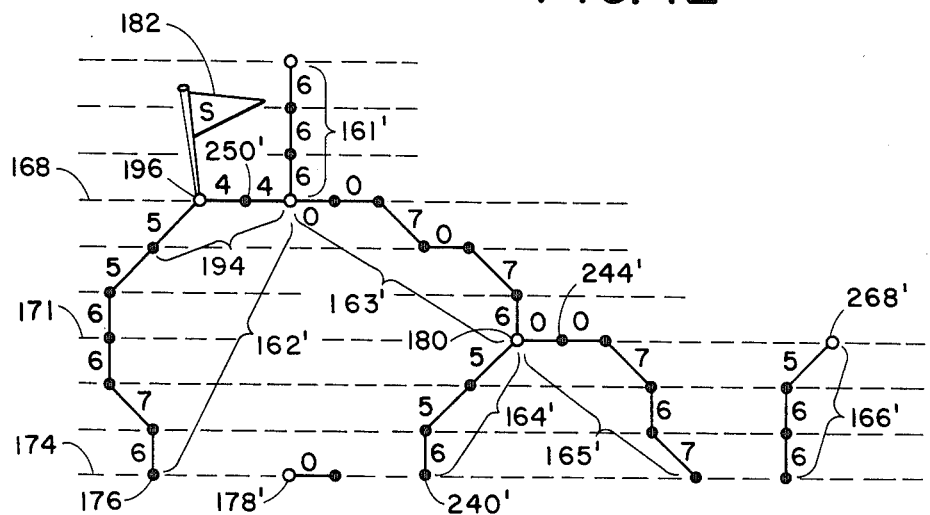
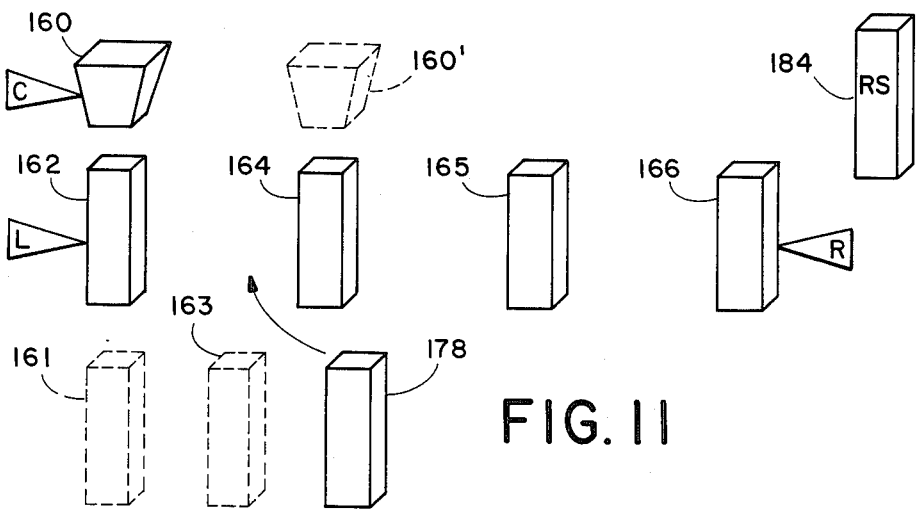
FIG. 11

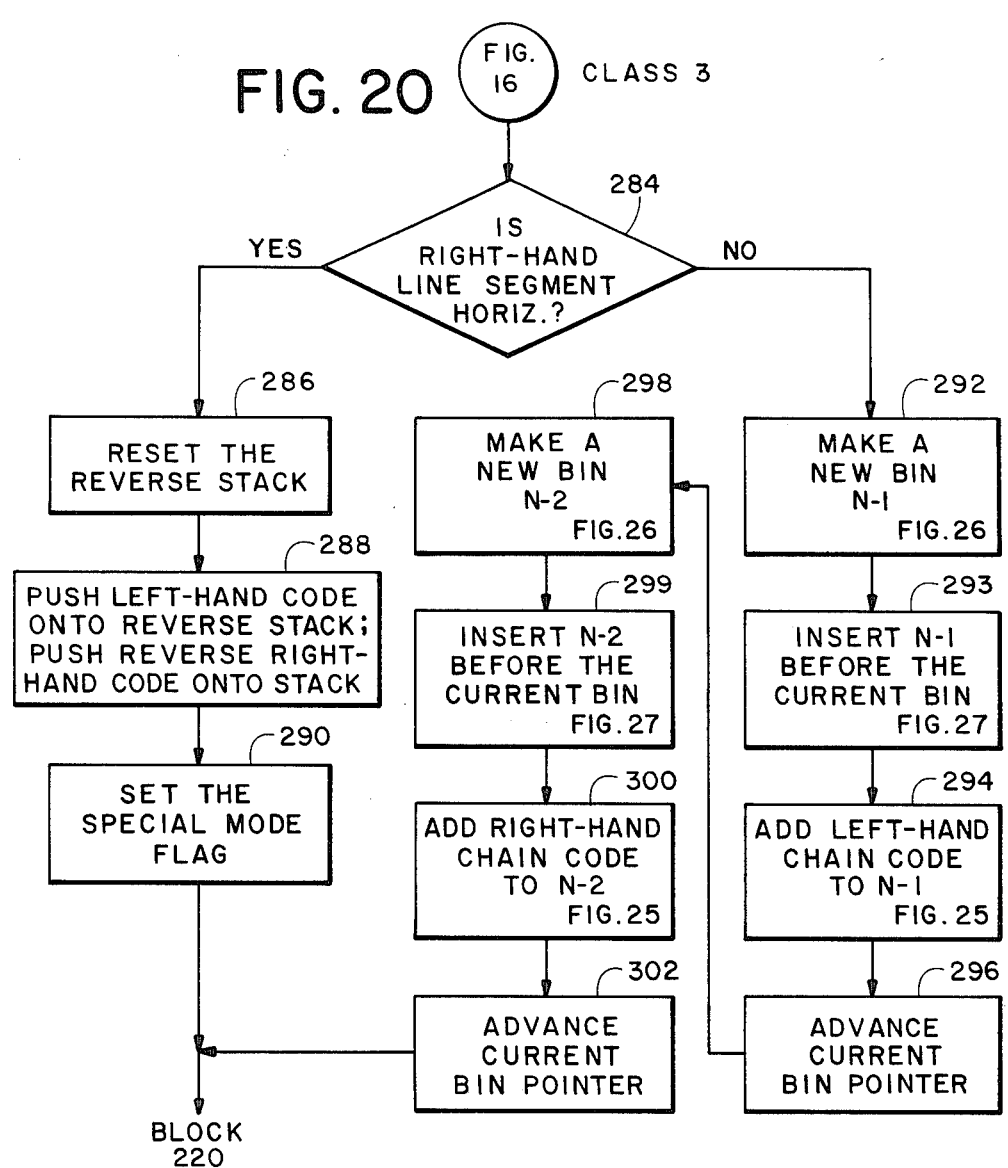

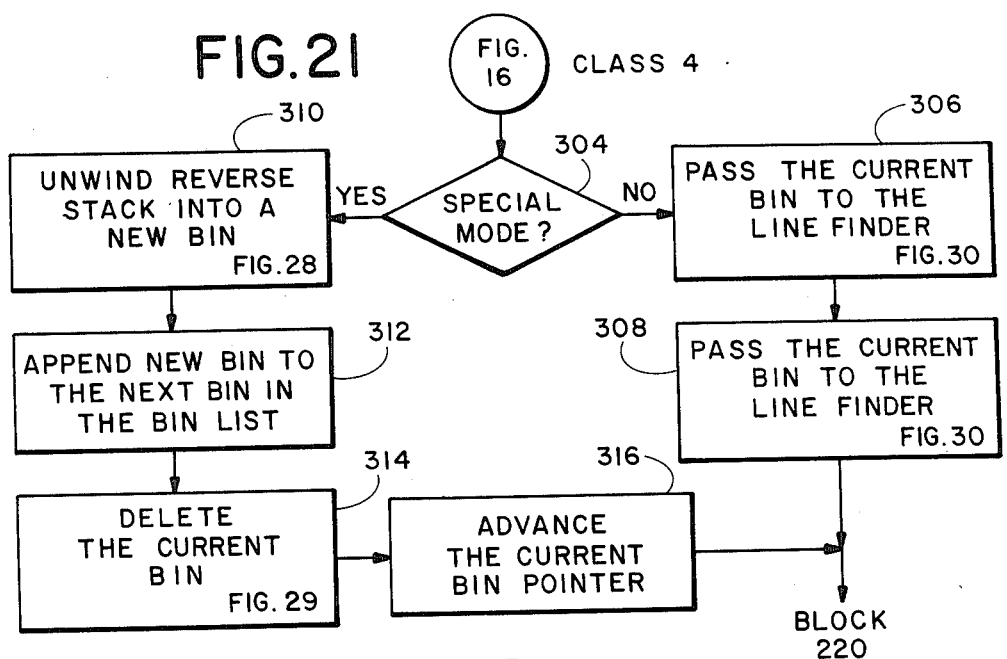
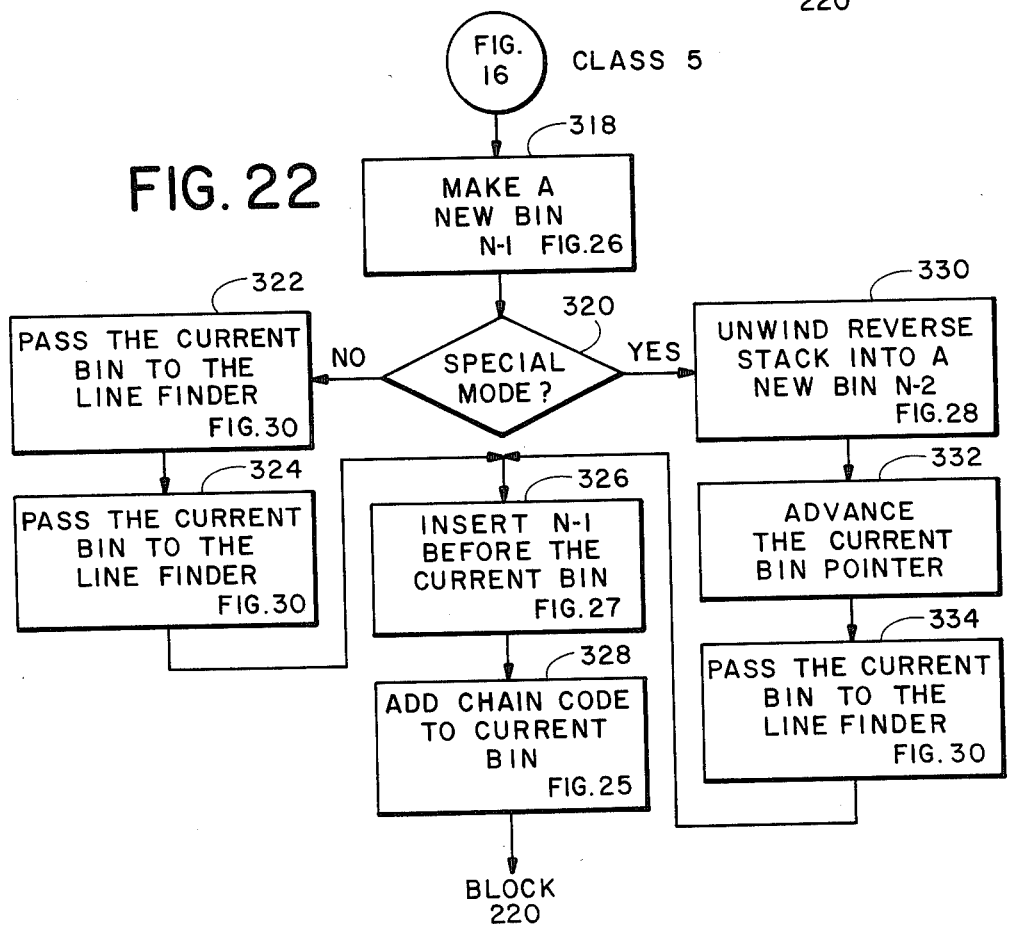

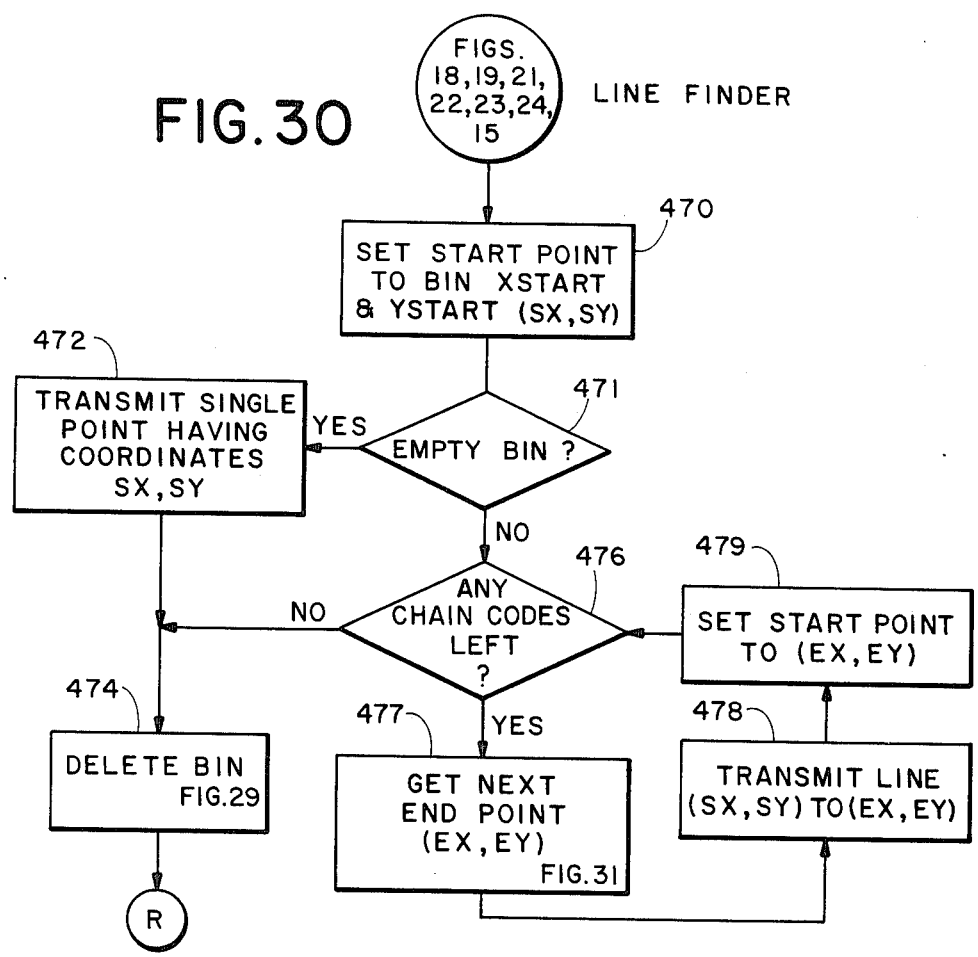
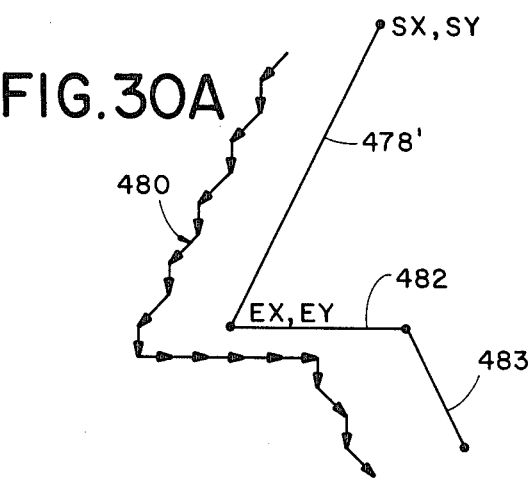

METHOD OF PIXEL TO VECTOR CONVERSION IN AN AUTOMATIC PICTURE CODING SYSTEM

BACKGROUND OF THE INVENTION

This invention relates to the computer processing of pictures. More particularly, the invention relates to a method and associated apparatus for the processing and compaction of raster-scanned data, in real time, as a document is being scanned.

Computer-aided design and drafting is practiced extensively in the engineering and graphic arts; however, there exists an extensive archive of documents generated manually or otherwise in pictorial form, i.e., more suitable for human interpretation than interpretation by machine. The demand for conversion of such archives to machine script will grow as the transition to computer-based graphics progresses and becomes more complete.

Techniques for automatically converting drawings and other pictures to machine script for processing, storage or display are well known. One of the most efficient and compact machine-script data sets representative of a picture comprises vectors including data items representing spatial location of the vectors with respect to the original picture. Generally, techniques for converting a picture into such vectorial data fall into two categories, viz.: line following and raster-to-vector conversion. Line-following schemes, while generating vectorial data directly, require large and expensive assemblies that are best suited for high production environments. Line following is said to be advantageous because the original picture is used as the image memory, instead of a bit-map copy of the picture in the computer memory. A "bit-map" is a signal set in machine script representing a tessellation of small picture elements or pixels of the original document. Generally, line-following imaging systems having devices that can be directed randomly in two dimensions to detect and follow picture features are either expensive, or slow. An example of the former comprises a device utilizing a scanning laser beam which is directed by moving mirrors, and having acoustooptical devices for detecting features of the picture. An example of the latter is an electromechanical device such as a plotter having a light sensor instead of a pen. In some implementations, an operator manually guides a carriage along a line to be acquired; a photosensor detects when the carriage is directly over a line and enables the system to store X and Y coordinates of the carriage. By moving the carriage on an irregular path over the line, the intersections of the path and the line are stored as end points of a string of vectors. A totally automatic line following system must first scan the entire picture to locate lines and features, and maintain a data-storage bookeeping system to preclude duplicate storage of data. Otherwise, an operator must locate lines and direct the process, line by line.

In raster-to-vector conversion systems, the original picture or its microfilm is scanned, e.g., optically, and the information thereon resolved into a bit map. The optical characteristics of each pixel are used to control detection circuits that generate positionally defined signals of the bit map. An advantage of raster-to-vector conversion systems is that raster-scan imaging devices are inexpensive and prevalent; however, this kind of system has commonly required storage of the entire image as a bit map in a data store accessible by a computer, the computer then executing a program for converting the bit map to a vectorial data set.

The storage of a bit-map copy of a picture requires a large data store. For example, a bit stream acquired from raster scanning an E-size drawing with a resolution of 0.1 millimeter comprises approximately 100 million bits of data. A "bit stream" means a sequence of electrical signals or pulses comprising a set of binary digits representing data in coded form wherein the significance of each bit is determined by its position in the sequence and its relation to other bits. Various data reduction algorithims based on information and coding theory have been utilized to achieve significant reduction in the storage requirement for scanned data. Unfortunately, however, the form of representation of data as coded messages generally lacks information necessary for reconstituting regular line drawings.

In view of the forgoing, it is an object of this invention to provide an improved method of encoding pictures.

Another object of the present invention is to provide improved means for raster-to-vector conversion in an automatic picture coding system.

It is another object of the present invention to provide an improved automatic picture coding system having reduced storage requirements.

It is another object of the invention to provide an improved automatic picture coding system including a method of converting a pixel bit stream into vectorial data as the bit stream is acquired.

SUMMARY OF THE INVENTION

In accordance with one aspect of the invention, a bit-map image of a picture is regenerated as a series of tessellated picture elements representing only the lines and edges of the picture; as the bit map is regenerated the line and edge data is encoded as a plurality of line segments or contours and stored as an ordered list of such contours; as the storage of each encoded contour is completed, the contour is removed from the list, converted to a vectorial representation of the contour, and output to a user device.

In accordance with another aspect of the invention, the contours are listed in an order corresponding with the order in which the contours are intercepted as the picture is scanned, and wherein means are provided for connecting two or more contiguous contours as a single contour having a general orientation which is transverse to the general directions of scanning.

BRIEF DESCRIPTION OF THE DRAWING

FIG. 1 is a block diagram of an automatic picture coding system in accordance with the instant invention.

FIGS. 3 and 4 illustrate a data format utilized in the practice of the present invention.

FIGS. 8A, 8B and 8C are flow diagrams illustrating the operation of the state control logic of FIG. 2.

FIG. 10 is a vector diagram of a subset of chain-code vectors utilized in the practice of the present invention.

FIG. 11 is a pictorial diagram showing an analogy of the raster-to-chain-code conversion process in accordance with the present invention.

FIG. 12 shows a bit-map representation of the contours shown in FIG. 11.

FIGS. 16-34 are flow diagrams illustrating in detail the process shown generally in the FIG. 15 flow diagram; FIGS. 16-24 describe the data window handling routines for each of the window classes.

FIG. 25 is a flow diagram of the ADDCODE subroutine.

FIG. 26 is a flow diagram of the NEWBIN subroutine.

FIG. 27 is a flow diagram of the INSERT subroutine.

FIG. 28 is a flow diagram of the UNWIND subroutine.

FIG. 29 is a flow diagram of the DELETE subroutine.

FIG. 30 is a flow diagram of the LINEFINDER subroutine.

FIG. 30A is a diagram showing the function performed by the LINE FINDER subroutine.

FIG. 31 is a flow diagram of the NEXTENDPOINT subroutine.

FIG. 32 is a flow diagram of the NEXTCODE subroutine.

FIG. 33 is a flow diagram of the CCD FULL interrupt subroutine.

FIG. 34 is a flow diagram of the real-time clock interrupt subroutine.

DESCRIPTION OF THE PREFERRED EMBODIMENT

Figure 2:
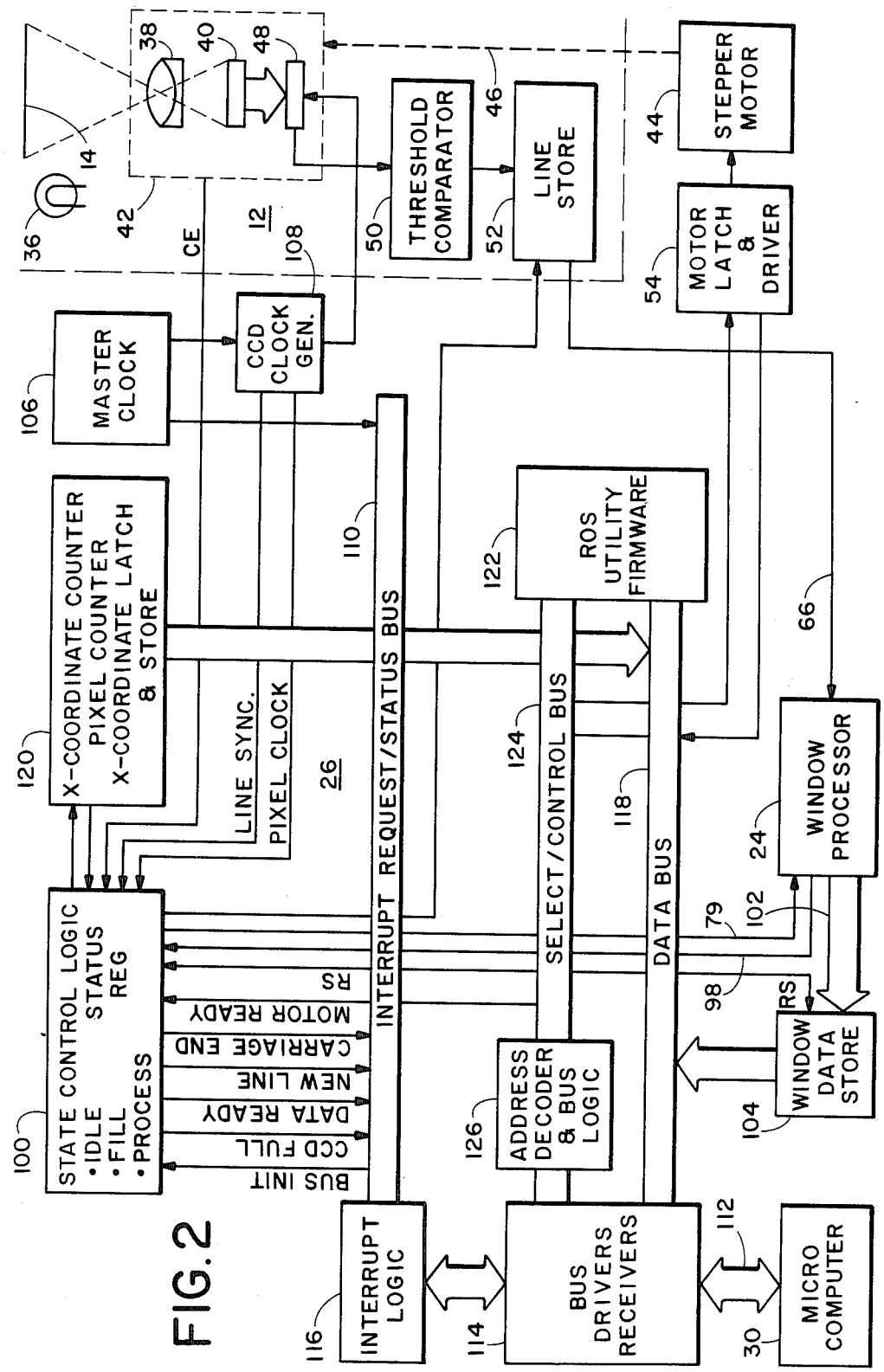
FIG. 2 is a more detailed block diagram of the system of FIG. 1.

Referring now to the various views of the drawing for a more detailed description of the construction, operation and other features of the invention by characters of reference, FIG. 1 shows a simplified block diagram of an automatic picture coding system 10 comprising an image acquisition element 12 which converts an image of a document 14 into electrical signals. A variety of means may be utilized to acquire an image of a document including scanners wherein the document to be read is moved past a fixed sensor and light source. An example is the facimile drum scanner in which the original is attached to the outside of a rapidly rotating cylinder moving slowly along its axis with respect to the sensor, thus producing a raster-scanned image of the document. In a variation of the foregoing, the original document and the detector remain fixed and the scanning is effected by moving mirrors. A second type of scanner is one in which a small intense spot of light is scanned over a document, light reflected from the document being detected by a single-element detector with no particular directional characteristics. Such scanners include laser scanners having moving mirrors which scan a laser spot across the picture. A moving spot may also be produced by focusing the face of a raster-scanned CRT onto the document. Another scanning approach involves scanning the document or an optical image of the document, with an area detector such as a vidicon or a solid-state imaging array.

The image acquisition element 12 of the presently described embodiment of the invention utilizes a form of raster scanning to dissect an optical image of the document 14 into a plurality of rows of square picture elements or pixels, one of which rows 16 is depicted in FIG. 1. A linear array of photosensitive charge-coupled devices (CCD) senses one entire row 16 of contiguous pixels of the appropriately illuminated document 14. The light intensity in each pixel is compared with a threshold value and converted to a binary digital signal representing either a black or a white area of the document 14. The electrical signals representing the row 16 are coupled via a connection 18 to a digital hardware element 20. The entire document 14 is scanned by successively repositioning the linear CCD imaging array in the direction perpendicular to the row 16 by mechanical means 22 responsive to the digital hardware element 20. The result is a digital image in the form of a serial matrix or bit map having elements representing the entire document 14.

The digital hardware element 20 comprises a preprocessor 24 and a control logic element 26. The preprocessor 24 receives the serial digitized data from the image acquisition element 12 and performs a series of high-speed transformations on the data as it is received. The preprocessor 24 changes the data from a bit-map representation of the sensed image into a compact feature representation by performing preprocessing operations such as smoothing, growing, thinning, etc. Smoothing is a process which removes spurious points adjacent to a line, growing fills discontinuities in lines and broad features, and thinning reduces broad features to skeletal lines usually no more than one pixel wide. The transformed data is transferred via a bus 28 to a microcomputer 30 for additional, high-level processing. The data output from the preprocessor 24 to the microcomputer 30 is still a bit-map representation of the document 14; however, only pixels associated with line data and edges are output to the microcomputer 30. The data is transferred in real time as the document 14 is being scanned. The microcomputer 30, under control of a software module 32, encodes and lists the data, and converts the listed data into an abstraction comprising a list of vectors representing the original document. When the image of the document 14 has been thus encoded as vectors, the data can be easily edited, displayed and stored, or otherwise processed by a user device 34. For example, the vectorial data provides a compact base for syntactic pattern recognition. The task of identifying arcs, characters, or other features or symbols from vectorial data is significantly less complex than from the plurality of intensity values of a bit map. Calculating feature parameters such as areas or trajectories is also made simpler by using vectorial data.

The control logic 26 serves as an interface between the microcomputer 30, the preprocessor 24, and the image acquisition element 12, providing control, sequencing and timing functions. Among these functions are control of the mechanical means 22 for scanning the imaging array as well as data transfer functions.

Referring now to FIG. 2, the automatic picture coding system 10 of FIG. 1, is shown in greater detail. The image acquisition element 12 comprises a light source 36, a lens 38, and an image detector 40. The uniformly illuminated document 14 is held in a fixed position and one line of the document is focused onto the image detector 40 which in the presently described embodiment of the invention is a linear CCD photodiode array having 1024 photosensitive elements receiving photons from the row 16. The lens 38 and image detector 40 are mounted on a carriage 42 which is connected to a stepper motor 44 by mechanical means 46. Before an image of a line is acquired, all photodiodes in the array 40 are reverse biased to a fixed voltage associated with a charge stored by the junction compacitance of the photodiodes. As photons strike the junction, electron-hole pairs are produced resulting in a loss of charge from the junction. The amount of charge loss is a linear function of the number of photons striking the diode. At the end of an integration period, the charge is transferred from the photodiodes to a CCD analog shift register 48. After the transfer, the photodiodes 40 once again begin integrating light while the sensed charge pattern is shifted through the CCD analog shift register 48 to a threshold comparator 50. Each of the output voltages of the charge-pattern sequence representing the light striking each of the photodiodes in sequence along the array 40 is compared to a predetermined threshold voltage in the threshold comparator 50 and regenerated as a binary signal representative of the light/dark pattern of the sensed line wherein a binary "one" represents a black or dark area and "zero" represents a white or light area. One such line of data sensed by the CCD array 40 is referred to herein as a "raster" of data, or simply, a raster. One line or raster of data is stored in a line store 52.

A new raster of data is acquired by the image detector 40 while the previous image is being shifted out of the CCD shift register 48 into the line store 52. Thus, the stepper motor 44 is activated to begin moving the carriage 42 immediately after the transfer of the raster of data from the photodiode array 40 into the CCD shift register 48. The image detector 40 is moved on the carriage 42 which in the presently described embodiment is a micrometer driven translation stage, the micrometer 46 being turned by the stepper motor 44. The use of a stepper motor allows precise positioning of the array over a number of steps and allows the array 40 to be stepped intermittently precluding problems due to mechanical inertia. In the presently described embodiment, approximately seven steps of the stepper motor 44 are required to move the image-detector array 40 one pixel thickness down the document 14 to acquire the next raster of data. The stepper motor 44 is driven by a motor latch and driver circuit 54 in response to input signals from the system software as will be described hereinafter.

A raster of data stored in the line store 52 is transferred one bit at a time on demand to the preprocessor or window processor 24 under control of the control logic 26, and while this transfer is occuring, another raster of data is being acquired by the image acquisition element 12. The window processor 24 thus processes successive rasters of data as they are acquired utilizing a technique known in the art as "neighborhood" or window logic. Neighborhood logic refers to an operation performed digitally on an array of data A(I,J) which is carried out so as to transform A(I,J) into a new data array A'(I,J) wherein each element in the new array has a value determined only by the corresponding element in the original array along with the values of its nearest neighbors. The nearest neighbor configuration is called a "window" and apparatus performing operations on arrays of identically configured windows is called window logic. Referring to FIG. 3, there is shown a bit map 60 of black and white pixels of sampled data representing a portion of a scanned document with successive raster portions being arranged horizontally in the figure. A 3-pixel wide by 3-pixel high section of the bit map 60 is defined as a window 62. A window such as the window 62 may be centered at any pixel in the image. Although a window such as the window 62 of the presently described embodiment of the invention is a square tessellation, other tessellations may be utilized. The window processor 24 examines each of the $3 \times 3$ windows in the image serially a number of times and, based on the pattern of light and dark pixels within the window, changes a center pixel 64 from light to dark, from dark to light, or leaves it unchanged. This operation, applied sequentially to windows centered at each pixel in the image and, in some instances, repeated a number of times, performs all image transformations involved in thinning, growing, noise elimination and smoothing of the image.

FIG. 4 represents a window of pixel data having 9 pixels labled 8-0 as shown. The instant invention utilizes a data format wherein each window is expressed as a 9-bit binary word, each of the bits of the word having a numbered location in the window which corresponds with the binary weight of the bit, i.e., the most-significant bit of the binary word corresponds with the center pixel ($2^8$); the least-significant bit, with the pixel to the right of the center pixel ($2^0$) in FIG. 4. The window 62 of FIG. 3 is thus expressed as a binary number 100,001,111, or $417_8$ in octal notation. A window 65 of FIG. 3 is expressed as $110,001,101_2$ or $615_8$ in the data format of the instant invention. Each window pattern thus has a unique number associated with it which represents one of 512 ($2^9$) possible patterns. This unique number is used in the window processor as a table-lookup instruction to determine a new value of the center pixel of the window. For example, the window $400_8$ represents a single isolated black pixel in a field of white and may be considered as noise. The noise can be removed by loading a zero into the table location corresponding to the window $400_8$. The window processor would then replace every occurrence of $400_8$ with 000. Similarly, a window $377_8$ having a white pixel in a field of black can be filled in by regenerating $777_8$.

Figure 5:
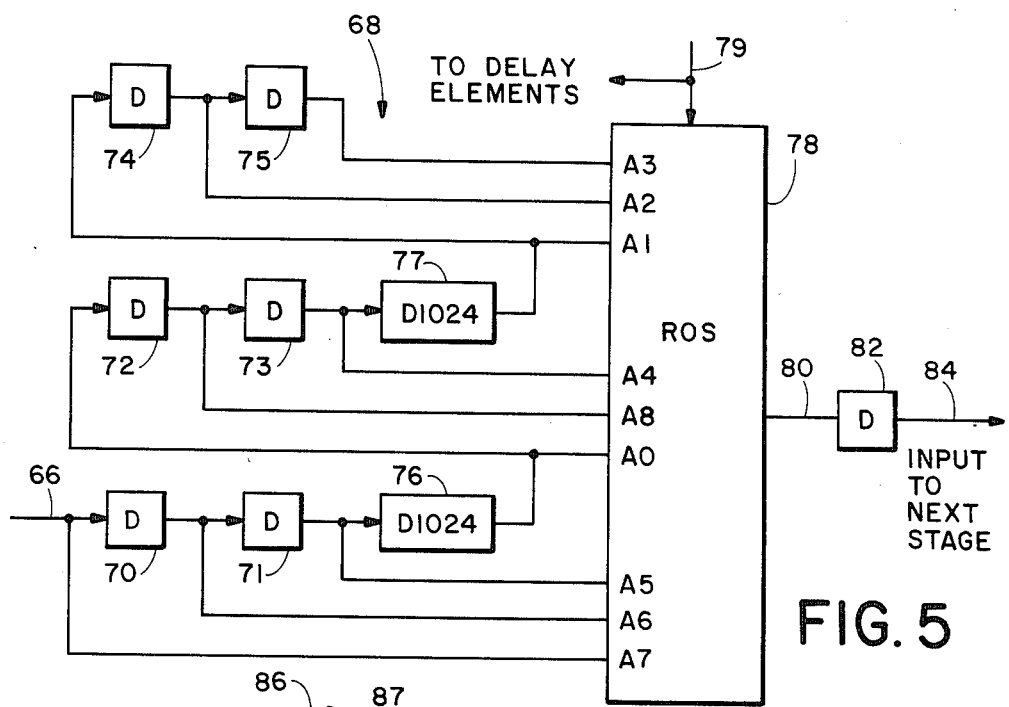
FIG. 5 is a block diagram of one stage of the window-processor of FIG. 2.

In the FIG. 4 representation of a window, the three raster portions, formed respectively by pixel groups 3-1; 4,8,0; and 5-7 reside in three successive rasters of data. Referring now to FIG. 5 in conjunction with FIG. 2, the bit stream from the line store 52 is input to the window processor 24 via a bus 66 to a first stage 68 of the window processor 24. All 9 bits of a window are examined simultaneously utilizing a tapped delay-line structure comprising 1-bit delay elements 70-75 and 1024-bit delay elements 76,77. Utilizing the representative window format shown in FIG. 4, the first raster segment comprising bits 3-1 is delayed one raster plus two bits in the delay elements 70, 71, 76, and another raster plus two bits in the delay elements 72, 73, 77. Bit 3, the first received by the window-processor stage 68, is delayed an additional two bits in the delay elements 74, 75, and bit 2 is delayed one bit in the delay element 74. Bits 3-1 are thus regenerated as address signals A3–A1 input to a read-only store (ROS) 78. Concurrently, the second raster segment comprising bits 4, 8 and 0 will have been delayed one raster plus two bits in delay elements 70, 71, 76 and two additional bits in delay elements 72, 73 to generate address input signals A4, A8, A0 of the middle raster segment. Concurrently, bit 5 of the third raster segment comprising bits 5–7 will have been delayed two bits in the delay elements 70, 71, and bit 6 delayed one bit in the delay element 70 to form along with bit 7 the address input signals A5–A7. Each of the windows forming the image are thus circulated in succession through the window processor stage 68 in response to timing signals on a connection 79, the data bits comprising each window being applied as the address inputs of the 512×1 bit ROS 78.

Figure 6:
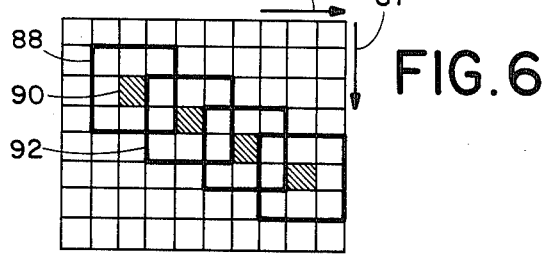
FIG. 6 is a diagram illustrating the spatial relationship of data output by contiguous stages of the window processor of FIG. 2.

The ROS 78 is programmed for the desired transformation function, i.e., thinning, growing, etc., such that an output signal thereof represents the appropriate new value for the center pixel based on the input window pattern. The most important task of the window processor 24 is thinning lines to their skeletons. A skeleton of a line is a local representation of the trajectory of the line; line thinning facilitates the extraction of a contour from the data in subsequent processing. A "contour" is defined as a connected string of single black pixels on a white background or an edge between a black and white region of an image, and the encoded equivalent or representation thereof. While thinning, the output of the ROS 78 is a white pixel for all input windows which have a white center pixel. However, some windows containing a black center pixel will produce black pixel outputs from the ROS while others will produce white pixel outputs. By successive applications of the thinning operation, black pixels will be changed to white leaving a skeletal or thinned representation of the image which is a subset of the black regions of the original image. The window processor 24 of the presently described embodiment of the invention includes sixteen window-processor stages like the window-processor stage shown in FIG. 5 connected in series or pipelined to process the digital image sixteen times in succession at hardware speeds. Referring to FIG. 5, an additional 1-bit delay element 82 is interposed between the output 80 of the ROS 78 and an input connection 84 to the next stage of the window processor 24. The additional pixel of delay 82 at the output of each stage of the window processor was introduced to achieve full nonrecursive processing in each of the window-processor stages, i.e., the output bit stream of a window-processor stage is not utilized by the same window-processor stage in constructing windows of data subsequently processed by the same stage. Nonrecursive window processor stages such as the window processor stage of FIG. 5 are cascaded directly in the window processor 24 by connecting the output 84 of one stage to an input terminal of the next succeeding stage (like the input terminal 66 of FIG. 5). In such an implementation there is a delay of one raster plus two pixels between adjacent processing stages resulting in a data relationship between adjacent stages as shown in the bit-map representation of FIG. 6. The direction of bit-stream processing or window travel is from left to right and top to bottom in FIG. 6 as depicted by arrows 86, 87. Referring to FIG. 6, a first window 88 of data represents the data being processed by a first stage of the window processor, an output bit 90 of the stage being the center bit of the window 88. The second stage of the window processor considers 3×3 window 92 of data having only bits that have already passed through the first stage represented by the window 88. An output bit being generated by any one stage is not utilized concurrently by the next succeeding stage; each stage (except of course the first stage) examines a bit map which has been regenerated by the previous stage.

The window processor 24 includes 15 pipelined stages each performing local transformations on the image in accordance with the contents of the ROS for each stage of the processor. The particular window patterns which produce changed center pixels are listed in TABLE I below. All other window patterns are passed without change. The listed window patterns are in the octal-coded, 9-bit binary notation of the window-data format described with reference to FIGS. 3 and 4. Five programs are listed: SMOOTH, FULL GROW, SEMI-GROW, QUARTER GROW and THIN. The SMOOTH program comprises four sequential passes of processing which reduce image noise and smooth line contours. The three GROW programs, each consisting of one stage of processing, perform different amounts of growing on the image, effectively increasing the size and area of black regions of the image. The FULL GROW program fills all white center pixels in the input window; the SEMI-GROW program which is a subset of FULL GROW attacks broken and jagged lines; and QUARTER GROW patches small holes in lines and edges. THIN, the last of the data transformation functions performed by the window processor, comprises two passes which are alternated and repeated four times each. One of the passes peels pixels from the upper-left portion of contours; the other, from the lower-right.

TABLE 1

| WINDOW PROCESSOR FUNCTIONS | | | |
|---|---|---|---|
| SMOOTH PASS 1 | SMOOTH PASS 2 | SMOOTH PASS 3 | SMOOTH PASS 4 |
| 377 | 037 | 037 | 076 |
| 400 | 174 | 174 | 217 |
| 401 | 307 | 307 | 343 |
| 402 | 361 | 361 | 370 |
| 404 | | 407 | 403 |
| 410 | | 417 | 406 |
| 416 | | 434 | 414 |
| 420 | | 436 | 416 |
| 440 | | 474 | 430 |
| 470 | | 560 | 460 |
| 500 | | 570 | 470 |
| 600 | | 607 | 540 |
| 603 | | 701 | 601 |
| 740 | | 703 | 603 |
| | | 741 | 700 |
| | | 760 | 740 |

| FULL GROW 001–377 | | | |
|---|---|---|---|
| SEMI-GROW | | QUARTER GROW | |
| 011 | 144–147 | 011 | 167 |
| 021–023 | 151–157 | 021–023 | 177 |
| 025 | 161–167 | 025 | 204 |
| 031 | 171–177 | 031 | 210 |
| 037 | 204 | 041–044 | 214 |
| 041–047 | 210 | 046 | 220 |
| 051 | 211 | 061–063 | 221 |
| 053 | 214 | 071 | 223 |
| 055 | 220–237 | 102 | 230 |
| 057 | 241 | 104 | 310 |
| 061–063 | 244–247 | 106 | 325 |
| 065 | 251–267 | 110 | 327 |
| 067 | 271–277 | 116 | 335 |
| 071 | 304–307 | 125 | 337 |
| 073 | 311–317 | 127 | 365 |
| 075 | 321–327 | 135 | 367 |
| 077 | 331–337 | 137 | 375 |

TABLE 1-continued

WINDOW PROCESSOR FUNCTIONS

| 102 | 344–347 | 165 | 377 |
|---|---|---|---|
| 104–117 | 351–357 | | |
| 121–127 | 361–367 | | |
| 131–137 | 371–400 | | |
| 142 | | | |

| THIN PASS 1 | THIN PASS 2 |
|---|---|
| 403 | 403 |
| 406 | 406 |
| 407 | 407 |
| 414 | 414 |
| 416 | 415 |
| 417 | 416 |
| 430 | 417 |
| 434 | 426 |
| 436 | 430 |
| 460 | 434 |
| 470 | 436 |
| 474 | 437 |
| 476 | 460 |
| 503 | 464 |
| 530 | 466 |
| 540 | 470 |
| 541 | 474 |
| 543 | 476 |
| 560 | 477 |
| 570 | 540 |
| 601 | 560 |
| 603 | 570 |
| 607 | 574 |
| 617 | 576 |
| 700 | 601 |
| 701 | 603 |
| 703 | 605 |
| 707 | 607 |
| 717 | 615 |
| 720 | 617 |
| 730 | 637 |
| 740 | 700 |
| 741 | 701 |
| 743 | 703 |
| 747 | 740 |
| 760 | 741 |
| 761 | 743 |
| 763 | 760 |
| 770 | 770 |
| 771 | 774 |

Figure 7:
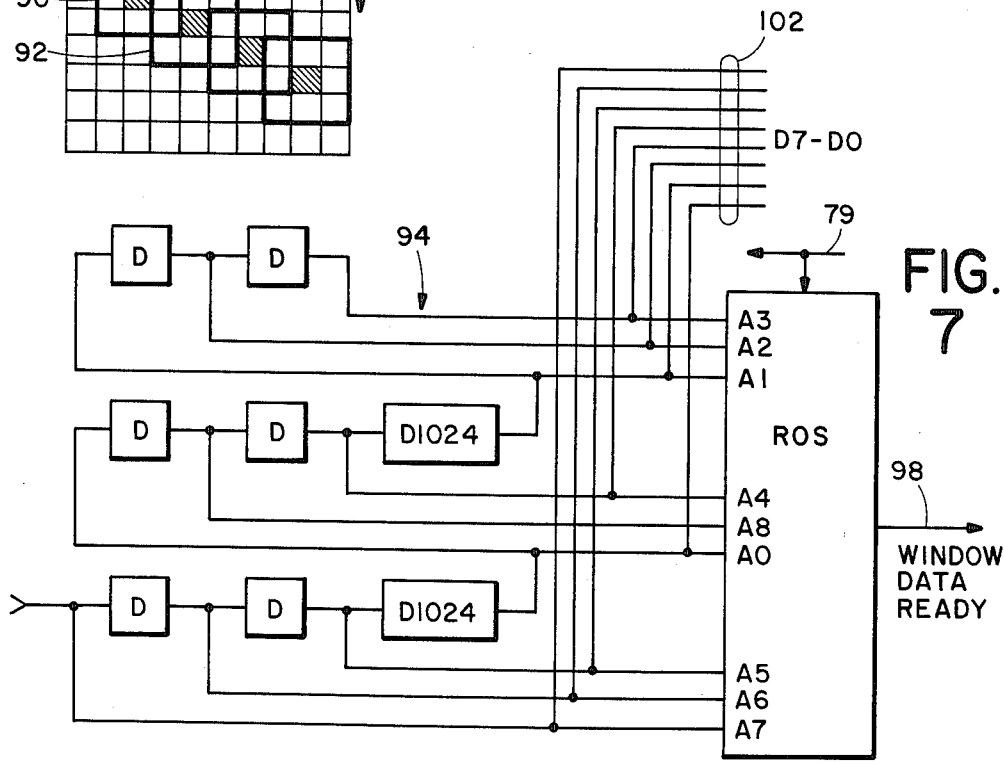
FIG. 7 is a block diagram of the final stage of the window processor of FIG. 2.

Referring now to FIG. 7 in conjunction with FIG. 2, a final stage 94 of the window processor 24 includes a ROS 96 which is programmed to generate a WINDOW DATA READY output signal on a connection 98 for each input window pattern having a center pixel which is part of either one or more lines or an edge of the digitized image. The WINDOW DATA READY signal is thus generated for all windows having a black center pixel, except for all-black windows. A zero (WINDOW DATA READY not enabled) is generated for all windows having a white center pixel. The process of the instant invention for converting raster format data to vectorial data requires only information about edges and thus the microcomputer is flagged for a window data transfer a number of times which is only a fraction of the number of pixels in the original image. Solid white and solid black regions of the image are processed at the maximum speed of the window processor, producing no data for the software to process; consequently, the image can be processed on a demand basis as it is acquired. The WINDOW DATA READY signal, coupled via the connection 98 to a state control logic element 100, flags the presence of window data to be read by the microcomputer. The window data is transferred as an eight-bit byte of data, signals D7-D0 (the center pixel, $2^8$, is always black and is therefore implied), via a bus 102 to a window-data store 104 for subsequent access by the microcomputer 30.

The control logic 26 serves as an interface between the microcomputer 30, the window processor 24 and the image acquisition element 12, providing control, sequencing and timing functions. A master clock 106 which may be a conventional crystal-controlled oscillator, pulse shaper and divider circuits, provides a timing signal input to a CCD clock generator 108 and to the microcomputer 30 via a bus 110. The bus 110 comprises interrupt request and status lines. A PIXEL CLOCK signal output of the CCD clock generator 108 has a rising edge which is associated with a valid intensity-related signal at the output of the CCD array and thus operates at the basic pixel rate of the CCD array. The microcomputer 30 communicates with the control logic 26 via an external bus 112 coupled to bus driver/receiver circuits 114 of the control logic 26. An interrupt logic element 116 receives interrupt requests and status signals from a status register of the state control logic 100 for transmission to the microcomputer 30 via the bus drivers 114. An internal data bus 118 of the control logic 26 receives data for transmission to the microcomputer 30 via the bus drivers 114. An internal data bus 118 of the control logic 26 receives data for transmission to the microcomputer 30 from control logic 26 elements such as the window data store 104, an X-coordinate logic element 120 and a ROS 122. The ROS 122 contains utility firmware such as a bootloading routine for initialization, and processing programs which are accessed by the microcomputer 30 via a select/control bus 124 through an address-decoder and bus-logic element 126. The microcomputer 30 selects elements of the control logic 26 for communication therewith via the bus 124. The microcomputer 30 is a general-purpose data processor; the presently described embodiment of the invention utilizes an LSI/11 microcomputer manufactured by the Intel Corporation.

Various data items must be passed between the control logic 26 and the microcomputer 30 during system operation. The most obvious of these is the window data output of the window processor 24 which is stored in the window data store 104. In order to process the window data, the microcomputer 30 software must have access to the X-coordinate in the raster of the center pixel of the window being transferred. This data is obtained from an X-coordinate store in the X-coordinate logic element 120. The state control logic 100 generates a NEW LINE signal in the status register each time a new raster reaches the output of the window processor 24.

Several data items must also be exchanged by the control logic 26 and the microcomputer 30 software to operate the stepper motor 44 for positioning the CCD array for each raster. The software controls the stepper motor 44 by writing a sequence of bits into the motor latch and driver circuit 54. To provide timing for this function, the interrupt logic 116 generates at precise intervals a real-time clock interrupt derived from the master clock 106. This timing information allows the microcomputer software to generate control signals which start, stop and control the direction and speed of the stepper motor 44. Upon initialization, a REWIND command from the microcomputer 30 operates the stepper motor 44 to move the carriage 42 to a reference position relative to the start of the image. Upon reaching the reference position, a signal CE generated by the carriage is regenerated by the state control logic 100 as a CARRIAGE END signal to inform the microcomputer of such event. The software generates a MOTOR READY signal when the stepper motor 44 has stepped the carriage 42 into position for acquiring a new raster of data. Subsequently, the state control logic 100 generates a CCD FULL signal when a valid raster of data has been transferred from the image detector 40 into the shift register 48, indicating that the motor 44 may again be stepped. The motor driving software operates as an asynchronous task driven by the real-time clock and CCD FULL interrupts, operating in a multiprogramming mode with the image-handling software.

Figure 8B:
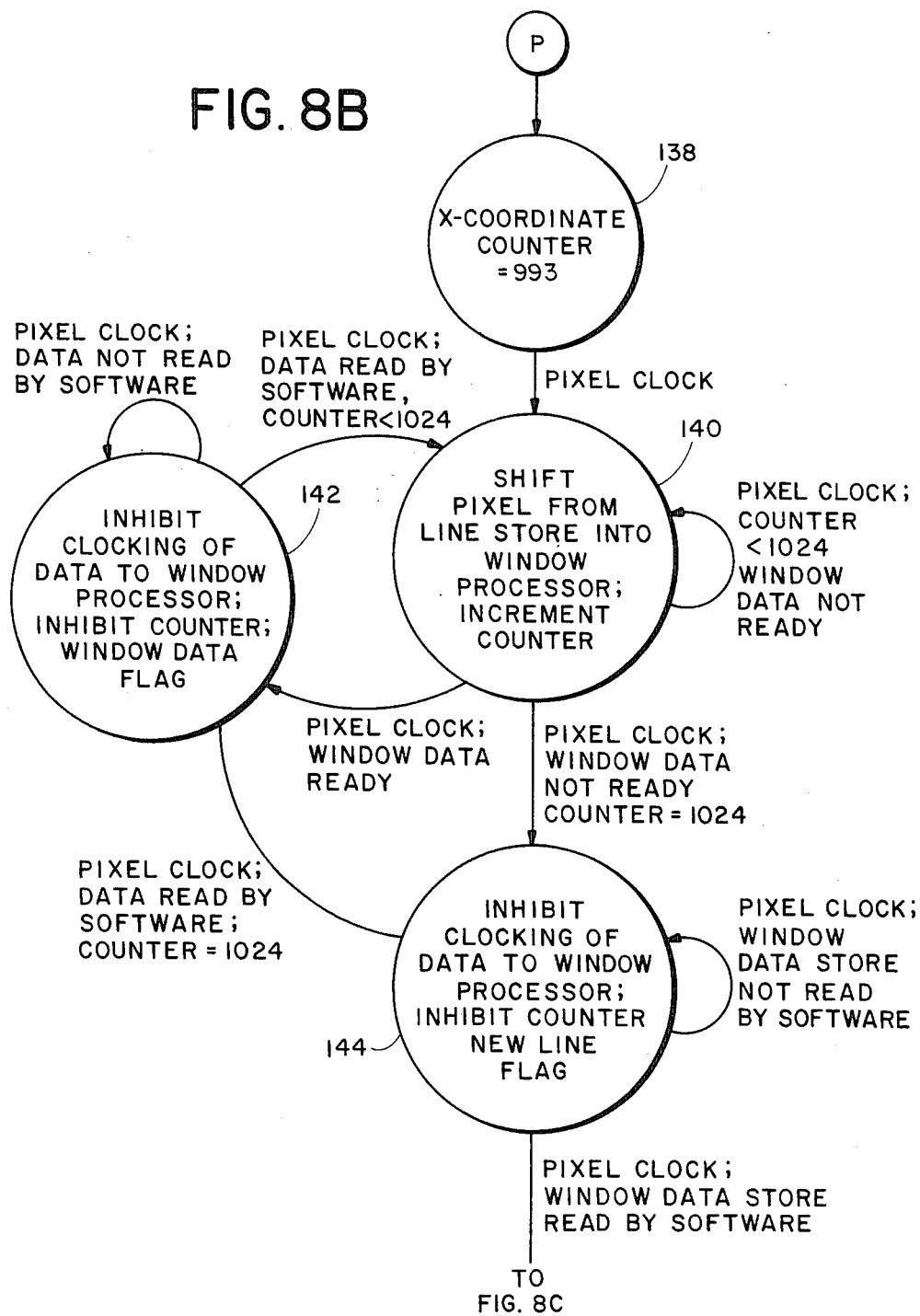
Figure 8C:
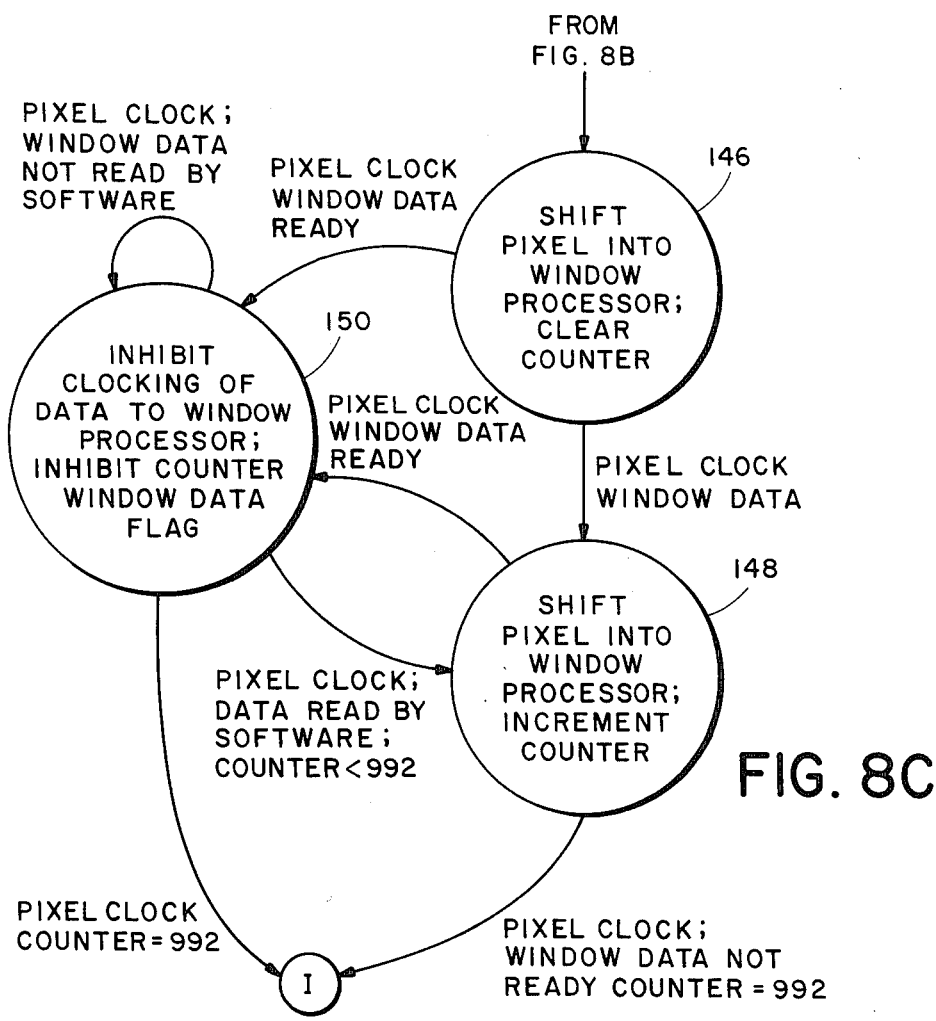

The state control logic 100 coordinates the operation of the stepper motor 44, the transfer of a raster of data into the line store 52, the shifting of this raster through the window processor 24, and the transfer of data from the window data store 104 to the microcomputer 30. In order to achieve a meaningful and orderly progression of operations for program steps involved in these operations and the attendant movement of information signals and data among the various units, registers and other elements of the automatic picture coding system, after a need for specific movements, combinations of movements or operations has been established, control signals and timing pulses must be generated or issued to permit the prescribed movement or operation at the desired time. Any undesirable movements or operations must likewise be inhibited. The exact manner in which specific control signals are logically derived and timing pulses are generated from a clock source (such as the master clock 106), delay network or divider according to precisely defined conditions in the system at certain precisely defined times has become a matter of common knowledge within the art. Therefore, in the ensuing discussion no attempt is made to describe in great detail the circuit origins of each of the control and timing signals which bring about the information movements or initiate operations within the system. Referring now to FIG. 8 in conjunction with FIG. 2, a state transition diagram of the state control logic 100 is shown. There are three major states: IDLE, FILL and PROCESS, the PROCESS substates being shown in the right-hand portion of FIG. 8. The IDLE state, designated by reference character 130, is entered upon hardware initialization, or at the end of the PROCESS state. Hardware initialization is effected by a BUS INIT signal generated by the microcomputer 30 upon power-up and during the execution of a RESET instruction. The BUS INIT signal returns the control logic to the IDLE state, resets the status register and disables all interrupts. To leave an initial IDLE state, the control logic 100 must receive a MOTOR READY signal from the microcomputer 30. The MOTOR READY signal indicates that the stepper motor 44 has moved the CCD array into position for acquiring the next valid raster of data. MOTOR READY is asserted by the microcomputer 30 by performing a write operation to a motor-ready address in the interface address space of the address decoder 126. After receiving the MOTOR READY signal, the state control logic 100 waits for a LINE SYNC signal from the CCD clock generator circuit 108. The first LINE SYNC signal results in a substrate 132 wherein a potentially blurred raster, obtained while the motor was still stepping, is being transferred into the CCD shift register 48; this raster is discarded, and the control logic waits for the next LINE SYNC signal. When the next LINE SYNC signal is received, the control logic enters the FILL state in which a thresholded raster of data is shifted into the line store 52 for intermediate storage. Intermediate storage is necessary because the rate at which data is output by the window processor 24 may exceed the capabilities of the microcomputer 30 to access it in real time. The window processor operation may be delayed to wait for the microcomputer; however, it is undesirable to propagate such delay to the analog CCD shift register 48; therefore the line store 52 is utilized to buffer the data. Coincident with entry into the FILL state, substate 134, a CCD FULL signal is generated. If enabled by software, an interrupt is also generated. This condition indicates that a raster of data has been transferred from the photodiode array 40 into the CCD shift register 48, and the motor-control software may begin to step the carriage 42 to the next position for acquiring another raster, while the previous raster of data is being shifted out of the CCD shift register 48. A pixel-clock counter is set to 0 and the PIXEL CLOCK signal is enabled to the line store 52 allowing pixels to be shifted through the threshold comparator 50 to the line store 52, substate 136. When 1024 pixels have been shifted into the line store, the control logic enters a sequence of process states wherein the data in the line store 52 is shifted pixel by pixel via the bus 66 into the window processor 24. Concurrently, a processed raster is being shifted out of the last window-processor stage into the window data store 104. At the beginning of the PROCESS sequence, substate 138, an X-coordinate counter is set to 993 (the number of pixels per raster minus 32), 993 being the X-coordinate of the pixel output from the window processor on the bus 102. Recall that each state of the window processor delays the data one raster plus two pixels to allow each stage to use data completely processed by the previous stage. Therefore, when pixel zero of the thirty-third raster is present at the input 66 of the window processor, pixel 993 of the first raster is present at the output of the window processor 24. Note also, that since the line store 52 stores only 1024 bits and 1025 bits per raster are required, a zero bit is added as the 1025th bit of each raster.

Beginning the process sequence, a PIXEL CLOCK is generated, one pixel of data from the line store 52 is shifted into the window processor 24 and the X-coordinate counter is incremented, substate 140. Before each new bit is clocked into the window processor 24, the WINDOW DATA READY signal output of the window processor on the bus 98 is checked by the control logic. When the WINDOW DATA READY signal is true, the clocking of data from the line store 52 to the window processor is inhibited, a DATA ENTRY flag is set for the software, and an interrupt is generated, substate 142. The control logic 100 remains in the clock inhibit substate 142 until a READ STROBE signal RS addressing the window data store 104 indicates to the state control logic 100 that the available data has been read by the software. Concurrently, the contents of the X-coordinate counter are latched into the X-coordinate store so that the software may read the X-coordinate of the transferred data item. The window processor and line store 52 clocks are then enabled and the processing of the raster bit string continues, substate 140.

When the X-coordinate counter reaches 1024, a substate 144 is entered wherein the NEW LINE signal and an interrupt signal are generated, and the window processor clock is inhibited. If WINDOW DATA READY occurs when the X-coordinate is 1024, the condition is flagged and acknowledged by the software (substate 142) before a NEW LINE signal can be asserted by the state control logic 100. The microcomputer 30 software acknowedges the NEW LINE flag by reading the window data store 104 (which initially contains meaningless information), causing the control logic to enter a substate 146 wherein the X-coordinate counter is cleared. Shifting of pixels into the window processor continues in substate 148 with pauses for the WINDOW DATA READY condition in substate 150, until the last pixel has been shifted into the window processor, i.e., when the X-coordinate counter reaches a count of 992, whereupon the control logic returns to the idle state 130. The state of the WINDOW DATA READY signal is not tested after the final pixel clock of a raster is issued; if WINDOW DATA READY is true at that time, the condition is flagged at the start of the next process cycle before any clocking of the window processor occurs.

Some overlapping of the events leading to the next FILL state may occur during the process states. If the MOTOR READY signal occurs before the previous raster of data has been processed and a LINE SYNC signal indicating a valid image transfer is generated, the control logic is enabled directly from the process state to the fill state without an intervening idle state.

A major advantage of the picture coding system of the present invention is the ability to process raster data one pixel at a time on demand, making large bit-map storage areas unnecessary. Only pixels falling on edges of light or dark regions generate items which are transferred to the microcomputer 30 for processing. When complex images are being encoded, a considerable number of data items are transferred from the window processor to the microcomputer; the time interval between the availability of successive data items for transfer to the microcomputer is highly variable and somewhat random. This is in contrast to the relatively fixed length of time required by the microcomputer to process each data item. The window processor produces data items faster than the microcomputer software can process the data; therefore to avoid data overrun, the control logic halts the window processor until data output by the window processor is accepted by the microcomputer. However, instances may also occur in which long time intervals occur between successive processable data items wherein the software would be required to wait for the window processor. Accordingly, the microcomputer fetches data from the window data store 104 on demand in response to an interrupt signal from the state control logic 100 and stores up to 256 window data items in an internal queue for subsequent processing during such intervals.

An important task of the microcomputer 30 is the encoding and listing of data from the window processor 24. Each data item represents an element of a line in the image of the drawing being scanned. The output of the process is a series of lists, each list describing one contour of the inage. In order to sort and compile the raster data, a method of coding contours, the Freeman code, is utilized. See H. Freeman, "On the Encoding of Arbitrary Geometric Configurations," *IRE Trans., EC*-10 (2), June 1961, 260–268. Freeman coding or chain coding is a means for the computer representation of line-drawing data, wherein an overlaid square lattice is assumed and the lines of the drawing are represented by sequences of straight-line segments connecting elements of the lattice closest to the lines. In passing from one element to the next, the slope function of each line segment is quantized as one of a set of standard slopes, usually eight in number. Each element of the chain-coded contour describes a translation of the coutour from one pixel to it's neighbor.

The sorting process of the instant invention generates lists of chain-coded contours which are converted to a series of connected vectors. The control logic 100 generates an interrupt signal to the microcomputer whenever a window containing a black center pixel is output from the window processor. The microcomputer fetches the window from the window data store in the data format previously described with reference to FIGS. 3 and 4. Each window data item is utilized by the microcomputer as a table-lookup instruction to obtain one or two chain-codes and/or instructions for operations to be performed on the lists of encoded contours. Each of the 256 windows is classified in the lookup table as one of eight classes, the class being determinative of process execution. The eight classes are as follows:

| Class No. | Class Description |
|---|---|
| 0 | Contour Continuation |
| 1 | Single Contour Creation |
| 2 | Single Contour Completion |
| 3 | Double Contour Creation |
| 4 | Double Contour Completion |
| 5 | Single Contour Creation; Double Contour Completion |
| 6 | Double Contour Creation; Single Contour Completion |
| 7 | Double Contour Creation; Double Contour Completion |

Figure 9:
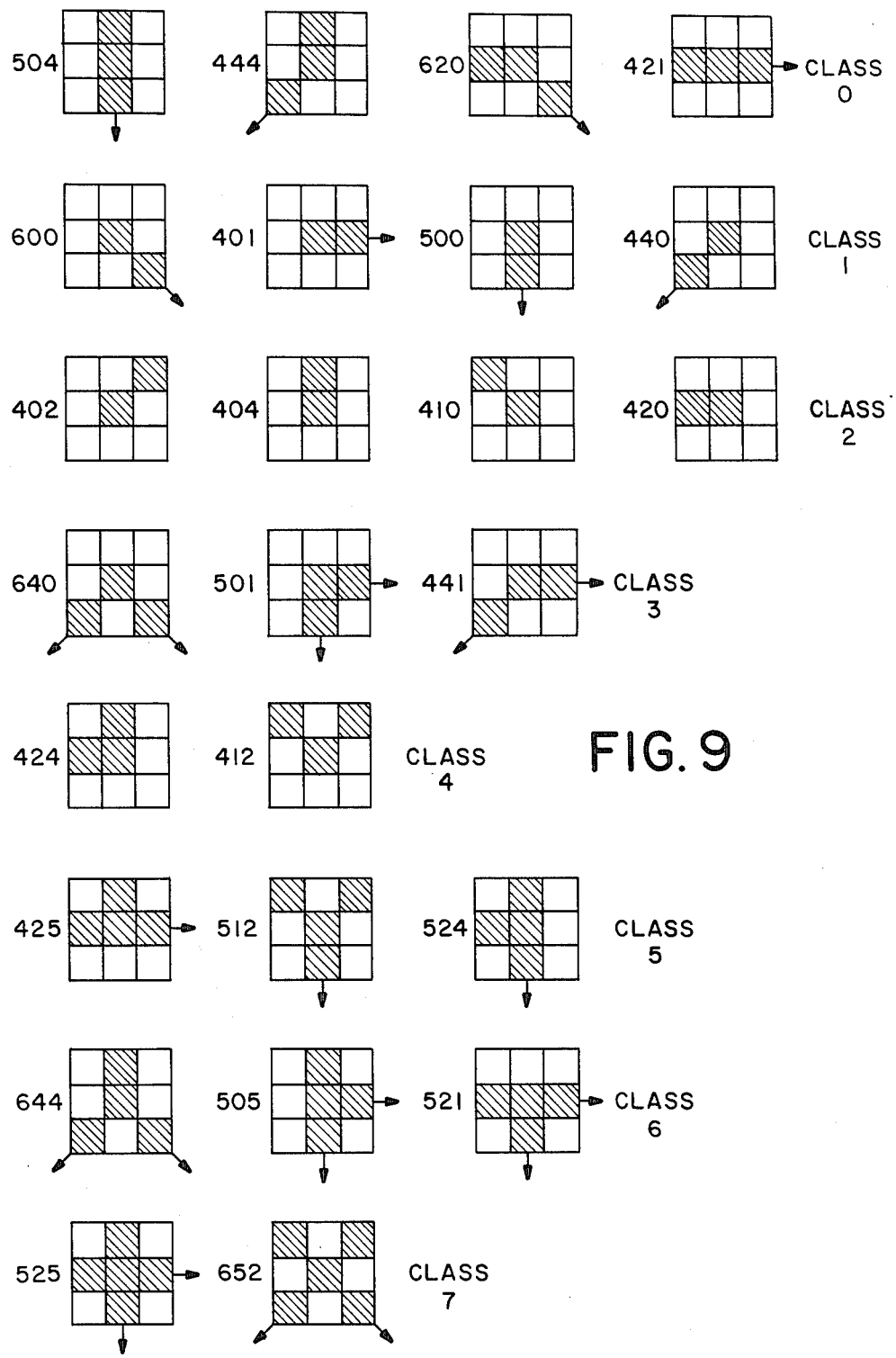
FIG. 9 illustrates representative ones of tessellations of pixels in each of the various classes of window data items according to the instant invention.

The alternative adjectives "start" and "end" are used interchangably with "creation" and "completion" herein to describe windows or window classes. Referring to FIG. 9, examples of each class of window are shown along with the corresponding window code. Representations of the chain codes generated for contour segments of continuation and creation windows are shown as arrows emanating from the windows. A chain-code list comprises a string of digits representing the shape of a contour. Each chain-code digit in the list represents a translation from one pixel on the contour to the next adjacent pixel. Referring briefly to FIG. 10, the contour segments in each window of data are initially assigned a chain code which is one of five vectors 4, 5, 6, 7 and 0 which are a subset of the well-known 8-direction chain-coding matrix. The chain-code vectors of FIG. 10 correspond with the arrows shown in FIG. 9, except for chain-code 4, a special case which will be explained later. These vectors correspond directionally with the scanning directions of the image acquisition element in that they proceed generally downward and toward the right. Countours with vertical inflections are interpreted as two contours joined at the inflection as illustrated in FIG. 9, classes 3 and 4. All of the 256 possible window patterns having a black center pixel are listed in TABLE II below in the order of the octal-coded 9-bit binary number corresponding with each window pattern. The class number of each window is listed in the second column of TABLE II; the class description of each window is listed along with the chain code(s) generated by contour continuations and creations. Chain codes which represent edges are denoted by an asterisk in TABLE II.

TABLE II
WINDOW DESCRIPTIONS AND CODES

| WINDOW CODE | WINDOW CLASS | CLASS DESCRIPTION | CHAIN CODE 1 | CHAIN CODE 2 |
|---|---|---|---|---|
| 400 | — | Dot | | |
| 401 | 1 | 1 Start | 0 | |
| 402 | 2 | 1 End | | |
| 403 | 1 | 1 Start | 0 | |
| 404 | 2 | 1 End | | |
| 405 | 0 | Continuation | 0 | |
| 406 | 2 | 1 End | | |
| 407 | 0 | Continuation | 0* | |
| 410 | 2 | 1 End | | |
| 411 | 0 | Continuation | 0 | |
| 412 | 4 | 2 End | | |
| 413 | 0 | Continuation | 0 | |
| 414 | 2 | 1 End | | |
| 415 | 0 | Continuation | 0 | |
| 416 | 2 | 1 End | | |
| 417 | 0 | Continuation | 0* | |
| 420 | 2 | 1 End | | |
| 421 | 0 | Continuation | 0 | |
| 422 | 4 | 2 End | | |
| 423 | 0 | Continuation | 0 | |
| 424 | 4 | 2 End | | |
| 425 | 5 | 1 Start; 2 End | 0 | |
| 426 | 4 | 2 End | | |
| 427 | 5 | 1 Start; 2 End | 0* | |
| 430 | 2 | 1 End | | |
| 431 | 0 | Continuation | 0 | |
| 432 | 4 | 2 End | | |
| 433 | 0 | Continuation | 0 | |
| 434 | 4 | 2 End | | |
| 435 | 5 | 1 Start; 2 End | 0 | |
| 436 | 4 | 2 End | | |
| 437 | 0 | Continuation | 0* | |
| 440 | 1 | 1 Start | 5 | |
| 441 | 3 | 2 Start | 0 | 5 |
| 442 | 0 | Continuation | 5 | |
| 443 | 3 | 2 Start | 0 | 5 |
| 444 | 0 | Continuation | 5 | |
| 445 | 6 | 2 Start; 1 End | 0 | 5 |
| 446 | 0 | Continuation | 5 | |
| 447 | 6 | 2 Start; 1 End | 0* | 5 |
| 450 | 0 | Continuation | 5 | |
| 451 | 6 | 2 Start; 1 End | 0 | 5 |
| 452 | 5 | 1 Start; 2 End | 5 | |
| 453 | 6 | 2 Start; 1 End | 0 | 5 |
| 454 | 0 | Continuation | 5 | |
| 455 | 6 | 2 Start; 1 End | 0 | 5 |
| 456 | 0 | Continuation | 5 | |
| 457 | 6 | 2 Start; 1 End | 0* | 5 |
| 460 | 2 | 1 End | | |
| 461 | 0 | Continuation | 0 | |
| 462 | 4 | 2 End | | |
| 463 | 0 | Continuation | 0 | |
| 464 | 4 | 2 End | | |
| 465 | 5 | 1 Start; 2 End | 0 | |
| 466 | 4 | 2 End | | |
| 467 | 5 | 1 Start; 2 End | 0* | |
| 470 | 2 | 1 End | | |
| 471 | 0 | Continuation | 0 | |
| 472 | 4 | 2 End | | |
| 473 | 0 | Continuation | 0 | |
| 474 | 4 | 2 End | | |
| 475 | 5 | 1 Start; 2 End | 0 | |
| 476 | 4 | 2 End | | |
| 477 | 0 | Continuation | 0* | |
| 500 | 1 | 1 Start | 6 | |
| 501 | 3 | 2 Start | 0 | 6 |
| 502 | 0 | Continuation | 6 | |
| 503 | 3 | 2 Start | 0 | 6 |
| 504 | 0 | Continuation | 6 | |
| 505 | 6 | 2 Start; 1 End | 0 | 6 |
| 506 | 0 | Continuation | 6 | |
| 507 | 6 | 2 Start; 1 End | 0* | 6 |
| 510 | 0 | Continuation | 6 | |
| 511 | 6 | 2 Start; 1 End | 0 | 6 |
| 512 | 5 | 1 Start; 2 End | 6 | |
| 513 | 6 | 2 Start; 1 End | 0 | 6 |
| 514 | 0 | Continuation | 6 | |
| 515 | 6 | 2 Start; 1 End | 0 | 6 |
| 516 | 0 | Continuation | 6 | |
| 517 | 6 | 2 Start; 1 End | 0* | 6 |
| 520 | 0 | Continuation | 6 | |
| 521 | 6 | 2 Start; 1 End | 0 | 6 |
| 522 | 5 | 1 Start; 2 End | 6 | |
| 523 | 6 | 2 Start; 1 End | 0 | 6 |
| 524 | 5 | 1 Start; 2 End | 6 | |
| 525 | 7 | 2 Start; 2 End | 0 | 6 |
| 526 | 5 | 1 Start; 2 End | 6 | |
| 527 | 7 | 2 Start; 2 End | 0* | 6 |
| 530 | 0 | Continuation | 6 | |
| 531 | 6 | 2 Start; 1 End | 0 | 6 |
| 532 | 5 | 1 Start; 2 End | 6 | |
| 533 | 6 | 2 Start; 1 End | 0 | 6 |
| 534 | 5 | 1 Start; 2 End | 6 | |
| 535 | 7 | 2 Start; 2 End | 0 | 6 |
| 536 | 5 | 1 Start; 2 End | 6 | |
| 537 | 6 | 2 Start; 1 End | 0* | 6 |
| 540 | 1 | 1 Start | 6 | |
| 541 | 3 | 2 Start | 0 | 6 |
| 542 | 0 | Continuation | 6 | |
| 543 | 3 | 2 Start | 0 | 6 |
| 544 | 0 | Continuation | 6 | |
| 545 | 6 | 2 Start; 1 End | 0 | 6 |
| 546 | 0 | Continuation | 6 | |
| 547 | 6 | 2 Start; 1 End | 0* | 6 |
| 550 | 0 | Continuation | 6 | |
| 551 | 6 | 2 Start; 1 End | 0 | 6 |
| 552 | 5 | 1 Start; 2 End | 6 | |
| 553 | 6 | 2 Start; 1 End | 0 | 6 |
| 554 | 0 | Continuation | 6 | |
| 555 | 6 | 2 Start; 1 End | 0 | 6 |
| 556 | 0 | Continuation | 6 | |
| 557 | 6 | 2 Start; 1 End | 0* | 6 |
| 560 | 0 | Continuation | 6* | |
| 561 | 6 | 2 Start; 1 End | 0 | 6* |
| 562 | 5 | 1 Start; 2 End | 6* | |
| 563 | 6 | 2 Start; 1 End | 0 | 6* |
| 564 | 5 | 1 Start; 2 End | 6* | |
| 565 | 7 | 2 Start; 2 End | 0 | 6* |
| 566 | 5 | 1 Start; 2 End | 6* | |
| 567 | 7 | 2 Start; 2 End | 0* | 6* |
| 570 | 0 | Continuation | 6* | |
| 571 | 6 | 2 Start; 1 End | 0 | 6* |
| 572 | 5 | 1 Start; 2 End | 6* | |
| 573 | 6 | 2 Start; 1 End | 0 | 6* |
| 574 | 0 | Continuation | 6* | |
| 575 | 6 | 2 Start; 1 End | 0 | 6* |
| 576 | 0 | Continuation | 6* | |
| 577 | 3 | 2 Start | 0* | 6* |
| 600 | 1 | 1 Start | 7 | |
| 601 | 1 | 1 Start | 0 | |
| 602 | 0 | Continuation | 7 | |
| 603 | 1 | 1 Start | 0 | |
| 604 | 0 | Continuation | 7 | |
| 605 | 0 | Continuation | 0 | |
| 606 | 0 | Continuation | 7 | |
| 607 | 0 | Continuation | 0* | |
| 610 | 0 | Continuation | 7 | |
| 611 | 0 | Continuation | 0 | |
| 612 | 5 | 1 Start; 2 End | 7 | |
| 613 | 0 | Continuation | 0 | |
| 614 | 0 | Continuation | 7 | |
| 615 | 0 | Continuation | 0 | |
| 616 | 0 | Continuation | 7 | |
| 617 | 0 | Continuation | 0* | |
| 620 | 0 | Continuation | 7 | |
| 621 | 0 | Continuation | 0 | |
| 622 | 5 | 1 Start; 2 End | 7 | |
| 623 | 0 | Continuation | 0 | |
| 624 | 5 | 1 Start; 2 End | 7 | |
| 625 | 5 | 1 Start; 2 End | 0 | |
| 626 | 5 | 1 Start; 2 End | 7 | |
| 627 | 5 | 1 Start; 2 End | 0* | |
| 630 | 0 | Continuation | 7 | |
| 631 | 0 | Continuation | 0 | |
| 632 | 5 | 1 Start; 2 End | 7 | |
| 633 | 0 | Continuation | 0 | |

TABLE II-continued
WINDOW DESCRIPTIONS AND CODES

| WINDOW CODE | WINDOW CLASS | CLASS DESCRIPTION | CHAIN CODE 1 | CHAIN CODE 2 |
|---|---|---|---|---|
| 634 | 5 | 1 Start; 2 End | 7 | |
| 635 | 5 | 1 Start; 2 End | 0 | |
| 636 | 5 | 1 Start; 2 End | 7 | |
| 637 | 0 | Continuation | 0* | |
| 640 | 3 | 2 Start | 5 | 7 |
| 641 | 3 | 2 Start | 0 | 5 |
| 642 | 6 | 2 Start; 1 End | 5 | 7 |
| 643 | 3 | 2 Start | 0 | 5 |
| 644 | 6 | 2 Start; 1 End | 5 | 7 |
| 645 | 6 | 2 Start; 1 End | 0 | 5 |
| 646 | 6 | 2 Start; 1 End | 5 | 7 |
| 647 | 6 | 2 Start; 1 End | 0* | 5 |
| 650 | 6 | 2 Start; 1 End | 5 | 7 |
| 651 | 6 | 2 Start; 1 End | 0 | 5 |
| 652 | 7 | 2 Start; 2 End | 5 | 7 |
| 653 | 6 | 2 Start; 1 End | 0 | 5 |
| 654 | 6 | 2 Start; 1 End | 5 | 7 |
| 655 | 6 | 2 Start; 1 End | 0 | 5 |
| 656 | 6 | 2 Start; 1 End | 5 | 7 |
| 657 | 6 | 2 Start; 1 End | 0* | 5 |
| 660 | 0 | Continuation | 7 | |
| 661 | 0 | Continuation | 0 | |
| 662 | 5 | 1 Start; 2 End | 7 | |
| 663 | 0 | Continuation | 0 | |
| 664 | 5 | 1 Start; 2 End | 7 | |
| 665 | 5 | 1 Start; 2 End | 0 | |
| 666 | 5 | 1 Start; 2 End | 7 | |
| 667 | 5 | 1 Start; 2 End | 0* | |
| 670 | 0 | Continuation | 7 | |
| 671 | 0 | Continuation | 0 | |
| 672 | 5 | 1 Start; 2 End | 7 | |
| 673 | 0 | Continuation | 0 | |
| 674 | 5 | 1 Start; 2 End | 7 | |
| 675 | 5 | 1 Start; 2 End | 0 | |
| 676 | 5 | 1 Start; 2 End | 7 | |
| 677 | 0 | Continuation | 0* | |
| 700 | 1 | 1 Start | 6 | |
| 701 | 3 | 2 Start | 0* | 6* |
| 702 | 0 | Continuation | 6 | |
| 703 | 3 | 2 Start | 0* | 6* |
| 704 | 0 | Continuation | 6 | |
| 705 | 6 | 2 Start; 1 End | 0* | 6* |
| 706 | 0 | Continuation | 6 | |
| 707 | 0 | Continuation | 6* | |
| 710 | 0 | Continuation | 6 | |
| 711 | 6 | 2 Start; 1 End | 0* | 6* |
| 712 | 5 | 1 Start; 2 End | 6 | |
| 713 | 6 | 2 Start; 1 End | 0* | 6* |
| 714 | 0 | Continuation | 6 | |
| 715 | 6 | 2 Start; 1 End | 0* | 6* |
| 716 | 0 | Continuation | 6 | |
| 717 | 0 | Continuation | 6* | |
| 720 | 0 | Continuation | 6 | |
| 721 | 6 | 2 Start; 1 End | 0* | 6* |
| 722 | 5 | 1 Start; 2 End | 6 | |
| 723 | 6 | 2 Start; 1 End | 0* | 6* |
| 724 | 5 | 1 Start; 2 End | 6 | |
| 725 | 7 | 2 Start; 2 End | 0* | 6* |
| 726 | 5 | 1 Start; 2 End | 6 | |
| 727 | 5 | 1 Start; 2 End | 6* | |
| 730 | 0 | Continuation | 6 | |
| 731 | 6 | 2 Start; 1 End | 0* | 6* |
| 732 | 5 | 1 Start; 2 End | 6 | |
| 733 | 6 | 2 Start; 1 End | 0* | 6* |
| 734 | 5 | 1 Start; 2 End | 6 | |
| 735 | 7 | 2 Start; 2 End | 0* | 6* |
| 736 | 5 | 1 Start; 2 End | 6 | |
| 737 | 0 | Continuation | 6* | |
| 740 | 1 | 1 Start | 6 | |
| 741 | 3 | 2 Start | 0* | 6* |
| 742 | 0 | Continuation | 6 | |
| 743 | 3 | 2 Start | 0* | 6* |
| 744 | 0 | Continuation | 6 | |
| 745 | 6 | 2 Start; 1 End | 0* | 6* |
| 746 | 0 | Continuation | 6 | |
| 747 | 0 | Continuation | 6* | |
| 748 | 0 | Continuation | 6 | |
| 751 | 6 | 2 Start; 1 End | 0* | 6* |
| 752 | 5 | 1 Start; 2 End | 6 | |
| 753 | 6 | 2 Start; 1 End | 0* | 6* |
| 754 | 0 | Continuation | 6 | |
| 755 | 6 | 2 Start; 1 End | 0* | 6* |
| 756 | 0 | Continuation | 6 | |
| 757 | 0 | Continuation | 6* | |
| 760 | 0 | Continuation | 6* | |
| 761 | 0 | Continuation | 0* | |
| 762 | 5 | 1 Start; 2 End | 6* | |
| 763 | 0 | Continuation | 0* | |
| 764 | 5 | 1 Start: 2 End | 6* | |
| 765 | 5 | 1 Start; 2 End | 0* | |
| 766 | 5 | 1 Start; 2 End | 6* | |
| 767 | 4 | 2 End | | |
| 770 | 0 | Continuation | 6* | |
| 771 | 0 | Continuation | 0* | |
| 772 | 5 | 1 Start; 2 End | 6* | |
| 773 | 0 | Continuation | 0 | |
| 774 | 0 | Continuation | 6* | |
| 775 | 0 | Continuation | 0* | |
| 776 | 0 | Continuation | 6* | |
| 777 | — | Blank | | |

The window data items are handled generally by assigning chain-code digits in accordance with the stored data as listed in TABLE II, and sorting the chain-code digits into lists. The digits accumulated in each list represent the chain code for one contour in the image being scanned. The digits are assigned to lists by their order of occurrence along each raster of data; the relative order of the lists being changed when an intersection, branch, or completion of a contour occurs. Instructions for reordering the chain-code lists are contained in the software modules associated with each of the classes as described hereinafter.

The software is partitioned into two parallel tasks. One task is interrupt driven from the control hardware and controls the stepper motor, thus positioning the CCD linear array. The second and primary software task transforms the window data from the window processor into a series of lists encoding the lines and edges of the scanned image. The X-coordinate along the current raster of a window is also supplied by the control logic. The Y-coordinate is maintained in the software by counting the number of raster processed. The X-Y coordinate pair designates the origin of a contour. Chain-code lists are built for successive rasters by ordering the lists left to right in the same order as the lines and edges crossing the current raster in a scan. Thus, for each window corresponding with a contour crossing the raster, the appropriate chain code for that window is appended to the end of the corresponding chain-code list. Different classes of windows may call for creating one or two chain-code lists, deleting one or two lists, or any combination of these actions. One window class, the continuation, is by far the most common class encountered in a typical image, and merely adds another chain code to the appropriate list.

Referring now to FIGS. 11 and 12, an analogy of the process of list manipulation of the instant invention is illustrated wherein a "chute" 160 is positioned over a first one 162 of many ordered "bins" 161–166. The bins 161, 163 shown with dashed lines represent lists which have been previously removed from the active ordered list of bins as will be explained later. The upper portion of FIG. 11 represents a plurality of rasters of data such as the rasters 168, 171, 174 having six interconnected contours 161'–166' represented as chain-code vectors which have been stored previously in the bins 161–166. The bins 161–166 represent lists in the microcomputer store. Each line segment forming the contours 161'–166' of FIG. 11 is annotated with the associated chain-code number. Intermediate point or pixels on a contour are shown as dots; the start of each contour is shown as an open dot. The contours 161'–166' are representative of the bit-map image shown in FIG. 12. The lower-most raster 174 represents the raster currently being processed; subsequent rasters are not shown. The state of the process is described by a list called the bin list which is initially empty. Each element of the list represents one contour that crosses the raster being processed. The order of elements in the list corresponds with the left-to-right order of contours crossing the raster currently being processed. When the first contour 162' crossing the current raster 174 is encountered, (pixel 176) a chain code 6 is dropped down the chute 160 into the bin 162, representing storage of the chain code in a list. The chute 160 is then advanced to the next bin 164 to await the next contour crossing as illustrated by the chute 160' in dashed lines. Consider now that the next window 178' on the raster represents a contour creation. The new contour 178' lies on the current raster 174 to the left of the contour 164' stored in the bin 164 under the current chute. Similarily, the new contour 178' must be located to the right of the contour 162' previously processed. Therefore, a new bin 178 must be created and inserted before the bin 164 under the chute 160', and the chute then repositioned over the new bin 178 for depositing the first chain code of the new contour 178'. Only windows which are a continuation class can be stored in an existing bin. Therefore, a creation-class window which represents the start of a new contour must lie somewhere to the left of the current bin as marked by the chute. Similarily, if a completion-class window is encountered, the bin being completed must be under the chute. Continuing the analogy, when a completion-class window is encountered, instead of dropping a chain code into the bin, a "lid" is dropped sealing the current bin and removing it from the bin list, as illustrated in FIG. 11 by the bins 161, 163 shown in dashed lines previously deleted from the active bin list when the corresponding contours 161', 163' were completed.

One window may require a combination of actions, e.g., a class 6 window 180 at the juncture of three contours 163'–165' called for double contour creation and single contour completion, i.e., the then current bin 163 was deleted and two new bins 164,165 were inserted into the bin list.

Three pointers or markers, LEFT, RIGHT and CURRENT, are used to control the bin list and are represented in FIG. 11 as flags labeled, respectively L, R and C. The LEFT marker points to the left-hand bin or beginning of the list, the RIGHT marker to the right-hand bin or end of the list, and the CURRENT marker to the chute, the latter marking the position in the list where raster processing is being done. Each element of the bin list is itself a list of chain codes. The chain codes alone are only a measure of the shape of a contour; therefore, the chain-code lists include the absolute X-Y coordinate pair which defines the starting point of the contour on the bit-map image, or the location where the chain-code list defining the contour was created.

Each of the 256 windows uniquely defines which chain codes, if any, are to be listed or stored in a bin. For example, the $401_8$ window, FIG. 9, class one, defines the beginning of a contour with the first chain code being 0. Assume that a second window, the $620_8$ window, FIG. 9, class 0, appears adjacent and to the right of the $401_8$ window, and overlapping the right-hand two-thirds of the $401_8$ window. These two windows, in succession, define a chain-code list comprising the codes 0, 7. Windows which create two contours define two chain codes; for example, the $640_8$ window, FIG. 9, class 3, defines the chain codes 5 and 7, each representing the start of a new contour.

Figure 13:
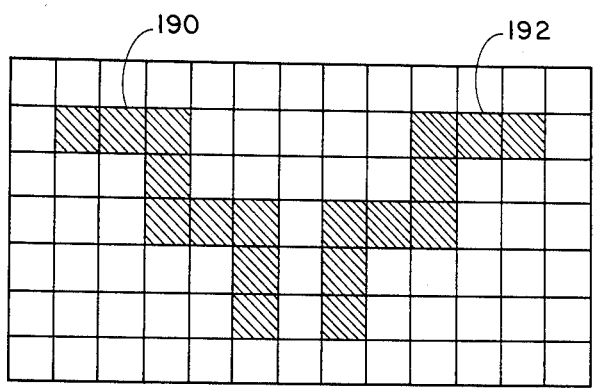
FIG. 13 is a portion of a bit map utilized to explain a feature of the instant invention.

As previously described, the state of the process of the instant invention is defined by the bin list and the pointers LEFT, RIGHT, and CURRENT. Referring again to FIG. 11, two additional elements utilized to maintain the lists are a special-mode bistable or flag 182 and a reverse stack (RS) 184 which is a last-in, first-out (LIFO) store. The reverse stack 184 and the special-mode flag are utilized to augment the listing of positively sloped contours. Referring to FIG. 13, in conjunction with FIG. 11 a negatively sloped line 190 is scanned left-to-right and top-to-bottom to produce a class 1 single creation window $401_8$ followed by a string of continuation windows $621_8$, $520_8$, $714_8$, $405_8$, $631_8$, $520_8$, $514_8$ and a single completion window $404_8$ forming one chain-coded contour 00660066. A positively sloped line 192 on the other hand, generates a sequence of two-start and two-end windows: $501_8$, $461_8$, $420_8$, $546_8$, $501_8$, $463_8$, $424_8$, $506_8$, and $404_8$, resulting in four contours each having two chain codes. Positively sloped lines could thus potentially generate many very short contours instead of one long contour as in negatively sloped lines. The chain-code accumulating algorithm modifies the listing of positively sloped contours by postponing the actual start of two lists when a class 3, two-start window having a horizontal rightgoing segment such as the $501_8$ window (see FIG. 9) is encountered. This tranformation is implemented by using the reverse stack 184 to accumulate and reverse the horizontal portion of the contour for subsequent listing. Considering for example the $501_8$ window, the first chain code pushed onto the reverse stack corresponds with the left-hand, down-going vector of that window, which chain code is pushed onto the stack as it normally would be stored in a bin, as the chain code 6. The horizontal element of the $501_8$ window is then reversed (by adding 4 mod 8) and pushed onto the stack as the chain code 4. Each successive horizontal continuation is likewise reversed and pushed onto the stack until a non-horizontal code or a window which is not a continuation class is encountered, either of which events terminates the special mode. When a special-mode terminator is encountered, a subroutine UNWIND is called to build a chain-code list by storing the contents of the reverse stack in the list, reversing the order of the chain in the process. Thus, referring still to FIG. 13, the first two windows $501_8$ and $461_8$ of the positively sloped contour 192 which where initially stored in the reverse stack as chain codes 6,4,4 are listed as 4,4,6. The new bin may be appended to an existing bin depending upon the configuration of the terminating window. The entire positively-sloped contour 192 of FIG. 13, is thus stored as chain codes 44664466. Referring to FIG. 11, the left-hand contour 162' illustrated as being stored in the LEFT bin 162 is comprised of a segment 194 which was initially stored in the reverse stack 184. The contour segment 194 originated at a class 3 two-start pixel 196 and was pushed onto the reverse stack 184 as chain codes 5,4,4. Subsequently, upon termination of the special mode, the line segment 194 was popped from the reverse stack 184 and stored as chain codes 4,4,5 in the bin 162. The special mode can be terminated by a class 0 non-horizontal window, or by any class 2,4,5,6 or 7 window.

Figure 14:
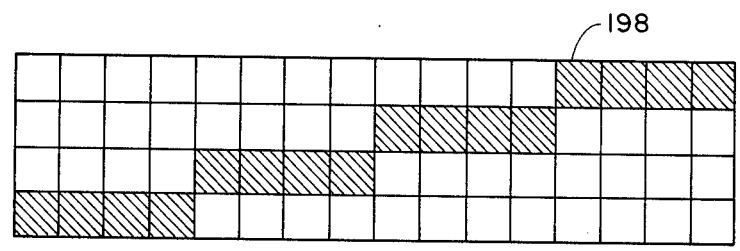
FIG. 14 illustrates the steps of conversion of data from a bit map, to a chain-coded contour, and then to a vectorial representation of the bit-map image.

The chain-code lists are a compact, accurate representation of the edge and line contours of a bit map, and represent a one-to-one translation of the image, but not an abstraction thereof. An abstract representation, i.e., vectors, is a close approximation of the chain codes. Accordingly, as each chain-code list representing one contour is completed, the list is converted to vectors, thereby further compressing the original image data. For example, referring to FIG. 14, an original image of a contour is represented by a bit map 198 which is converted to a chain-code representation 200 forming a list 444544454445444. The initial software description of the image in the picture coding system of the instant invention is in the form of such chain-code lists. When the contour is terminated, the list is passed to a program segment LINE FINDER which converts the list to vectors such as the vector 202.

Figure 15:
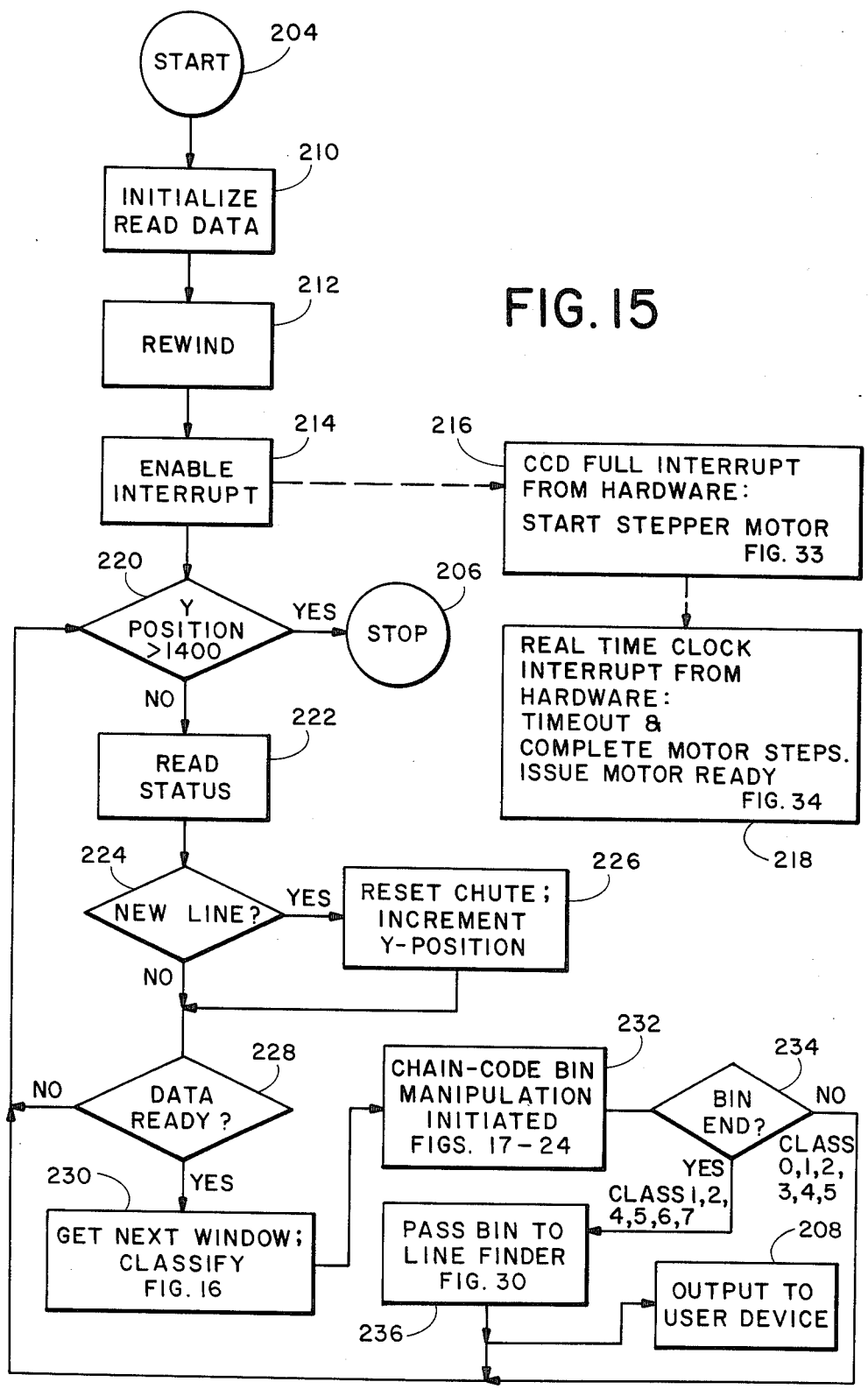
FIG. 15 is a general flow diagram of the microcomputer implemented portion of the process in accordance with the instant invention.

The currently described embodiment of the invention is implemented in part in the microcomputer 30 software which is listed herein in Appendix I. The software listing of Appendix I is written in UCSD Pascal language. The Pascal language is well known in the art and no detailed explanation thereof is included herein; see *Quick Pascal* by D. L. Matuszek, Wiley 1982. The microcomputer implemented portion of the process of the instant invention is described with reference to FIGS. 15–34 which are flow diagrams showing the structure and general sequence of operations of the Appendix I listing. Referring to FIG. 15 which should be viewed during the description in conjunction with FIGS. 2 and 8, an overview of the process of the instant invention is shown wherein one document is scanned and encoded between the START 204 and STOP 206 designators, the encoded document being output to a user device as represented by block 208. The process is initialized, block 210, on power up or reset by reading program data into the microcomputer 30 and initializing the state control logic 100 as previously described with reference to FIG. 8. A rewind procedure, block 212, returns the CCD carriage 42 to a reference position for starting a scan of the document, and interrupts are enabled, block 214. Dashed lines connecting the interrupt enable block 214 with blocks 216, 218, the motor 44 stepping routines, indicate that the block 216, 218 operations are interrupt driven and operate in a multiprogramming mode in parallel with the contour processing routines represented by the remainder of the FIG. 15 flow diagram. The CCD full interrupt handler, block 216, initiates stepping of the stepper motor 44, and enables the real-time clock interrupt handler, block 218. The latter, in response to interrupt signals from the master clock 106, times the motor movements, initiates additional motor steps and issues the MOTOR READY signal when the motor has moved the CCD array into position for acquiring the next valid raster of data.

Returning to the main program, decision block 220, when the Y-position count maintained by the software reaches 1400, the entire document has been scanned, i.e., 1400 rasters acquired, and the process stops 206. If the Y-position is less than 1400, the program proceeds to block 222 and reads the status register of the state control logic to determine if processing can proceed. Conditions such as LIGHT ON (document-illuminating lamps 36) and CARRIAGE END are monitored, as well as process events such as NEW LINE, block 224, and DATA READY, block 228. If the NEW LINE condition is asserted by the state control logic, the software resets the chute or CURRENT bin pointer, block 226, to the LEFT bin and increments the Y-position count. If the DATA READY signal is asserted, the program fetches the next window of data from the window data store 104 or from the FIFO queue previously described, and classifies the new window of data, block 230. Bin manipulation operations are initiated in block 232, i.e., new bins are created, if required; chain codes corresponding with contour segments represented by the window of data classified in block 230 are stored in the appropriate bin of the bin list; and other bin manipulations are initiated in accordance with the class of the window. During bin manipulation, if a contour termination or bin end occurs, block 234, the completed contour is passed to the LINE FINDER subroutine, block 236, output is generated as indicated by block 208, and the program returns to the start of the loop at decision block 220. A bin end may occur in a class 1, 2 or 4–7 window, if there is no bin end, as may be the case in a class 0–4 or 6 window, then control passes directly to block 220. In each of the blocks 216, 218, 230, 232, 236 of FIG. 15, other figures of the drawing are noted to which reference is made infra in a more detailed description of certain of the operations described generally with reference to FIG. 15; the convention is utilized throughout the description of the flow diagrams.

Figure 16:
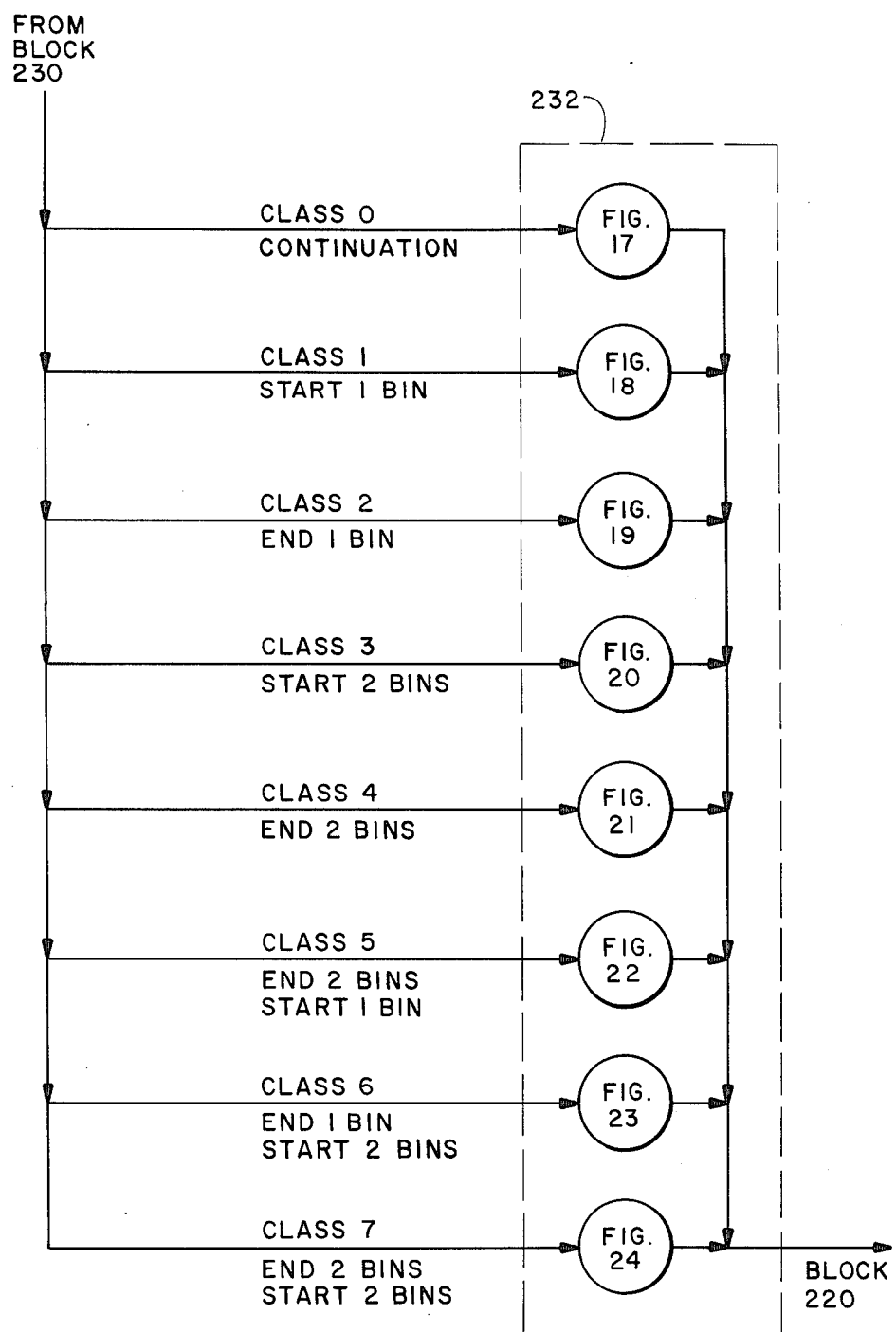

Referring to FIGS. 15 and 16, block 230, a window of data is classified according to one of eight classes 0–7 as shown. Chain codes are inserted into bins or chain-code lists where required in accordance with the class of the window, and lists manipulated accordingly. Subroutines performing operations associated with each of the eight classes of window data are described with reference to FIGS. 17–24. FIGS. 25–29, 30, 31 and 32 describe open subroutines called either by the class 0–7 subroutines of FIGS. 17–24 or by another one of the open subroutines, or both. In FIGS. 25–29, 30, and 31–34, the circled symbol "R" means a conventional return to control to the calling program or subroutine. In Pascal, control conventionally returns to the calling program or subroutine upon completion of the procedure or function comprising a sequence of statements enclosed by the "fat parentheses," BEGIN . . . END; there is no explicit RETURN statement in Pascal. For example, in FIG. 17, block 254 includes a single call of the subroutine NEWBIN, FIG. 26, after the execution of which control is returned to block 256. Block 256 includes two successive calls of the subroutine INSERT, FIG. 27. After the first call and execution of the subroutine INSERT, control is returned to block 256; after the second, to block 258.

Figure 17:
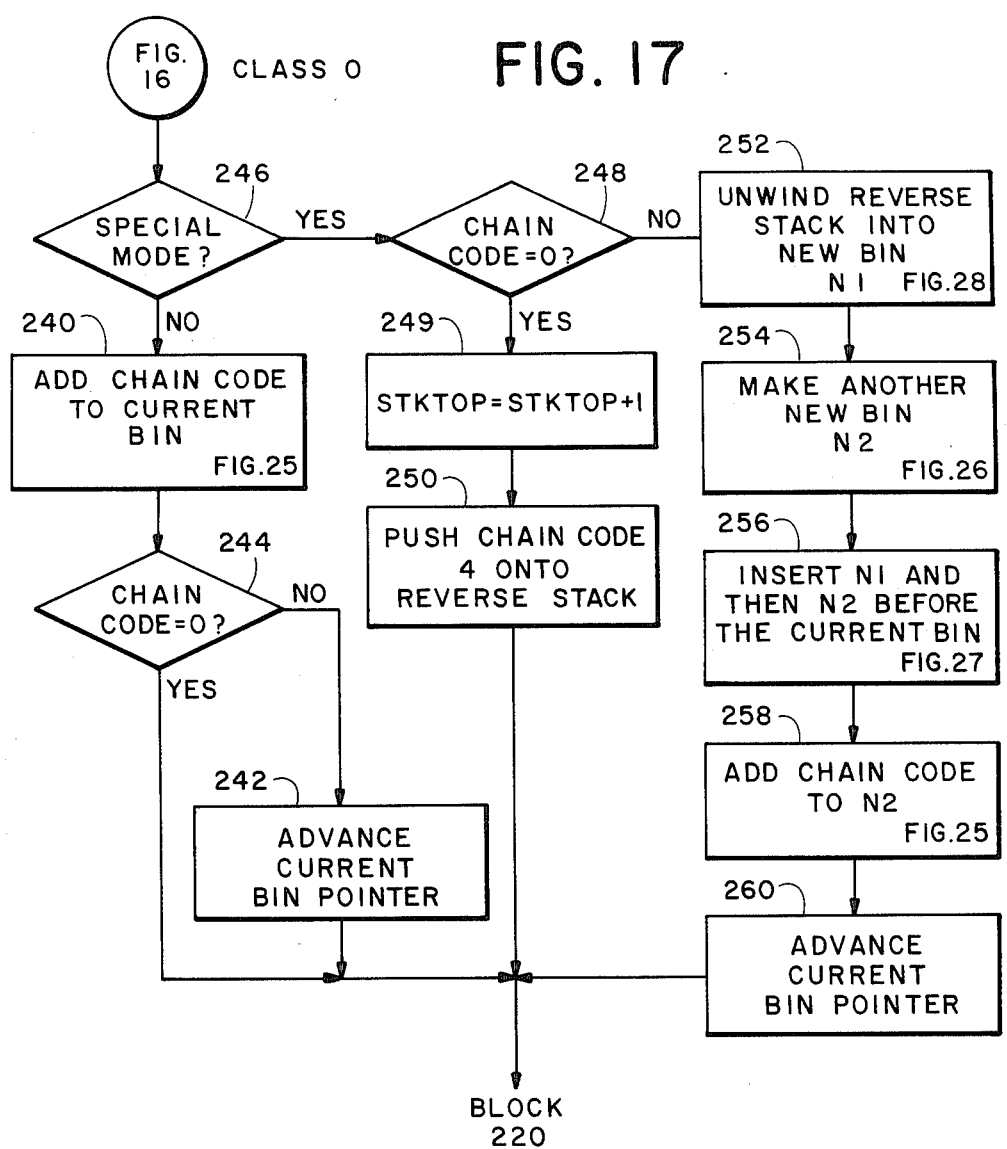

Referring to FIG. 17, a class 0 continuation window normally adds a chain code to the CURRENT bin, block 240, and then advances the CURRENT bin pointer to the next bin, block 242. An example of the foregoing operation is illustrated in FIG. 11 by the storage of the pixel 240' in the bin 164. If the chain code being stored represents a horizontal line, decision block 244, i.e., the chain code is 0, then the CURRENT bin pointer is not advanced because the next pixel will be a part of the same contour and will be stored in the same bin. An example of the foregoing operation is seen in FIG. 11 as storage of the pixel 244'. If the special mode flag is enabled, decision block 246, and the line segment is horizontal, decision block 248, a pointer STKTOP which addresses the next available storage location of the LIFO reverse stack RS is incremented by one, block 249, and the program pushes a chain code 4 onto the reverse stack, block 250. An example of the foregoing in FIG. 11 is the pixel 250'. The NO branch from the decision block 248 indicates that a special mode terminator has been encountered. The program responds, block 252, by unwinding the reverse stack into a new bin N1, making another new bin, block 254, inserting the new bin N1 and then the new bin N2 before the CURRENT position in the bin list, block 256, and adding the chain code to the new bin N2 which became the CURRENT bin when it was inserted into the bin list. Finally, in block 260, the CURRENT bin pointer is advanced to the next bin.

Figure 18:
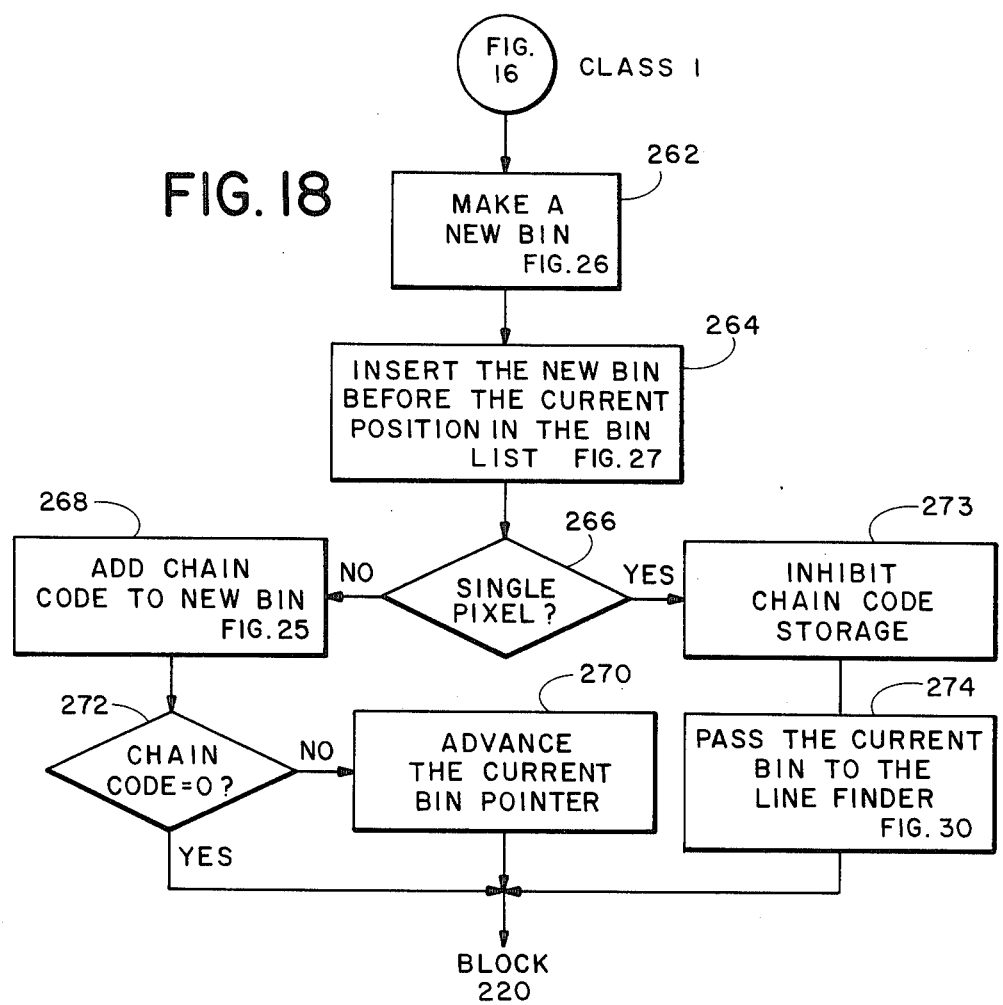

Referring to FIG. 18, the processing of a class 1, one-start window begins, block 262, by making a new bin and then inserting the new bin before the CURRENT position in the bin list, block 264. If the window is not a single pixel, decision block 266, the chain code is added to the new bin, block 268; the CURRENT bin pointer is advanced to the next bin, block 270, if the chain code is not horizontal, decision block 272. An example of the foregoing in FIG. 11 is the pixel 268' which is a $440_8$ window. If the window is a single pixel, decision block 266, i.e., a $400_8$ window, it is handled as a special case of the class 1, one-start window by inhibiting chain-code storage and sending the bin to the LINE FINDER, block 274.

Figure 19:
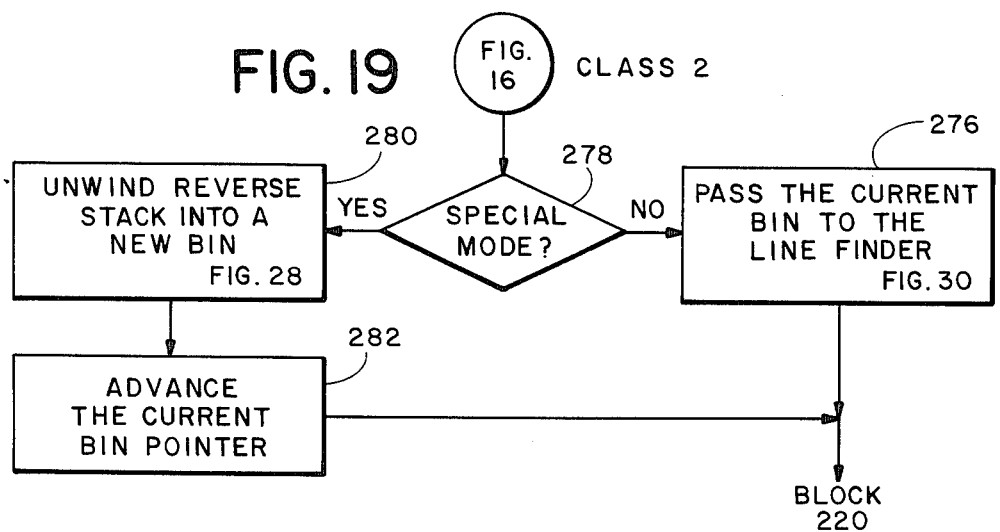

Referring to FIG. 19, a class 2 single contour termination window is handled simply by sending the CURRENT bin to the LINE FINDER, block 276, if the special mode is not enabled, block 278. If the special mode is enabled, the reverse stack unwinds into a new bin, block 280, and the CURRENT bin pointer is advanced to the next bin, block 282.

Referring now to FIG. 20, a class 3, two-start window enables the special mode flag when the chain code of the right-hand line segment of the window is 0 indicating a horizontal line segment, decision block 284. To set the special mode, the reverse stack is cleared, block 286, the left-hand code of the window is pushed onto the stack and the right-hand or horizontal contour segment is reversed by adding 4 mod 8 and pushed onto the stack as chain code 4, block 288. The special mode flag is then enabled, block 290. An example of special mode iniation is seen in FIG. 11 wherein the pixel 196 is pushed onto the reverse stack as chain codes 5, 4, and appropriately, the special-mode flag 182 is raised. Continuing with FIG. 20, if the right-hand code of the class 3, two-start window is not horizontal, block 284, the program makes a first new bin N1, block 292; inserts the new bin N1 before the CURRENT bin, block 293; adds the left-hand chain code to the N1 bin, block 294; and advances the CURRENT bin pointer to the next bin, block 296. A second new bin N2 is created, block 298, and inserted before the CURRENT bin, block 299; the right-hand chain code is added to the N2 bin, block 300; and the CURRENT bin pointer advanced to the next bin, block 302. Thus two new lists are created and the chain codes for the 2-start window stored therein.

Referring to FIG. 21, for a class 4, double contour termination not in special mode, decision block 304, the terminated contours are passed to the LINE FINDER subroutine, blocks 306, 308. If the special mode is enabled, the reverse stack unwinds into a new bin, block 310, and the new bin is appended to the next bin in the bin list, block 312. The CURRENT bin, i.e., the bin into which the reverse stack was unwound is deleted from the bin list, block 314, the contents thereof having been stored in the next bin, and the CURRENT bin pointer is then advanced to that next bin, block 316.

Referring now to FIG. 22, for a class 5, single contour creation, double contour termination window, a new bin N1 is first created for the new contour, block 318. If the special mode is not enabled, decision block 320, the two terminated contours are passed to the LINE FINDER subroutine, blocks 322, 324, the new bin N1 is inserted before the CURRENT bin in the bin list, block 326, and the chain code of the new contour is stored in the new bin which in the INSERT subroutine became the CURRENT bin, block 328. If the special mode is enabled, the reverse stack unwinds into a new bin N2, block 330, the CURRENT bin pointer is advanced, block 332, and the CURRENT bin which is the single termination contour is passed to the LINE FINDER subroutine, block 334. The new bin N1 is then inserted before the CURRENT bin, block 326, and the chain code for the new contour added to N1, block 328.

Figure 23:
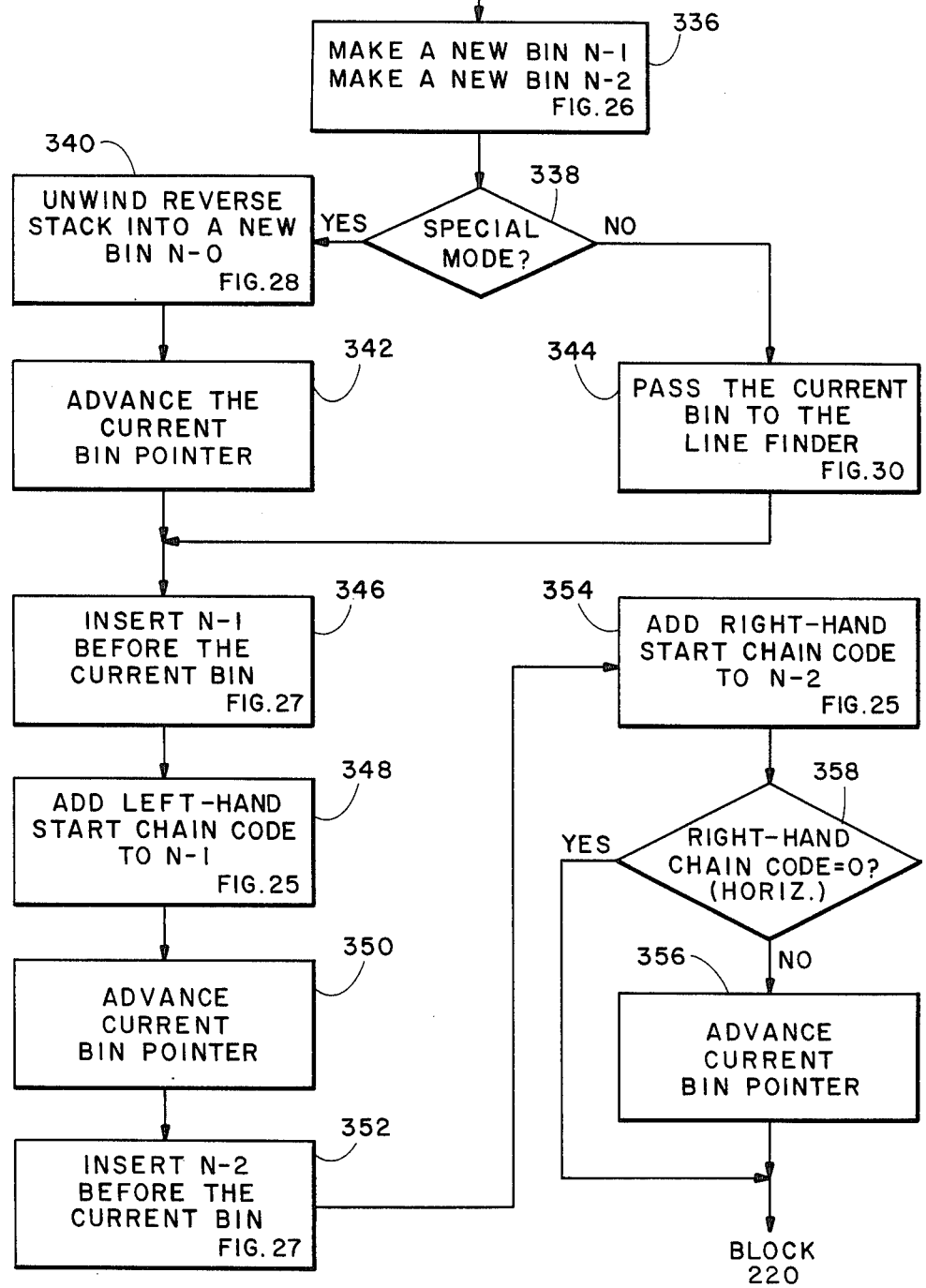

Referring to FIG. 23, for a class 6, 2-start, 1-end window, the program first makes two new bins N1 and N2, block 336. At this time the new bins N1 and N2 are only allocated but not connected, i.e., not inserted into the bin list. If special mode is enabled, decision block 338, the program unwinds the reverse stack into another new bin N0, block 340, and advances the CURRENT bin pointer to the next bin, block 342. If the special mode is not enabled, the CURRENT bin is passed to the LINE FINDER subroutine, block 344. The new bin N1 is inserted before the CURRENT bin, block 346, the left-hand chain code forming one of the new contours is added to N1, block 348, and the CURRENT bin pointer is advanced to the next bin, block 350. The new bin N2 is then inserted in the list before the CURRENT bin, block 352, the right-hand chain code which starts one of the new contours is then added to N2, block 354, and the CURRENT bin pointer is advanced block 356, if the chain code stored in the new bin N2 does not represent a horizontal line segment, decision block 358. It is noted that the CURRENT bin pointer is always advanced after the first chain code is stored in bin N1 because the first chain code cannot be 0, i.e., a horizontal line. With the special mode enabled in class 6 and assuming that only two bins, LEFT and RIGHT, were inserted in bin list prior to creation of the new bins N0, N1, N2, the order of bins in the list after processing the class 6 window would be: LEFT, N0, N1, N2, RIGHT, with the CURRENT bin pointer pointing either to N2 or to RIGHT, depending on whether or not the right-hand code was 0.

Figure 24:
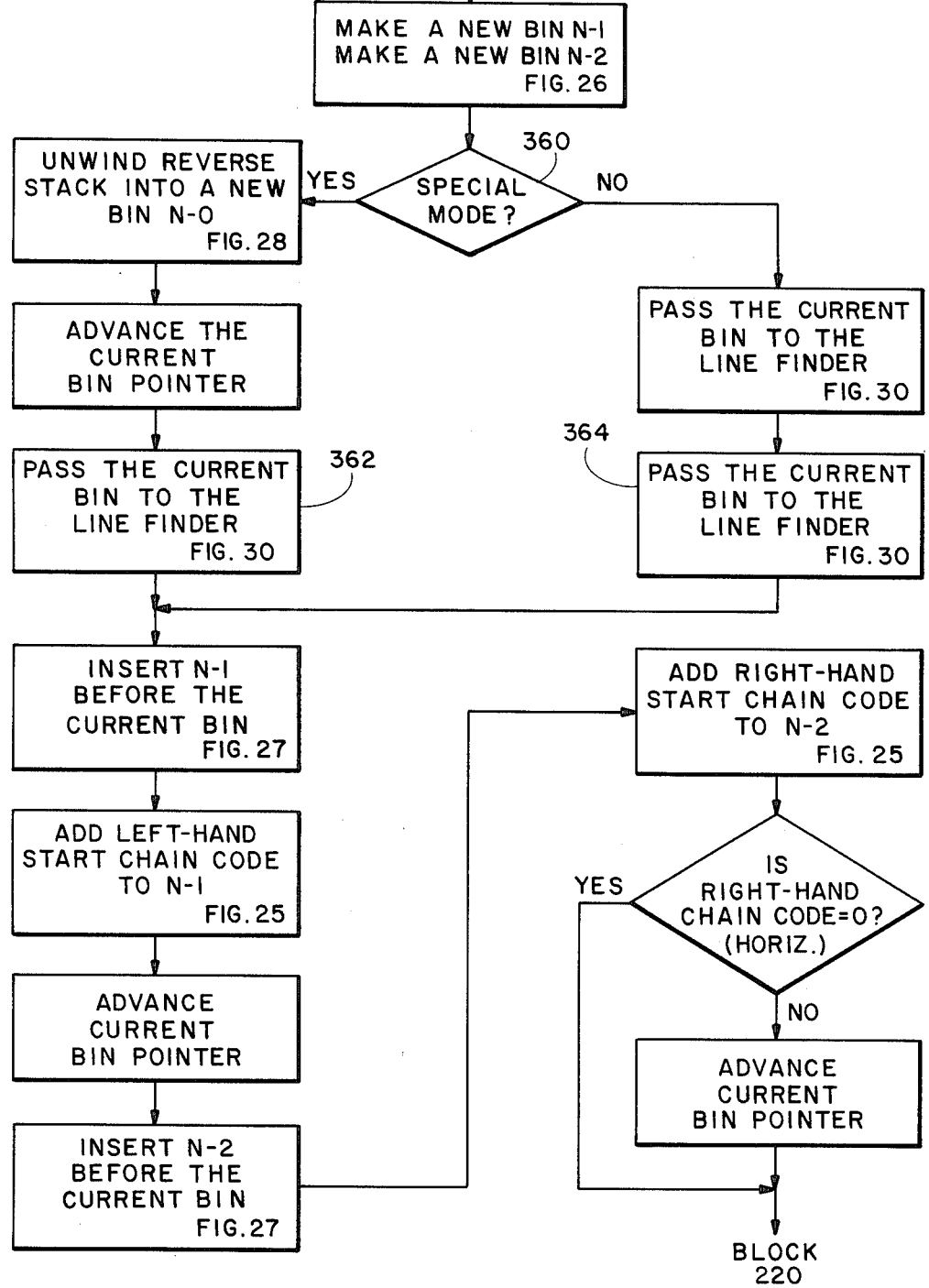

Referring to FIG. 24, the class 7, 2-start, 2-end window subroutine is identical with the class 6 subroutine, FIG. 23, except that in each branch of the subroutine following the special mode decision block 360 an additional bin having a terminated contour is passed to the LINE FINDER, blocks 362, 364.

As previously described, the bin is a data structure used to repesent a contour of an image acquired from a document. When a contour is completely acquired, the contents of the bin are converted to vectorial data, transmitted to a user device, and the bin deleted. The data structure of the bin is as follows:

TYPE
  BIN=RECORD
    NEXT:  BIN;
    LAST:  BIN;

ID: INTEGER;
XSTART: INTEGER;
YSTART: INTEGER;
FIRSTBUF: BUFFER;
LASTBUF: BUFFER;

NEXT is a pointer to the next bin, i.e., the bin to the right on the picture; LAST is a pointer to the last bin in the list. NEXT and LAST are NIL if there is no next or last bin. ID is a unique integer identification of the bin; XSTART and YSTART are the X and Y coordinates of the window that created the bin; and FIRSTBUF and LASTBUF are pointers to the first and last chain-code buffers in the bin. The bin list may include a plurality of bins in a doubly-threaded structure.

A "buffer" is a storage element in a bin for storing chain codes. A bin comprises one or more buffers, each buffer having locations for storing 18 chain codes, plus storage locations for buffer pointers and descriptors. A bin may be comprised of a plurality of buffers (FP) in a doubly-threaded structure. The data structure of a chain-code buffer is as follows:

TYPE
    BUFFER=RECORD
        NEXT, BUFFER;
        LAST: BUFFER;
        NUMUSED: INTEGER;
        CODES: ARRAY [0 . . . 17] OF CHAR

NEXT is a pointer to the next buffer in the bin, or NIL; LAST is a pointer to the last buffer in the bin, or NIL, NUMUSED is the number of chain codes stored in the buffer; and CODES is the array of chain codes, in ascending order, stored in the buffer. BP and FP are alternative forms, respectively, of the terms BIN and BUFFER.

Figure 25:
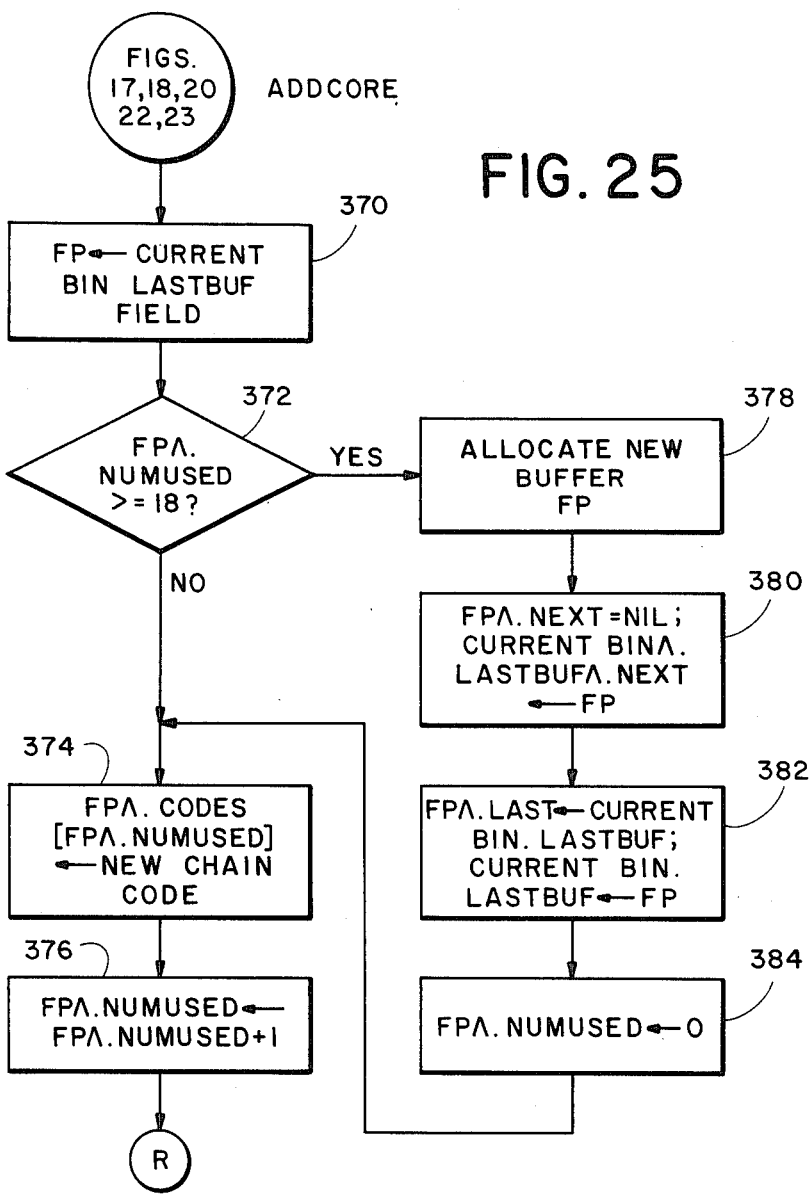

Referring now to FIG. 25, the ADDCODE subroutine takes a chain code as an argument and appends that chain code to the CURRENT bin. Block 370 gets the address of the last buffer of the CURRENT bin. The decision block 372 asks if all of the chain-code storage locations in the buffer have been used. If not, block 374, the program stores the new chain code in the array location addressed in block 370 and increments the NUMUSED field by 1, block 376. If all 18 storage locations of the buffer have been used, a new buffer must be allocated, block 378, and appended to the list as the last buffer, blocks 380, 382. In block 384, the NUMUSED field of the new buffer is set to zero, and the new chain code is stored in the data array CODES of the newly allocated buffer, block 374.

Four bin manipulation subroutines are called by the window handling routines, viz.: NEWBIN, INSERT, UNWIND and DELETE. NEWBIN crestes a new chain-code bin; INSERT threads the new bin into the bin list; UNWIND completes the two-start backtracking procedure; and DELETE removes a chain-code bin from the bin list.

Figure 26:
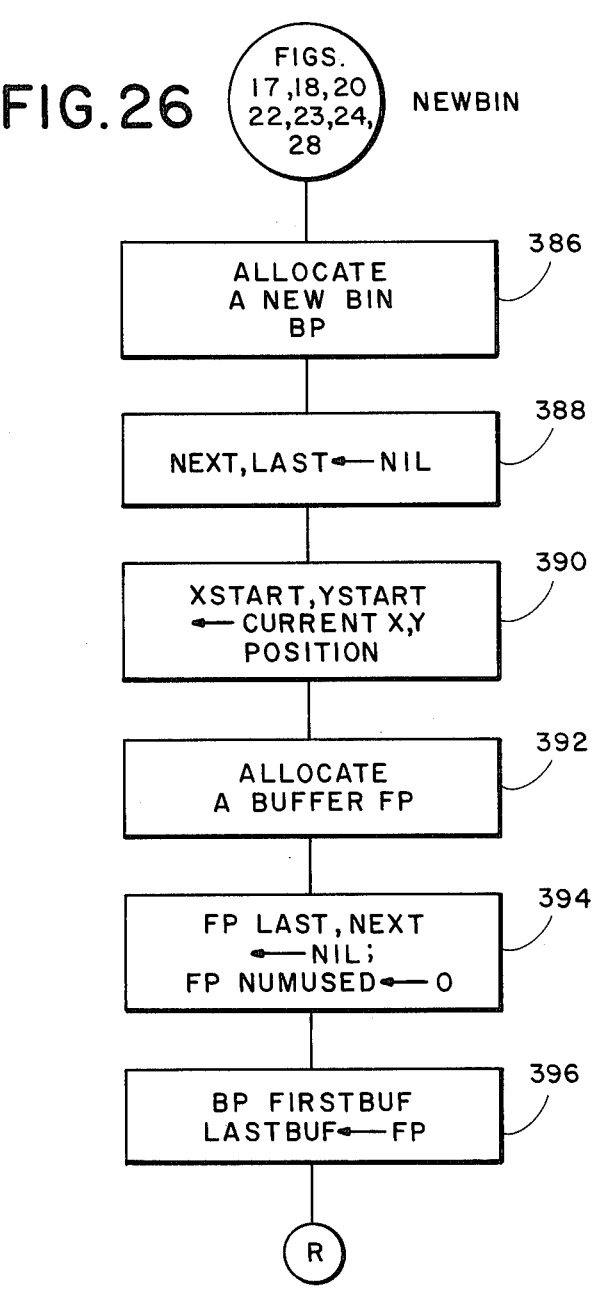

Referring to FIG. 26, the NEWBIN subroutine, block 386, allocates a new chain-code bin. In block 388, the NEXT and LAST pointers are set to NIL which indicates that the new bin is not threaded into the bin list. In block 390, the X and Y coordinate storage locations are set to a current value from variables kept in the main program, effectively locating the starting point of a new contour. A new buffer is allocated in block 392 but not threaded into the list, the LAST and NEXT pointers of the buffer being set to NIL, block 394. The NUMUSED field of the new buffer is set to zero, block 394, and the new bin is pointed at the newly allocated buffer, block 396.

Figure 27:
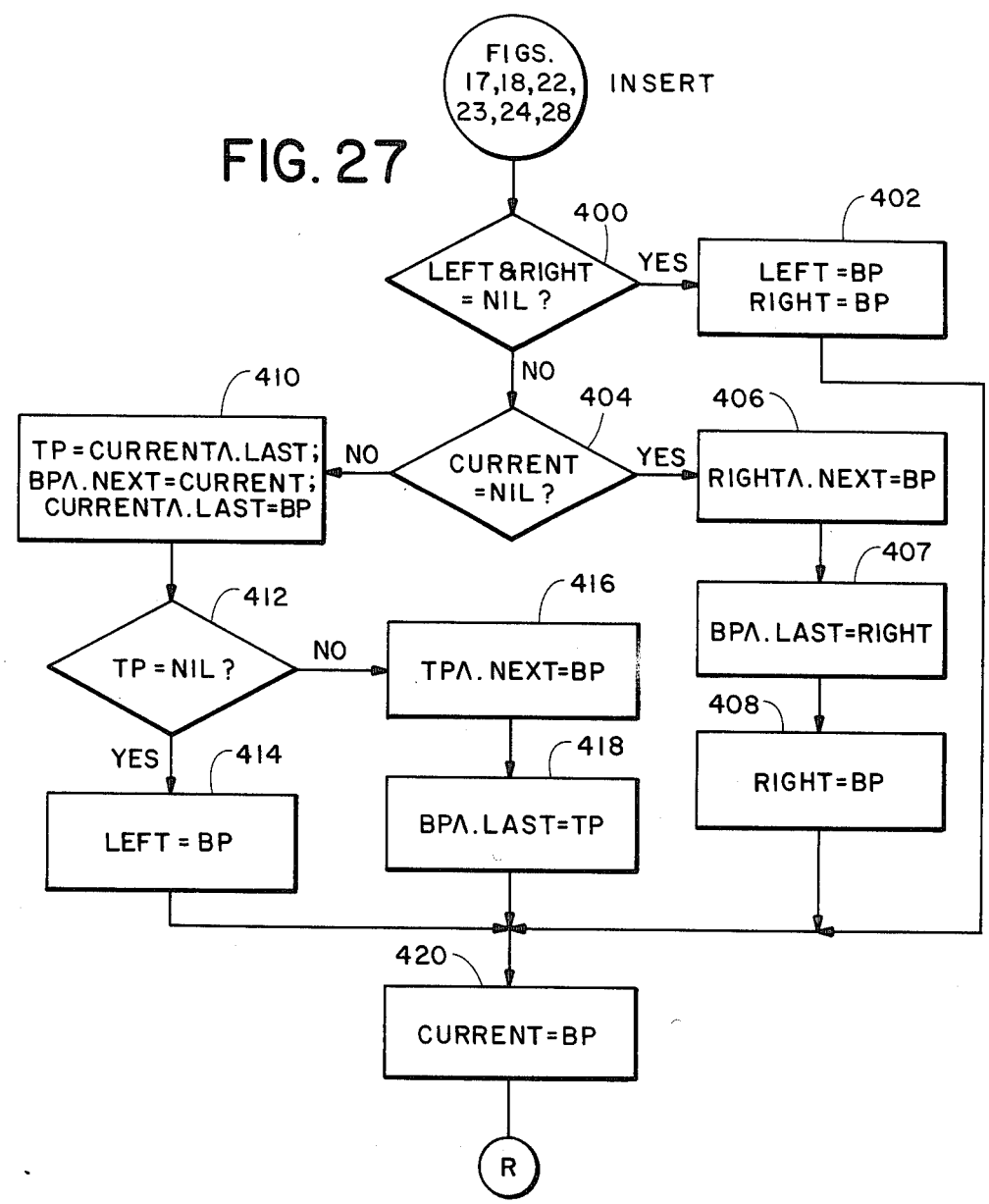

Referring now to FIG. 27, the INSERT subroutine takes the specified new chain-code bin and inserts it before the CURRENT bin; it maintains the LEFT and RIGHT pointers to the master list. The first decision block 400 of the INSERT subroutine asks if the bin list is empty. If it is empty, block 402 is executed. The LEFT marker must, by definition, point to the left-most bin in the list, and RIGHT to the right-most bin. In this instance, the newly allocated bin being inserted into the bin list will be the only bin listed, therefore, the LEFT and RIGHT markers must take the address passed by the new bin. If the list is not empty, the decision block 404 asks if CURRENT equals NIL. If true, all bins in the list have already been processed and the new bin is being inserted at the right-hand end of the list, blocks 406–408. This condition occurs if a contour creation appears on the raster being processed to the right of all other contours intercepting the raster. In the block 406, the NEXT field of the current RIGHT bin takes the address of the new bin BP; in block 407, the LAST pointer of the new bin BP takes the address of the current RIGHT bin; and in block 408, the RIGHT marker is moved to the new bin BP. The NO branch from the decision block 404 indicates that the new bin is to be inserted between existing bins in the list. The block 410, utilizing a temporary pointer TP, establishes pointer connections between the CURRENT bin and the new bin BP, and also between the new bin and the bin to the right of the new bin. If TP equals NIL, block 412, indicating that there are no bins before the CURRENT bin, then the new bin becomes the LEFT bin, block 414. If there are bins in the list before the CURRENT bin, then block 416 establishes that the bin which precedes the CURRENT bin has a new right-hand neighbor which is the new bin BP. Block 418 connects the new bin to its left neighbor. Finally, block 420, the new bin becomes the CURRENT bin.

Figure 28:
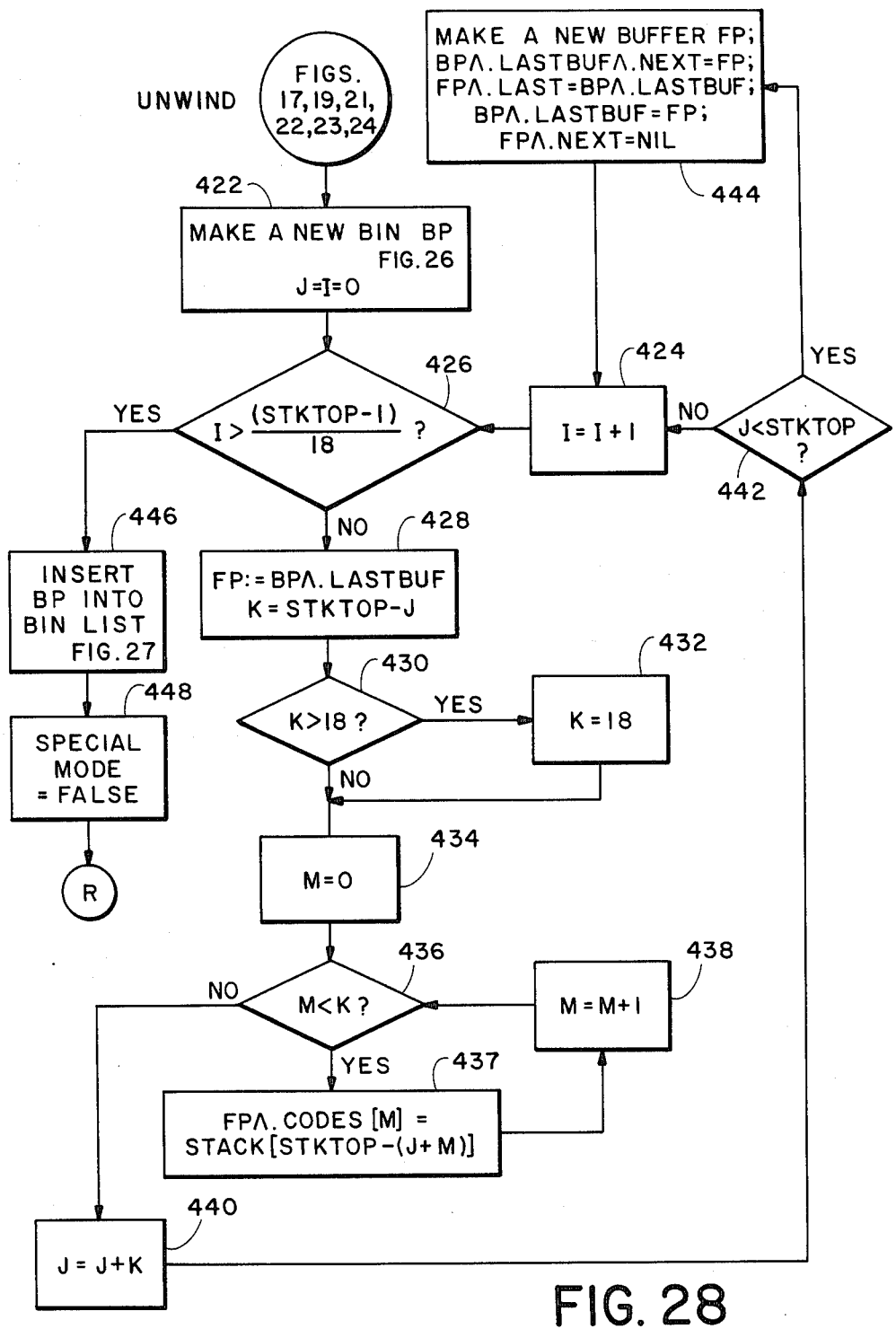

Referring now to FIG. 28, the UNWIND subroutine takes the contents of the LIFO reverse stack RS in which chain codes are stored, and copies the stack into a new bin, storing the chain codes in the reverse order of their storage in the stack, 18 per buffer. The UNWIND operation terminates the special mode initiated by a class 3 double-creation window (FIG. 20). Block 422 calls the NEWBIN subroutine to create the new bin. Variables J and I are set to zero. J is an integer variable which increases by 18 after each buffer of the new bin is filled with chain codes. I is an integer variable which starts at zero and increases by 1 each time a buffer of 18 chain codes is stored, block 424. STKTOP is an integer variable which varies from 1 to N and points to the storage element in the array STACK, i.e., the reverse stack, which has last filled by a chain code; therefore, STKTOP is a measure of the number of chain codes stored in the reverse stack. The decision block 426 asks if a sufficient number of buffers have been processed to store the stack. If not, block 428 is entered. The first statement of block 428 gets the address of the last buffer in the new bin; this buffer is referenced via the field LASTBUF. The first time block 428 is executed after calling UNWIND, the last buffer is the buffer allocated by the NEWBIN subroutine called in block 422; in subsequent iterations of block 428, the last buffer is allocated internally in the UNWIND subroutine as will be seen below. The second statement of block 428 sets a variable K, the total number of chain codes remaining to be copied, to STKTOP minus J. J is still zero at this point, the first iteration of block 428. If K is greater than 18, block 430, then K is set to 18 in block 432. When the program enters block 434 the variable K will be one of two values, viz.: either 18 which is the maximum number of chain codes in a buffer, or the number of chain codes remaining to be copied from the last buffer in the stack. In block 434, a variable M is set to zero. M varies from zero to K-1 and thus addresses the element of the array CODES of the buffer where the next chain code is to be copied from the stack. In block 436, if M is less than K then block 437 is entered wherein one chain code is copied from the reverse stack to the new bin by the statement shown. (J+M) is the total number of chain codes previously copied from the stack, therefore [STKTOP-(J+M)] selects the storage element of the stack from which a chain code is to be copied into the Mth storage location of the buffer. When the chain code is copied, M is incremented by one, block 438; and the program loop comprising blocks 436–438 reiterates until up to 18 chain codes are copied from the stack into one buffer. When M equals K, block 436, block 440 is entered and J is increased by K, thereby adding the number of chain codes copied by the inner loop 436–438 just exited, to the total number of chain codes copied prior to entering that loop. In decision block 442, if J is less than STKTOP, then block 444 is entered wherein another buffer FP is allocated and appended onto the list of buffers in the new bin. The four statements of block 444 which append the new buffer onto the bin may be read in order as follows: the old last buffer now has a next buffer FP; the new buffer FP has a preceding buffer which was the old last buffer of the bin; the new buffer is made the last buffer of the bin; and there are no more buffers after the new buffer. One new buffer is created for each iteration of the outer loop of the UNWIND subroutine which includes the block 444. The NO branch is taken from the block 442 when unwinding of the stack into the new bin is completed, and block 424 is entered wherein the variable I is incremented by 1. If stack unwinding is completed, I is greater than (STKTOP-1)/18 and the program takes the YES branch from block 426 to block 446 and the INSERT subroutine is called to thread the new bin into the bin list. Block 448 disables the special mode and the subroutine is exited.

Figure 29:
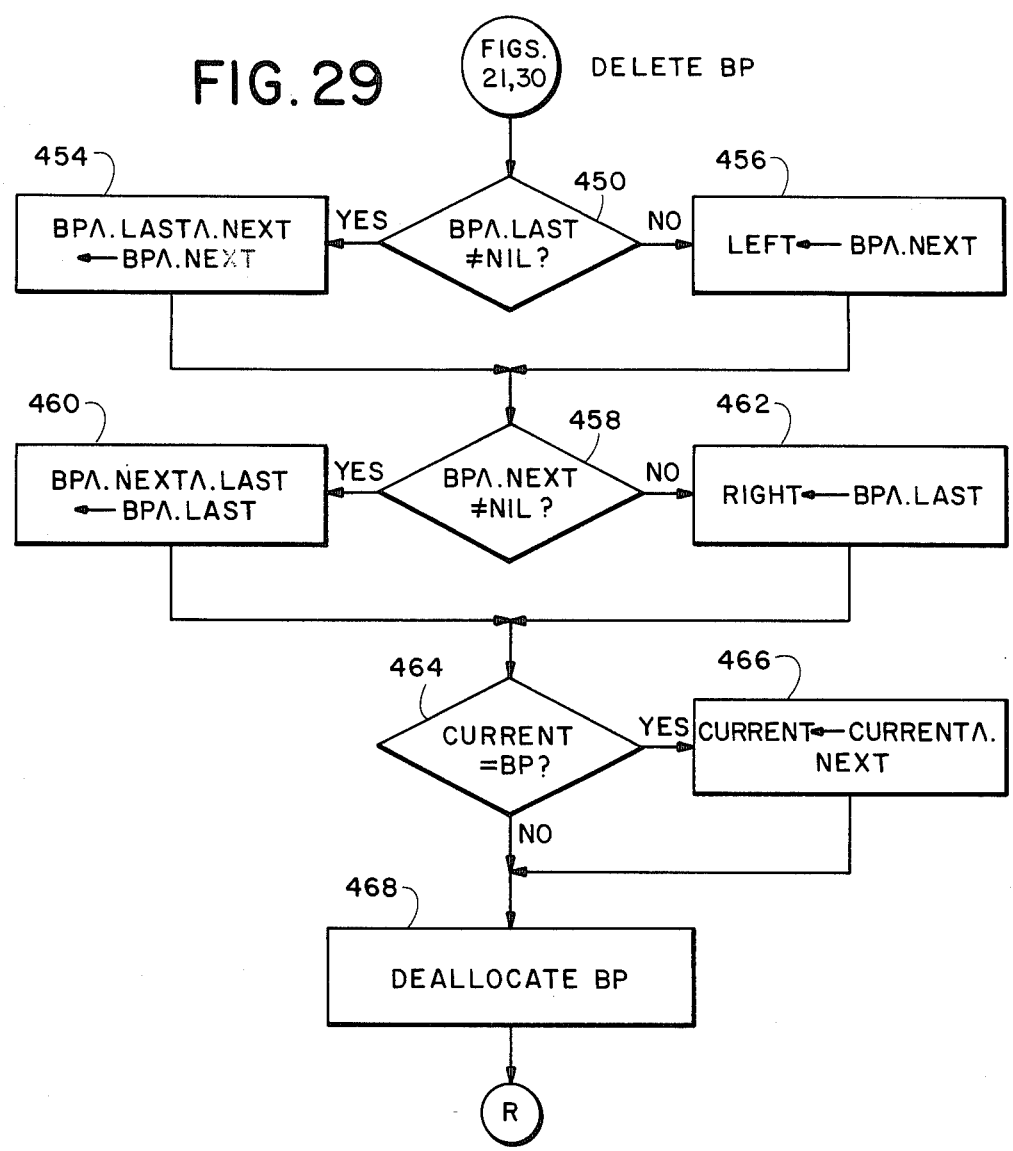
Figure 29A:
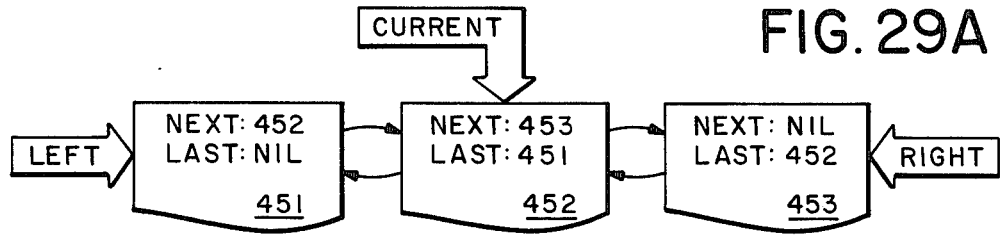
FIG. 29A is a diagram illustrating the pointer structure of a bin list.

Referring now to FIGS. 29 and 29A, in the DELETE subroutine, the LEFT, RIGHT and CURRENT markers of the bin list and the bin pointers are altered to unthread or deallocate a bin BP from the bin list. The decision block 450 asks if the bin which is being deleted has any left-hand neighbors in the bin list. A YES branch from the block 450 indicates the condition illustrated in FIG. 29A which shows a bin list of 3 bins 451-453 which have the markers, respectively, LEFT, CURRENT, and RIGHT. The NEXT field of each bin points to its right-hand neighbor, if any; and the LAST field of each bin points its left-hand neighbor, if any. The block 454 of the DELETE subroutine, FIG. 29, assigns the contents of the NEXT field of the CURRENT bin to the NEXT field of its left-hand neighbor, thus effectively deleting the next field of the CURRENT bin from the bin list. If the bin being deleted has no left-hand neighbors, then the LEFT marker is assigned to the right-hand neighbor of the bin being deleted, block 456. The decision block 458 asks if the bin being deleted has any right-hand neighbors. If yes, the LAST field of the right-hand neighbor receives the contents of the LAST field of the bin being deleted, block 460. If the bin being deleted has no right-hand neighbor, the RIGHT marker is assigned to the left-hand neighbor of the bin being deleted, block 462. If the bin being deleted is the CURRENT bin, block 464, the CURRENT bin pointer is advanced to the next bin, block 466, and the bin being deleted is deallocated, block 468.

Referring now to FIGS. 30 and 30A, the LINE FINDER subroutine first sets a start point (SX, SY) to the XSTART and YSTART coordinates of the bin being converted to vectors, block 470. If the bin is empty, block 471, the program transmits a single point having coordinates SX, SY to the user device, block 472, and deletes the bin, block 474, by calling the DELETE subroutine. The transmission of a single point is a special case of the class 1, single-contour creation subroutine, FIG. 18, block 274, which transmits a contour comprising a single pixel. The NO branch from block 471 enters the decision block 476; if there are chain codes remaining to process, the program gets a next endpoint (EX, EY), block 477, and outputs to the user device a vector which extends from (SX, SY) to (EX, EY), block 478. The start point is set to (EX, EY), block 479, in preparation for processing the next line of the contour, if any. Referring to FIG. 30A, one contour 480 is represented by a series of chain codes stored in a bin. The LINE FINDER subroutine generates a first vector 478' from the contour 480, the vector 478' having a start point SX, SY and an end point EX, EY; the vector 478' is generated by the LINE FINDER program loop comprising block 476–479. Subsequent vectors 482, 483 of the contour 480 are generated by reiteration of the loop 476–479. When all the chain codes are exhausted from the bin being converted to vectors, the NO branch is taken from decision block 476 and the bin is deleted in block 474 by calling the DELETE subroutine.

Figure 31:
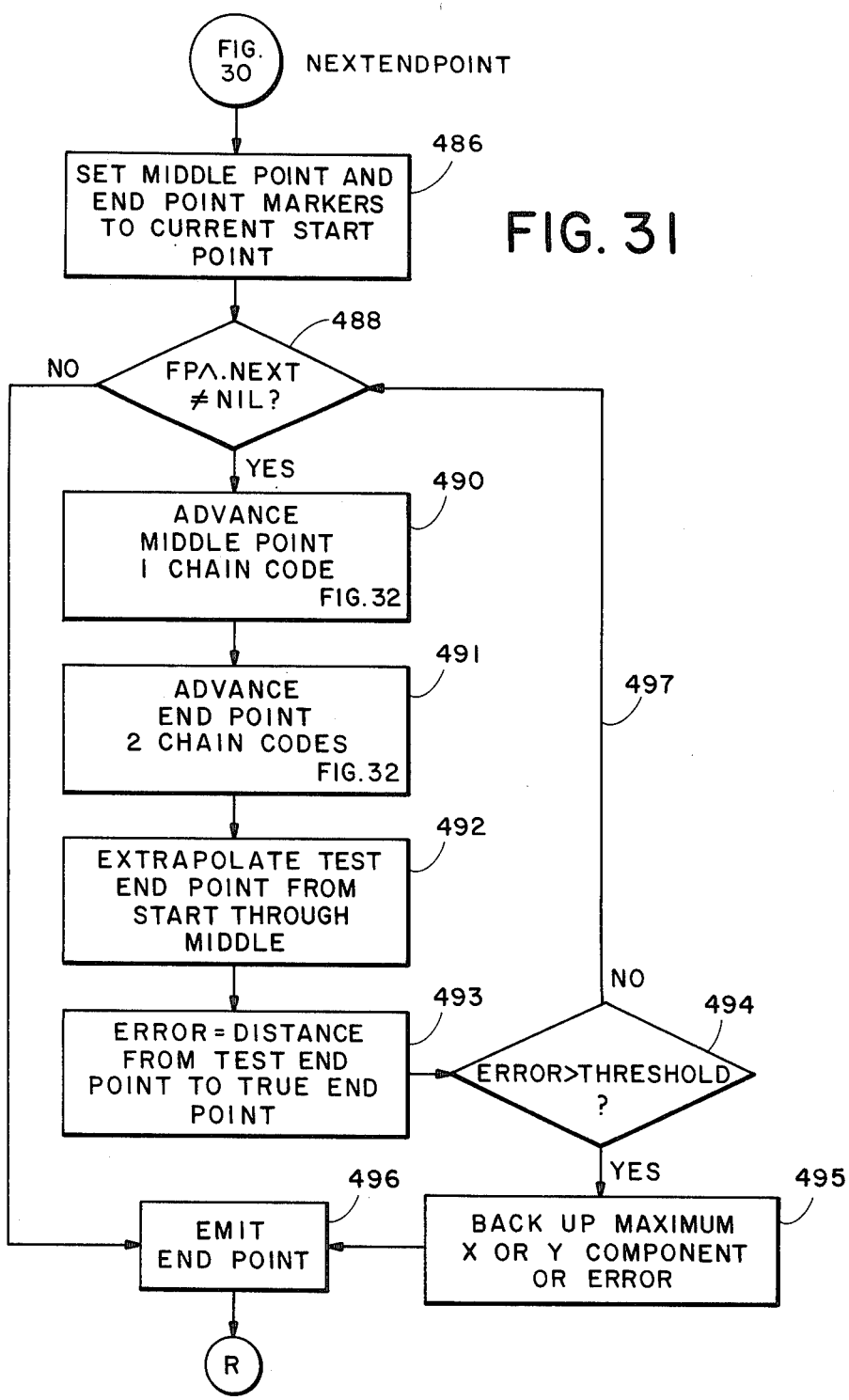

With each iteration of the LINE FINDER, the NEXTENDPOINT subroutine is called in block 477. The NEXTENDPOINT program segment maintains three markers, viz.: START, MIDDLE POINT and END POINT of the vector being processed. NEXTENDPOINT is the heart of the line finding algorithm; it walks down a contour of chain codes keeping track of the position of the markers in X-Y space. Referring to FIG. 31, block 486, the MIDDLE, and END POINT markers are set to the current start point SX, SY. The decision block 488 asks if any chain codes are remaining in the buffer being processed. If so, the MIDDLE POINT marker is advanced one chain code, block 490, and the END POINT marker is advanced two chain codes, block 491. A test END POINT is extrapolated, block 492, from the START POINT through the MIDDLE POINT and the distance from the test END POINT to the true END POINT is calculated, block 493, using look-up tables. When the extrapolated distance exceeds a predetermined error tolerance, block 494, the END POINT marker is reversed, block 495, by N chain codes, where N is the maximum X or Y component of the error distance. The position of the END POINT marker, after reversal, is output, block 496, to the LINE FINDER, block 477, and is defined as a vertex point or corner. All three markers are reset to the vertex point and the LINE FINDER process continues to exhaustion of the chain-code list. If the extrapolated error is less than the predetermined threshold, FIG. 31, block 494, the NEXTENDPOINT program loops on the path 497 and, assuming there are chain codes remaining to be processed in the contour, continues advancing down the contour in blocks 490, 491, fetching more chain codes in the NEXTCODE subroutine.

Figure 32:
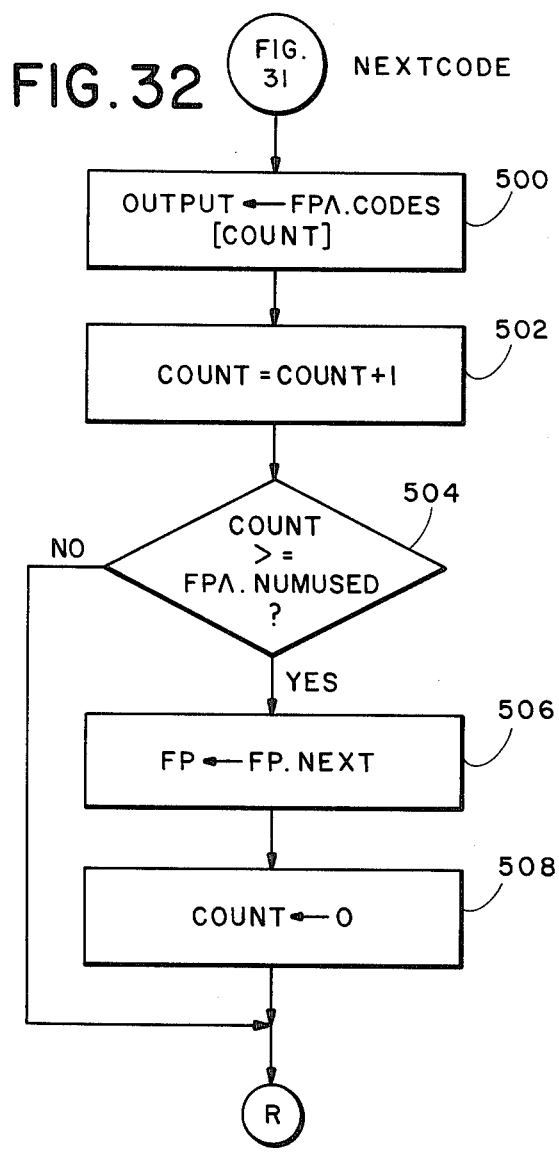

Referring now to FIG. 32, NEXTCODE is a subroutine which provides a stream of chain codes from a bin on successive calls. Parameters passed to the NEXTCODE subroutine are a buffer pointer BP and an index COUNT. Recall that chain codes are stored in a bin wherein each storage element of the bin is a buffer storing 18 chain codes. To read any particular chain code, the buffer and the particular location of the chain code in the buffer must be specified. Before NEXTCODE is called the first time, COUNT is set to zero, and BUFFER is set to point to the first buffer in the bin. A chain-code is output in response to the statement of block 500, from the COUNT element of the CODES array, i.e., the statement takes a buffer pointer and a count integer which is the chain code address and outputs the chain code. COUNT is incremented by one, block 502, so as to address the next chain code in the array when NEXTCODE is subsequently called. In block 504, if COUNT is greater than or equal to NUMUSED, (the number of chain codes stored in the buffer), then the buffer pointer is advanced to the next buffer of 18 chain codes, block 506, and COUNT is set to zero, block 508.

Figure 33:
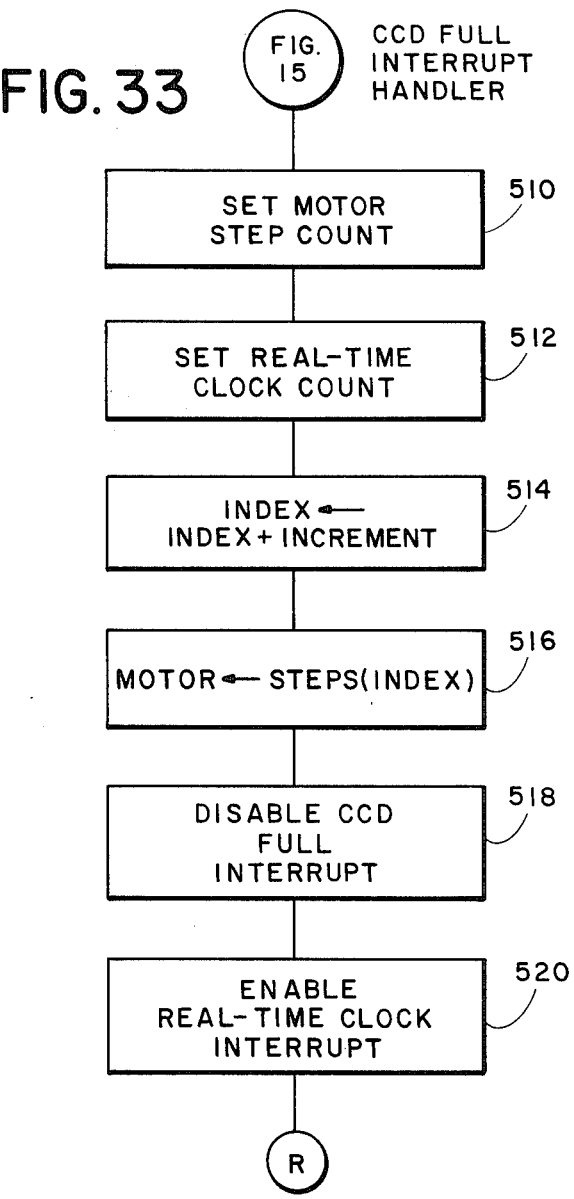
Figure 34:
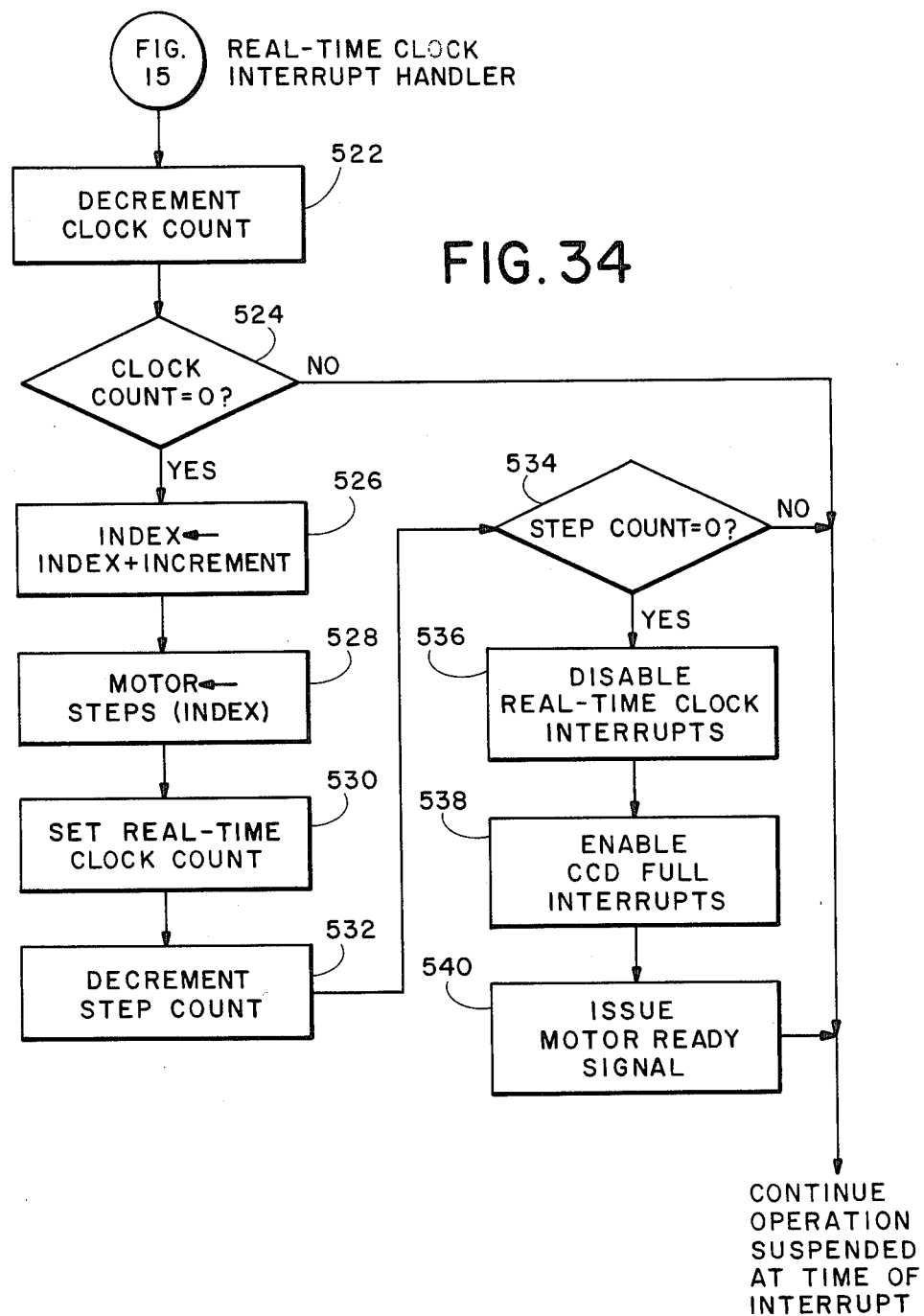

The motor stepping routines are described with reference to FIGS. 33 and 34. Referring to FIG. 33, the CCD FULL interrupt handler subroutine is entered in response to a CCD FULL interrupt signal from the state control logic 100 (FIG. 2). In block 510, the motor step count is set; the step count is the number of steps required of the stepper motor 44 to move the aspect of the CCD array downward with respect to the document being scanned from one raster to the next. The real-time clock count is set in block 512. The real-time clock count is an integer representing the time required for the motor to move one step, including time for damping any mechanical vibrations which may occur in the CCD array as a result of the movement. In block 514, a data item INDEX is increased by a second data item INCREMENT. The motor steps an integer number of steps to move the CCD array one raster position; however, because the distance between adjacent rasters is not exactly an integer number of steps of the stepper motor, a negligible offset accumulates from raster to raster. INDEX is a real number comprising an integer count field and a fractional-quantity field. INCREMENT is a value representing the fractional part or offset of a full motor step, which value accumulates in INDEX as successive motor steps are effected by the CCD FULL and real-time clock interrupt handlers; when the accumulating offset reaches a value which equals or exceeds a full step, the motor step count is incremented by one, resulting in an additional motor step for the current array repositioning operation. In block 516, the motor latch and driver circuit 54 receives the motor step count; CCD full interrupts are disabled, block 518; and real-time clock interrupts are enabled in block 520. Referring to FIG. 34, when the next real-time clock interrupt occurs, the clock count is decremented by one, block 522. If the clock count is not equal to zero, block 524, the subroutine is exited and the clock count continues to decrement each time a real-time clock interrupt occurs until the clock count reaches zero, thereby allowing a predetermined time period to pass during which time period the motor moves and settles. Upon the next subsequent real-time clock interrupt, the INDEX quantity is again increased by the quantity INCREMENT, block 526; the motor is stepped once again, block 528; the real-time clock count is set, block 530; and the step count is decremented by one, block 532. If the step count is equal to zero, decision block 534, indicating that the motor has been stepped to the next position for acquiring another array of data, the real-time clock interrupts are disabled, block 536; the CCD full interrupts are enabled, block 538; and the program issues the MOTOR READY signal, block 540.

While the principles of the invention have now been made clear in an illustrative embodiment, there will be immediately obvious to those skilled in the art, many modifications of structure, proportions, the elements, materials, and components used in the practice of the invention, and otherwise, which are particularly adapted for specific environments and operating requirements without departing from those principles. The appended claims are, therefore, intended to cover and embrace any such modifications, within the limits only of the true spirit and scope of the invention.

APPENDIX I

```
GRAFIX               OMSI Pascal V1.2C RT11              Site 814-1  Page 1
Tektronix, Inc., Tek Labs, Building 50, Beaverton OR 97077

Line  Stmt Level  Nest   Source Statement

1                      PROGRAM GRAFIX;
  2
  3                      /*
  4                         THIS PROGRAM HAS THE GRAPHICS SUPPORT SOFTWARE
  5                         AND THE INITIALIZATION ROUTINES  IT ALSO HAS A FEW
  6                         RANDOM         PROGRAMS.
  7                      */
  8
  9                      TYPE ALFA=ARRAY[1..14] OF CHAR;
 10                           XYPAIR=RECORD
 11                                PX: INTEGER;
 12                                PY: INTEGER
 13                           END;
 14                           BLOCK=RECORD
 15                                NEXT: ^BLOCK,
 16                                CASE INTEGER OF
 17                        1:       (LAST: ^BLOCK;
 18                                BROTHER: ^BLOCK;
 19                                ID: INTEGER;
 20                                XSTART: INTEGER;
 21                                YSTART: INTEGER;
 22                                STARTNODE: ^BLOCK;
 23                                ENDNODE: ^BLOCK,
 24                                FIRSTBUF: ^BLOCK;
 25                                LASTBUF: ^BLOCK;
 26                                COMPSTART: ^BLOCK;
 27                                EDGEFLAG: INTEGER);
```

```
 28                  2:       (NODEID: INTEGER;
 29                            NODEUSED: INTEGER;
 30                            PENDING: INTEGER;
 31                            UPDOWN: INTEGER;
 32                            LINES: ARRAY[1..4] OF RECORD
 33                                     LADDR: ^BLOCK;
 34                                     NID: INTEGER
 35                                   END);
 36                  3:       (LASTCODES: ^BLOCK;
 37                            NUMUSED: INTEGER;
 38                            CODES: ARRAY[0..17] OF CHAR)
 39                            END;
 40              BLPTR=^BLOCK;
 41
 42         VAR ROMDATUM, I, J, K, XPOS, YPOS, TX, TY, ERROR, ARCERROR, STKTOP, B, C, S, BUCKETID  INTEGER,
 43             ONAME, INAME: ALFA;
 44             ENDX, ENDY: INTEGER;
 45             YESNO: CHAR;
 46             NOTSPECIAL, FREEOUTPUT, LINEOUTPUT, ARCOUTPUT  BOOLEAN,
 47             STACK: ARRAY[1..1024] OF CHAR,
 48             FREROM: ARRAY[256..511] OF INTEGER;
 49             LEFT, RIGHT, CURRENT, TP  BLPTR,
 50             DECODER: ARRAY[0..31] OF XYPAIR;
 51             FREES: ARRAY[0..7] OF XYPAIR.
 52             COMPRESSOR: ARRAY[0..7, 0..7] OF INTEGER,
 53             REVERSER: ARRAY[0..15] OF CHAR;
 54             SQRTABLE: ARRAY[0..7, 0..7] OF INTEGER,
 55             OPPERROR, NEXTNODEID: INTEGER;
 56             CYBERLINK, ARC2OUTPUT, FILEOUT, NODEOUTPUT, TYPE2NODE  BOOLEAN,
 57             FREELIST: BLPTR,
 58             FCREG ORIGIN 170010B: INTEGER;
 59             XPOSREG ORIGIN 170012B: INTEGER,
 60             RAMSWITCH ORIGIN 170014B: INTEGER;
 61             RAMS ORIGIN 160000B: ARRAY[0..511] OF INTEGER,
 62             STATUS ORIGIN 170000B: INTEGER,
 63             MOTORREADY ORIGIN 170006B: INTEGER,
 64             CIRCBUF ORIGIN 400B: ARRAY[0..127] OF INTEGER,
 65             CB ORIGIN 270B: INTEGER;
 66             TRACE, STOPPING, TESTING, IMAGEMODE, DOTTING, BARSING, INPUTGIVEN: BOOLEAN,
 67             LASTXPOS, LASTGRX, LASTLOY, LASTHIY, LASTHIX: INTEGER;
 68             SINGCASES: ARRAY[0..7] OF INTEGER;
 69             XCEN, YCEN, XSCALE, YSCALE: REAL;
 70             BLOCKSLEFT, MAXBLOCKS: INTEGER,
 71             SCALED: BOOLEAN,
 72
 73         PROCEDURE FLIP; EXTERNAL;
 74         PROCEDURE ENDATA; EXTERNAL;
 75         PROCEDURE FLUSH; EXTERNAL.
 76
 77         /E/
 78
 79         PROCEDURE PAGE;
 80
 81         /* ERASES THE SCREEN ON 401X TERMINALS */
 82
 83         VAR I: INTEGER;
 84
 85         BEGIN
 86  1  2  1    WRITE(CHR(27):1, CHR(12):1);
 87  2  2  1    FOR I:=1 TO 1300 DO /* WAIT FOR TERMINAL (BRUTE FORCE!!) */
 88  3  2  2       WRITE(CHR(0):1)
 89            END;
 90
 91         PROCEDURE GRMODE;
 92
 93         /* PUTS THE TERMINAL IN GRAPHICS MODE */
 94
 95         BEGIN
 96  1  2  1    WRITE(CHR(29):1)
 97            END;
 98
 99         PROCEDURE ANMODE;
100
101         /* PUTS TERMINAL IN ALPHANUMERIC MODE */
102
103         BEGIN
104  1  2  1    WRITE(CHR(31):1)
105            END.
106
107         PROCEDURE CURSOR(VAR C, X, Y: INTEGER);
108
109         /* DOES A GIN MODE TO GET CURSOR POSITION */
110
111         VAR HIX, HIY, LOX, LOY, I, J INTEGER,
112             CH, CHY, CLY, CHX, CLX: CHAR.
113
114         BEGIN
115         /**C
116            .MCALL .TTYOUT,.TTYIN
117            .TTYOUT #31.
118            .TTYOUT #27.
119            .TTYOUT #26.
120            .GLOBL ECHO
121            CLR   ECHO           ;CLEAR TERMINAL ECHO BY SFTWRE
122            .TTYIN
123            MOVB  #0, CH(6)
124            .TTYIN
125            MOVB  #0, CHY(6)
126            .TTYIN
127            MOVB  #0, CLY(6)
128            .TTYIN
129            MOVB  #0, CHX(6)
130            .TTYIN
131            MOVB  #0, CLX(6)
132            .TTYIN
133            .TTYIN
134            INC   ECHO           ;ENABLE ECHO
135         */
136  1  2  1    C:=ORD(CH);
137  2  2  1    HIX:=ORD(CHX) & 37B;
```

```
138     3    2    1        HIY:=ORD(CHY) & 37B;
139     4    2    1        LOX:=ORD(CLX) & 37B;
140     5    2    1        LOY:=ORD(CLY) & 37B;
141     6    2    1        I:=HIX*32+LOX;
142     7    2    1        J:=HIY*32+LOY;
143     8    2    1        X:=1023-(I*3) DIV 2;  /* TRANSFORM TO APCS COORDINATE SYSTEM */
144     9    2    1        Y:=1400-(J*3) DIV 2;
145    10    2    1        LASTLOY:=0;
146    11    2    1        LASTHIY:=0;
147    12    2    1        LASTHIX:=0
148                     END;
149
150             PROCEDURE DRAWABS(X,Y: INTEGER);
151
152             /* DRAW A VECTOR TO THE SPECIFIED POSITION */
153
154             VAR HIX,HIY,LOX,LOY,TX,TY: INTEGER;
155                 DRAWIT: BOOLEAN;
156
157             BEGIN
158     1    2    1        IF SCALED THEN BEGIN
159     3    2    3           LOX:=ROUND(XCEN-512/XSCALE);
160     4    2    3           HIX:=ROUND(XCEN+512/XSCALE);
161     5    2    3           LOY:=ROUND(YCEN-700/YSCALE);
162     6    2    3           HIY:=ROUND(YCEN+700/YSCALE);
163     7    2    3           IF (X>HIX) ! (X<LOX) ! (Y>HIY) ! (Y<LOY) THEN DRAWIT:=FALSE
164     9    2    4           ELSE BEGIN
165    10    2    5              DRAWIT:=TRUE;
166    11    2    5              X:=ROUND(((X-XCEN)*XSCALE)+512);
167    12    2    5              Y:=ROUND(((Y-YCEN)*YSCALE)+700)
168                              END
169                     END
170    13    2    2        ELSE DRAWIT:=TRUE;
171    14    2    1        IF DRAWIT THEN BEGIN
172    16    2    3           TX:=X;
173    17    2    3           IF TX>=1024 THEN TX:=1023;
174    19    2    3           TY:=((1023-TX)*2) DIV 3;
175    20    2    3           TX:=((1400-Y)*2) DIV 3; /* COORDINATE TRANSFORM */
176    21    2    3           HIX:=40B ! ((TX DIV 32) & 37B);
177    22    2    3           LOX:=100B ! (TX & 37B);  /* GET BYTES FOR TRANSMISSION */
178    23    2    3           HIY:=40B ! ((TY DIV 32) & 37B);
179    24    2    3           LOY:=140B ! (TY & 37B);
180                           /* NOW SEND THOSE THAT WE MUST */
181    25    2    3           IF HIY=LASTHIY THEN
182    26    2    4              IF HIX=LASTHIX THEN
183    27    2    5                 IF LOY=LASTLOY THEN WRITE(CHR(LOX):1)
184    29    2    6                              ELSE WRITE(CHR(LOY):1,CHR(LOX):1)
185    30    2    5                            ELSE WRITE(CHR(LOY):1,CHR(HIX):1,CHR(LOX):1)
186    31    2    4           ELSE IF HIX=LASTHIX THEN
187    32    2    5              IF LOY=LASTLOY THEN WRITE(CHR(HIY):1,CHR(LOX):1)
188    34    2    6                           ELSE WRITE(CHR(HIY):1,CHR(LOY):1,CHR(LOX):1)
189    35    2    5           ELSE WRITE(CHR(HIY):1,CHR(LOY):1,CHR(HIX):1,CHR(LOX):1);
190    36    2    3           LASTLOY:=LOY; /* REMEMBER */
191    37    2    3           LASTHIX:=HIX;
192    38    2    3           LASTHIY:=HIY
193                           END
194                     END;
195
196             PROCEDURE MOVEABS(X,Y: INTEGER);
197
198             /* MOVE TO SOME POSITION ON THE SCREEN */
199
200             BEGIN
201     1    2    1        GRMODE;
202     2    2    1        DRAWABS(X,Y)
203                     END;
204
205             PROCEDURE INIT;
206
207             /* THIS PROCEDURE READS THE DATA TABLES FROM THE HOST PROCESSOR */
208
209             VAR I,J: INTEGER;
210
211             BEGIN
212     1    2    1        WRITELN('LOADING DATA...');
213     2    2    1        FLIP; /* SEND COMMAND TO HOST */
214     3    2    1        SNDATA;
215     4    2    1        FOR I:=1 TO 256 DO /* LOAD SINGULARITY ANALYSIS TABLES */
216     5    2    2        BEGIN
217     6    2    3           READLN(J,B,S,C);
218     7    2    3           FREROM(J):=B*64+S*8+C
219                           END;
220     8    2    1        FOR I:=0 TO 7 DO /* FREEMAN CODE TO DX,DY CONVERTER */
221     9    2    2           READLN(FREES[I].PX,FREES[I].PY);
222    10    2    1        FOR I:=0 TO 7 DO /* COMPACTIFY TABLE */
223    11    2    2        BEGIN
224    12    2    3           FOR J:=0 TO 7 DO
225    13    2    4              READ(COMPRESSOR[I,J]);
226    14    2    3           READLN
227                           END;
228    15    2    1        FOR I:=0 TO 31 DO /* FREEMAN CODE DERIVER (FROM SINGULAIRITY TABLE) */
229    16    2    2           READLN(DECODER[I].PX,DECODER[I].PY);
230    17    2    1        FOR I:=0 TO 15 DO /* THE FREEMAN CODE REVERSING TABLE */
231    18    2    2        BEGIN
232    19    2    3           READLN(J);
233    20    2    3           REVERSER[I]:=CHR(J)
234                           END;
235    21    2    1        FOR I:=0 TO 7 DO /* SQUARE ROOT TABLE FOR LINIFY */
236    22    2    2        BEGIN
237    23    2    3           FOR J:=0 TO 7 DO
238    24    2    4              READ(SQRTABLE[I,J]);
239    25    2    3           READLN
240                           END;
241    26    2    1        RAMSWITCH:=0; /* NOW LOAD RAMS */
242    27    2    1        FOR I:=0 TO 511 DO
243    28    2    2           READLN(RAMS[I]);
244    29    2    1        RAMSWITCH:=-1; /* LOAD UPPER HALF */
245    30    2    1        FOR I:=0 TO 511 DO
246    31    2    2           READLN(RAMS[I]);
247    32    2    1        RAMSWITCH:=0; /* SET TO LOWER HALF FOR IDENTITY FUNCTION */
```

```
248  33  2  1        FLIP; /* FLIP BACK TO TERMINAL. ALL DONE HERE */
249  34  2  1        WRITELN('SIZING MEMORY....');
250  35  2  1        MAXBLOCKS:=0; /* TIME TO SIZE MEMORY */
251  36  2  1        FREELIST:=NIL; /* GOING TO ALLOCATE ALL WE CAN */
252  37  2  1        WHILE TRUE DO
253  38  2  2        BEGIN
254  39  2  3           NEW(LEFT); /* ALLOCATE ANOTHER BLOCK, SEE IF OUT OF SPACE */
255           /**C
256                      MOV   X6,I(X6)         ;GET STACK PTR TO MEASURE SPACE LEFT
257                      SUB   LEFT(X5),I(X6)   ;I NOW HAS AVAILABLE SPACE LEFT
258                      CMP   I(X6),#400       ;DO UNSIGNED COMPARE OF I AND 400
259                      BHI   1$
260                      CLR   I(X6)            ;CLEAR I TO INDICATE COMPLETION
261                  1$: NOP
262           */
263  40  2  3           LEFT^.NEXT:=FREELIST; /* SAVE NEW BLOCK ADDR */
264  41  2  3           FREELIST:=LEFT;
265  42  2  3           MAXBLOCKS:=MAXBLOCKS+1;
266  43  2  3           IF I=0 THEN EXIT /* LEAVE 400 BYTES FOR THE STACK */
267                  END;
268  45  2  1        BLOCKSLEFT:=MAXBLOCKS
269                END;
270
271           PROCEDURE NEWBLOCK(VAR P:BLPTR);
272
273           /*
274              NEWBLOCK IS AN ARTIFICIAL FREE STORAGE MAINTENENCE
275              ROUTINE USED TO CUT OVERHEAD DOWN.
276           */
277
278           BEGIN
279   1  2  1     BLOCKSLEFT:=BLOCKSLEFT-1;
280   2  2  1     IF FREELIST=NIL THEN BEGIN
281   4  2  3        WRITELN;
282   5  2  3        WRITELN('OUT OF MEMORY....');
283   6  2  3        FLUSH;
284           /**C
285                   HALT
286           */
287   7  2  3        END
288   8  2  2     ELSE BEGIN
289   9  2  3        P:=FREELIST;
290  10  2  3        FREELIST:=P^.NEXT
291                  END
292           END;
293
294           PROCEDURE RELBLOCK(P:BLPTR);
295
296           /*
297              AND ITS OPPOSITE, A DE-ALLOCATOR
298           */
299
300           BEGIN
301   1  2  1     BLOCKSLEFT:=BLOCKSLEFT+1;
302   2  2  1     P^.NEXT:=FREELIST;
303   3  2  1     FREELIST:=P
304           END;
305
306           BEGIN
```

Errors detected: 0
Free memory: 11678 words

LISTS                     OMSI Pascal V1.2C R711              Site 814-1  Page 1
Tektronix, Inc., Tek Labs, Building 50, Beaverton OR 97077

Line Stmt Level Nest  Source Statement

```
  1           PROGRAM LISTS;
  2
  3           /*
  4              THIS MODULE OF THE APCS CONTAINS THE VARIOUS ROUTINES
  5              THAT MANTAIN AND MANIPULATE THE FREEMAN LISTS.
  6           */
  7
  8           TYPE RAST=ARRAY[0..511] OF BOOLEAN;
  9                FILERAST=ARRAY[0..31] OF INTEGER;
 10                ALFA=ARRAY[1..14] OF CHAR;
 11                XYPAIR=RECORD
 12                   PX: INTEGER;
 13                   PY: INTEGER
 14                END;
 15                BLOCK=RECORD
 16                   NEXT: ^BLOCK;
 17                   CASE INTEGER OF
 18                1:    (LAST: ^BLOCK;
 19                       BROTHER: ^BLOCK;
 20                       ID: INTEGER;
 21                       XSTART: INTEGER;
 22                       YSTART: INTEGER;
 23                       STARTNODE: ^BLOCK;
 24                       ENDNODE: ^BLOCK;
 25                       FIRSTBUF: ^BLOCK;
 26                       LASTBUF: ^BLOCK;
 27                       COMPSTART: ^BLOCK;
 28                       EDGEFLAG: INTEGER);
 29                2:    (NODEID: INTEGER;
 30                       NODEUSED: INTEGER;
 31                       PENDING: INTEGER;
 32                       UPDOWN: INTEGER;
 33                       LINES: ARRAY[1..4] OF RECORD
 34                         LADDR: ^BLOCK;
 35                         NID: INTEGER
 36                       END);
 37                3:    (LASTCODES: ^BLOCK;
 38                       NUMUSED: INTEGER;
 39                       CODES: ARRAY[0..17] OF CHAR)
 40                END;
 41                BLPTR=^BLOCK;
 42
 43           VAR ROMDATUM, I, J, K, XPOS, YPOS, TX, TY, ERROR, ARCERROR, STKTOP, B, C, S, BUCKETID: INTEGER;
```

```
 44              ONAME, INAME: ALFA;
 45              ENDX, ENDY: INTEGER;
 46              YESNO: CHAR;
 47              NOTSPECIAL, FREEOUTPUT, LINEOUTPUT, ARCOUTPUT: BOOLEAN;
 48              STACK: ARRAY[1..1024] OF CHAR;
 49              FREROM: ARRAY[256..511] OF INTEGER;
 50              LEFT, RIGHT, CURRENT, TP: BLPTR;
 51              DECODER: ARRAY[0..31] OF XYPAIR;
 52              FREES: ARRAY[0..7] OF XYPAIR;
 53              COMPRESSOR: ARRAY[0..7,0..7] OF INTEGER;
 54              REVERSER: ARRAY[0..15] OF CHAR;
 55              SORTABLE: ARRAY[0..7,0..7] OF INTEGER;
 56              OPPERROR, NEXTNODEID: INTEGER;
 57              REDISPLAY, ARC2OUTPUT, FILEOUT, NODEOUTPUT, TYPE2NODE  BOOLEAN;
 58              FREELIST: BLPTR;
 59              FCREG ORIGIN 170010B: INTEGER;
 60              XPOSREG ORIGIN 170012B: INTEGER;
 61              RAMSWITCH ORIGIN 170014B: INTEGER;
 62              RAMS ORIGIN 160000B, ARRAY[0..511] OF INTEGER;
 63              STATUS ORIGIN 170000B: INTEGER;
 64              MOTORREADY ORIGIN 170006B: INTEGER;
 65              CIRCBUF ORIGIN 400B, ARRAY[0..127] OF INTEGER;
 66              CB ORIGIN 270B: INTEGER;
 67              TRACE, STOPPING, TESTING, IMAGEMODE, DOTTING, BARSING, INPUTGIVEN: BOOLEAN;
 68              LASTXPOS, LASTORX, LASTORY, LASTHIY, LASTHIX: INTEGER;
 69              SINGCASES: ARRAY[0..7] OF INTEGER;
 70              XCEN, YCEN, XSCALE, YSCALE: REAL;
 71              BLOCKSLEFT, MAXBLOCK: INTEGER;
 72              SCALED: BOOLEAN;
 73              WINDOWWIDTH, MAXBEND: INTEGER;
 74
 75          PROCEDURE NEWBLOCK(VAR BP:BLPTR); EXTERNAL;
 76          PROCEDURE RELBLOCK(BP:BLPTR); EXTERNAL;
 77          PROCEDURE LINEIFY(BP:BLPTR); EXTERNAL;
 78
 79          /E/
 80
 81          PROCEDURE NEWBUCKET(VAR BPTR:BLPTR);
 82
 83            /*
 84               NEWBUCKET MAKES AND INITIALIZES A NEW FREEMAN BIN FOR USE IN
 85               ACCUMULATING FREEMAN CODES.
 86            */
 87
 88          VAR FP: BLPTR;
 89
 90          BEGIN
 91   1  2  1    NEWBLOCK(BPTR);
 92   2  2  1    BPTR^.NEXT:=NIL;
 93   3  2  1    BPTR^.LAST:=NIL;
 94   4  2  1    BPTR^.BROTHER:=NIL;
 95   5  2  1    BPTR^.XSTART:=XPOS;
 96   6  2  1    BPTR^.YSTART:=YPOS;
 97   7  2  1    BPTR^.STARTNODE:=NIL;
 98   8  2  1    BPTR^.ENDNODE:=NIL;
 99   9  2  1    BPTR^.EDGEFLAG:=0;
100  10  2  1    NEWBLOCK(FP);
101  11  2  1    BPTR^.FIRSTBUF:=FP;
102  12  2  1    BPTR^.LASTBUF:=FP;
103  13  2  1    FP^.NEXT:=NIL;
104  14  2  1    BPTR^.COMPSTART:=FP;
105  15  2  1    FP^.LAST:=NIL;
106  16  2  1    FP^.NUMUSED:=0
107             END;
108
109         PROCEDURE ADDFREEMAN(CODEDATA:INTEGER);
110
111           /*
112              ADDFREEMAN TAKES A FREEMAN CODE AND APPENDS IT THE
113              BOTTOM OF THE FREEMAN BIN POINTED AT BY "CURRENT"
114           */
115
116         VAR BP: BLPTR;
117             I, J: INTEGER;
118
119         BEGIN
120  1  2  1    IF CURRENT=NIL THEN WRITE(CHR(7):1,CHR(31):1, 'TOO MANY':0)
121  3  2  2    ELSE BEGIN
122  4  2  3       BP:=CURRENT^.LASTBUF; /* GET PTR TO LAST BUFFER */
123  5  2  3       IF BP^.NUMUSED>=18 THEN BEGIN /* SEE IF ALREADY FULL */
124  7  2  5          NEWBLOCK(BP);
125  8  2  5          BP^.NEXT:=NIL;
126  9  2  5          BP^.LASTCODES:=CURRENT^.LASTBUF;
127 10  2  5          CURRENT^.LASTBUF^.NEXT:=BP;
128 11  2  5          CURRENT^.LASTBUF:=BP;
129 12  2  5          BP^.NUMUSED:=0
130                  END;
131 13  2  3       IF (CODEDATA & 10B)<>0 THEN CURRENT^.EDGEFLAG:=1;
132                /* BIT 3 (000010 OCTAL) IS EDGE BIT FOR FREEMAN CODE */
133 15  2  3       BP^.CODES[BP^.NUMUSED]:=CHR(CODEDATA & 7B);
134 16  2  3       BP^.NUMUSED:=BP^.NUMUSED+1
135             END
136          END;
137
138         FUNCTION NEWNODE(HOWMANY: INTEGER; L1,L2,L3,L4: BLPTR): BLPTR;
139
140          /*
141             NEWNODE MAKES A NEW NODE WITH THE SPECIFIED NUMBER
142             OF CONNECTIONS. L(I) ARE THE ADDRESSES OF THE FREEMAN BINS THAT
143             THE NODE IS CONNECTED TO. THE FUNCTION OUTPUT IS THE NODES ADDRESS
144          */
145
146         VAR NP: BLPTR;
147
148         BEGIN
149  1  2  1    IF NODEOUTPUT THEN BEGIN /* DON'T BOTHER UNLESS NEED TO */
150  3  2  3       NEWBLOCK(NP);
151  4  2  3       NEXTNODEID:=NEXTNODEID+1;
152  5  2  3       NP^.NODEID:=NEXTNODEID;
153  6  2  3       NP^.NODEUSED:=HOWMANY;
```

```
154   7    2   3            NP^.PENDING:=HOWMANY;
155   8    2   3            NP^.UPDOWN:=0; /* FOR EDGE INFO */
156   9    2   3            NP^.LINES[1].LADDR:=L1;
157   10   2   3            NP^.LINES[2].LADDR:=L2;
158   11   2   3            NP^.LINES[3].LADDR:=L3;
159   12   2   3            NP^.LINES[4].LADDR:=L4;
160   13   2   3            NEWNODE:=NP
161                         END
162   14   2   2         ELSE NEWNODE:=NIL /* RETURN NIL IF NO ACTION */
163                       END;
164
165                    PROCEDURE INSERT(BP:BLPTR);
166
167                    /*
168                       INSERT TAKES THE SPECIFIED FREEMAN BIN AND INSERTS IT BEFORE
169                       THE CURRENT BIN. IT MAINTAINS THE START AND END
170                       POINTERS TO THE MASTER FREEMAN BIN LIST.
171                    */
172
173                    VAR TP:BLPTR;
174
175                    BEGIN
176   1    2   1         IF (LEFT=NIL) & (RIGHT=NIL) THEN BEGIN /* NO BINS YET */
177   3    2   3            LEFT:=BP;
178   4    2   3            RIGHT:=BP
179                         END
180   5    2   2         ELSE IF CURRENT=NIL THEN BEGIN /* AT THE END OF THE LIST */
181   7    2   4            RIGHT^.NEXT:=BP;
182   8    2   4            BP^.LAST:=RIGHT;
183   9    2   4            RIGHT:=BP
184                         END
185   10   2   2         ELSE BEGIN /* INSERTION IN THE MIDDLE OF LIST */
186   11   2   4            TP:=CURRENT^.LAST;
187   12   2   4            BP^.NEXT:=CURRENT;
188   13   2   4            CURRENT^.LAST:=BP;
189   14   2   4            IF TP<>NIL THEN BEGIN /* CHECK TO SEE IF THERE IS A PREDECESSOR */
190   16   2   6               TP^.NEXT:=BP;
191   17   2   6               BP^.LAST:=TP
192                            END
193   18   2   5            ELSE LEFT:=BP /* OTHERWISE WE HAVE NEW FIRST ELEMENT */
194                         END;
195   19   2   1.        CURRENT:=BP; /* INSERT ALWAYS SETS CURRENT */
196   20   2   1       END;
197
198                    PROCEDURE DELETE(BP:BLPTR);
199
200                    /*
201                       DELETE DELETES THE SPECIFIED FREEMAN BIN IT DOES NOT DELETE
202                       THE STORAGE BLOCKS THAT WERE USED TO STORE FREEMAN CODES.
203                    */
204
205                    BEGIN
206   1    2   1         IF BP^.LAST=NIL THEN LEFT:=BP^.NEXT /* LINK AROUND BIN BEING DELETED */
207   3    2   2                         ELSE BP^.LAST^.NEXT:=BP^.NEXT;
208   4    2   1         IF BP^.NEXT=NIL THEN RIGHT:=BP^.LAST
209   6    2   2                         ELSE BP^.NEXT^.LAST:=BP^.LAST.
210   7    2   1         IF CURRENT=BP THEN CURRENT:=BP^.NEXT; /* AUTO ADVANCE IF NEEDED */
211   9    2   1         RELBLOCK(BP) /* DELETE ACTUAL STORAGE */
212                      END;
213
214                    FUNCTION NEXTFREE(VAR STREAM:BLPTR, VAR COUNT:INTEGER): INTEGER.
215
216                    /*
217                       NEXTFREE TAKES A BLOCK PTR AND AN INDEX AND MANIPULATES
218                       THEM TO PROVIDE A STREAM OF FREEMAN CODES FROM A FREEMAN BIN ON
219                       SUCCESSIVE CALLS. IT IS VERY USEFUL FOR SEQUENTIALLY SCANNING
220                       A FREEMAN CHAIN CODE LIST. EVENTUALLY "STREAM" WILL BE NIL
221                       SIGNALLING THAT ALL CODES HAVE BEEN PROCESSED
222
223                    */
224
225                    BEGIN
226   1    2   1         NEXTFREE:=ORD(STREAM^.CODES[COUNT]);
227   2    2   1         COUNT:=COUNT+1;
228   3    2   1         IF COUNT=STREAM^.NUMUSED THEN BEGIN
229   5    2   0            STREAM:=STREAM^.NEXT;
230   6    2   3            COUNT:=0 /* ARRAY IS 0 TO 17 */
231                         END
232                      END;
233
234                    PROCEDURE COMPACTIFY(BP:BLPTR);
235
236                    /*
237                       COMPACTIFY DOES WHAT ITS NAME IMPLIES. IT TAKES A FREEMAN BIN
238                       AND COMPRESSES ANY RIGHT ANGLE FREEMAN CHAIN CODE PAIRS INTO
239                       THEIR APPROPRIATE DIAGONAL ANALOGUES AND IT MAKES SURE THAT ALL
240                       BUFFER BLOCKS ARE FULL.
241                    */
242
243                    VAR INSTREAM,OUTSTREAM,TP:BLPTR;
244                        I,INCOUNT,OUTCOUNT,OLDCODE,NEWCODE,INTEGER.
245
246                    PROCEDURE ADDFREE(VAR STREAM:BLPTR; VAR COUNT:INTEGER, NEWCODE:INTEGER).
247
248                    /*
249                       LITTLE INTERNAL SUBR THAT DOES OPPOSITE OF
250                       THE SUBR NEXTFREEMAN. ADDS CODES TO AN EXISTING CHAIN CODE
251                       BUFFER LIST. IT ASSUMES THAT THERE IS SPACE ALREADY
252                       AVAILABLE. A GUARANTEE SINCE COMPACTIFICATION CAN
253                       NOT MAKE A CHAIN CODE ANY LONGER
254                    */
255
256                    BEGIN
257   1    3   1         COUNT:=COUNT+1;
258   2    3   1         IF COUNT=18 THEN BEGIN
259   4    3   3            STREAM^.NUMUSED:=18;
260   5    3   3            STREAM:=STREAM^.NEXT;
261   6    3   3            COUNT:=0
262                         END;
263   7    3   1         STREAM^.CODES[COUNT]:=CHR(NEWCODE)
264                      END;
```

```
265
266                        BEGIN
267     1   2   1              INSTREAM:=BP^.COMPSTART; /* START WHERE WE LEFT OFF LAST TIME */
268     2   2   1              OUTSTREAM:=INSTREAM;
269     3   2   1              INCOUNT:=0;
270     4   2   1              OUTCOUNT:=-1; /* KLUGE FOR INITIAL USE OF ADDFREE */
271
272     5   2   1              IF INSTREAM<>NIL THEN BEGIN
273     7   2   3                  OLDCODE:=NEXTFREE(INSTREAM,INCOUNT); /* GET FIRST CODE FROM LIST */
274     8   2   3                  WHILE INSTREAM<>NIL DO /* PROCESS REST OF LIST */
275     9   2   4                  BEGIN
276    10   2   5                      NEWCODE:=NEXTFREE(INSTREAM,INCOUNT); /* GET NEXT ONE */
277    11   2   5                      I:=COMPRESSOR(OLDCODE,NEWCODE); /* SEE IF CAN BE COMPRESSED */
278    12   2   5                      IF I<>0 THEN BEGIN /* YES */
279    14   2   7                          ADDFREE(OUTSTREAM,OUTCOUNT,I); /* ADD DIAGONAL CODE */
280    15   2   7                          IF INSTREAM<>NIL THEN OLDCODE:=NEXTFREE(INSTREAM,INCOUNT)
281    17   2   8                                           ELSE OLDCODE:=-1
282                                     END
283    18   2   6                      ELSE BEGIN /* ELSE JUST PUT BACK OLDCODE */
284    19   2   7                          ADDFREE(OUTSTREAM,OUTCOUNT,OLDCODE);
285    20   2   7                          OLDCODE:=NEWCODE /* USE NEW CODE FOR OLD NEXT TIME */
286                                     END
287                                 END;
288    21   2   3                  IF OLDCODE<>-1 THEN ADDFREE(OUTSTREAM,OUTCOUNT,OLDCODE)
289                                                /* ADD LAST CODE? */
290                                 END;
291    23   2   1              IF OUTSTREAM<>NIL THEN BEGIN /* NOW RELEASE ANY UNNEEDED BLOCKS */
292    25   2   3                  OUTSTREAM^.NUMUSED:=OUTCOUNT+1;
293    26   2   3                  TP:=OUTSTREAM^.NEXT;
294    27   2   3                  OUTSTREAM^.NEXT:=NIL;
295    28   2   3                  BP^.LASTBUF:=OUTSTREAM; /* FIX UP BIN DESCRIPTOR */
296    29   2   3                  BP^.COMPSTART:=OUTSTREAM;
297    30   2   3                  WHILE TP<>NIL DO
298    31   2   4                  BEGIN
299    32   2   5                      INSTREAM:=TP^.NEXT;
300    33   2   5                      RELBLOCK(TP);
301    34   2   5                      TP:=INSTREAM
302                                 END
303                             END
304    35   2   2              ELSE BP^.COMPSTART:=BP^.LASTBUF /* START AT END NEXT TIME */
305                         END;
306
307                         PROCEDURE UNWIND;
308
309                         /*
310                            THIS PROCEDURE TAKES THE CONTENTS OF THE STACK
311                            AND POPS THEM ON A LIFO BASIS. THESE FREEMAN
312                            CODES ARE USED TO MAKE A NEW FREEMAN BIN WHICH
313                            IS INSERTED BEFORE THE "CURRENT" BIN.
314                         */
315
316                         VAR BP: BLPTR;
317                             FP: BLPTR;
318                             I,J,K,M,N,P: INTEGER;
319
320                         BEGIN
321     1   2   1              NEWBUCKET(BP); /* MAKE THE BIN */
322     2   2   1              J:=0; /* TOTAL CODES POPPED COUNTER */
323     3   2   1              P:=0; /* EDGE FLAG */
324     4   2   1              FOR I:=0 TO (STKTOP-1) DIV 18 DO /* ONCE PER BUFFER BLOCK */
325     5   2   2              BEGIN
326     6   2   3                  FP:=BP^.LASTBUF; /* GET PTR TO LAST BLOCK WHICH IS EMPTY */
327     7   2   3                  K:=STKTOP-J; /* GET NUMBER LEFT TO DO */
328     8   2   3                  IF K>18 THEN K:=18; /* ONLY 18 PER BLOCK */
329    10   2   3                  FOR M:=0 TO K-1 DO
330    11   2   4                  BEGIN
331    12   2   5                      N:=ORD(STACK[STKTOP-(J+M)]); /* GET NEXT CODE */
332    13   2   5                      P:=P ! (N & 108); /* OR IN EDGE BIT */
333    14   2   5                      FP^.CODES[M]:=CHR(N & 78) /* SAVE CODE */
334                                 END;
335    15   2   3                  J:=J+K; /* ADD NUMBER DONE TO TOTAL DONE */
336    16   2   3                  FP^.NUMUSED:=K; /* SET NUM USED */
337    17   2   3                  IF J<STKTOP THEN BEGIN /* MORE LEFT? */
338    19   2   5                      NEWBLOCK(FP); /* MAKE A NEW BUFFER BLOCK AND APPEND IT */
339    20   2   5                      BP^.LASTBUF^.NEXT:=FP;
340    21   2   5                      FP^.LAST:=BP^.LASTBUF;
341    22   2   5                      BP^.LASTBUF:=FP;
342    23   2   5                      FP^.NEXT:=NIL;
343    24   2   5                  END
344                             END;
345    25   2   1              INSERT(BP); /* INSERT THE NEW BIN. CHECK ITS EDGE FLAG */
346    26   2   1              IF P<>0 THEN BP^.EDGEFLAG:=1;
347    28   2   1              NOTSPECIAL:=TRUE /* EXIT SPECIAL STACKING MODE */
348                         END;
349
350                         PROCEDURE MEMFUL;
351
352                         VAR PLACE,I: INTEGER;
353                             NP: BLPTR;
354
355                         BEGIN
356     1   2   1              WRITE(CHR(7)); /* BEEP TERMINAL TO INDICATE MEM FULL */
357     2   2   1              PLACE:=0; /* FIND PLACE OF CURRENT IN LIST */
358     3   2   1              NP:=LEFT;
359     4   2   1              WHILE NP<>CURRENT DO
360     5   2   2              BEGIN
361     6   2   3                  PLACE:=PLACE+1;
362     7   2   3                  NP:=NP^.NEXT
363                             END;
364     8   2   1              CURRENT:=LEFT; /* NOW FLUSH AND DUPLICATE ALL BINS */
365     9   2   1              WHILE CURRENT<>NIL DO
366    10   2   2              BEGIN
367    11   2   3                  NEWBUCKET(NP); /* MAKE REPLSACEMENT */
368    12   2   3                  NP^.STARTNODE:=NEWNODE(2,CURRENT,NP,NIL,NIL); /* MAKE A NODE TO LINK THEM */
369    13   2   3                  CURRENT^.ENDNODE:=NP^.STARTNODE;
370    14   2   3                  LINEIFY(CURRENT); /* PROCESS CURRENT BIN */
371    15   2   3                  NP^.XSTART:=ENDX; /* END OF CURRENT BIN SET AS SIDE EFFECT */
372    16   2   3                  NP^.YSTART:=ENDY;
373    17   2   3                  INSERT(NP); /* PUT NEW BIN IN WHERE OLD ONE WAS. INSERT DOES 'CURRENT:=NP' */
374    18   2   3                  CURRENT:=CURRENT^.NEXT /* ADVANCE TO NEXT OLD BIN */
375                             END;
```

```
376   19   2   1          CURRENT:=LEFT; /* PUT CURRENT BACK TO RIGHT POSITION */
377   20   2   1          FOR I:=1 TO PLACE DO
378   21   2   2              CURRENT:=CURRENT^.NEXT
379                       END;
380
381                    BEGIN
```

Errors detected: 0
Free memory: 11452 words

LINIFY                OMSI Pascal V1.2C RT11                Site 814-1  Page 1
Tektronix, Inc., Tek Labs, Building 50, Beaverton OR 97077

Line  Stmt Level  Nest   Source Statement

```
  1                    PROGRAM LINIFY;
  2
  3                    /*
  4                        LINIFY IS THE ACTUAL LINE FINDING ROUTINE. IT TAKES
  5                        AS A PARAMETER THE ADDRESS OF A FREEMAN BIN WHICH IT THEN
  6                        OUTPUTS ACCORDING TO OPTIONS SPECIFIED PRIOR TO DIGITIZATION
  7                        IT WILL OUTPUT THE FREEMAN BIN AS FREEMANS CODES ON
  8                        THE OPERATOR TERMINAL, AS LINES ON THAT TERMINAL, OR AS NODES
  9                        WHICH ARE SENT TO THE HOST PROCESSOR.
 10                    */
 11
 12                    TYPE RAST=ARRAY[0..511] OF BOOLEAN;
 13                         FILERAST=ARRAY[0..31] OF INTEGER;
 14                         ALFA=ARRAY[1..14] OF CHAR;
 15                         XYPAIR=RECORD
 16                              PX: INTEGER;
 17                              PY: INTEGER
 18                              END;
 19                         BLOCK=RECORD
 20                              NEXT: ^BLOCK;
 21                              CASE INTEGER OF
 22                         1:      (LAST: ^BLOCK;
 23                                  BROTHER: ^BLOCK;
 24                                  ID: INTEGER;
 25                                  XSTART: INTEGER;
 26                                  YSTART: INTEGER;
 27                                  STARTNODE: ^BLOCK;
 28                                  ENDNODE: ^BLOCK;
 29                                  FIRSTBUF: ^BLOCK;
 30                                  LASTBUF: ^BLOCK;
 31                                  COMPSTART: ^BLOCK;
 32                                  EDGEFLAG: INTEGER);
 33                         2:      (NODEID: INTEGER;
 34                                  NODEUSED: INTEGER;
 35                                  PENDING: INTEGER;
 36                                  UPDOWN: INTEGER;
 37                                  LINES: ARRAY[1..4] OF RECORD
 38                                         LADDR: ^BLOCK;
 39                                         NID: INTEGER
 40                                         END);
 41                         3:      (LASTCODES: ^BLOCK;
 42                                  NUMUSED: INTEGER,
 43                                  CODES: ARRAY[0..17] OF CHAR)
 44                              END;
 45                         BLPTR=^BLOCK;
 46
 47                    VAR ROMDATUM, I, J, K, XPOS, YPOS, TX, TY, ERROR, ARCERROR, STKTOP, B, C, S, BUCKETID  INTEGER,
 48                        ONAME, INAME: ALFA;
 49                        ENDX, ENDY: INTEGER;
 50                        YESNO: CHAR;
 51                        NOTSPECIAL, FREEOUTPUT, LINEOUTPUT, ARCOUTPUT: BOOLEAN;
 52                        STACK: ARRAY[1..1024] OF CHAR;
 53                        FREROM: ARRAY[256..511] OF INTEGER;
 54                        LEFT, RIGHT, CURRENT, TP: BLPTR;
 55                        DECODER: ARRAY[0..31] OF XYPAIR,
 56                        FREES: ARRAY[0..7] OF XYPAIR;
 57                        COMPRESSOR: ARRAY[0..7,0..7] OF INTEGER;
 58                        REVERSER: ARRAY[0..15] OF CHAR;
 59                        SORTABLE: ARRAY[0..7,0..7] OF INTEGER;
 60                        OPPERROR, NEXTNODEID: INTEGER;
 61                        REDISPLAY, ALPHAMODE, FILEOUT, NODEOUTPUT, GRIDDING: BOOLEAN.
 62                        FREELIST: BLPTR;
 63                        FCREG ORIGIN 170010B: INTEGER;
 64                        XPOSREG ORIGIN 170012B: INTEGER.
 65                        RAMSWITCH ORIGIN 170014B: INTEGER;
 66                        RAMS ORIGIN 160000B: ARRAY [0..511] OF INTEGER;
 67                        STATUS ORIGIN 170000B: INTEGER;
 68                        MOTORREADY ORIGIN 170006B: INTEGER;
 69                        CIRCBUF ORIGIN 400B: ARRAY[0..127] OF INTEGER,
 70                        CB ORIGIN 270B: INTEGER;
 71                        TRACE, STOPPING, TESTING, IMAGEMODE, DOTTING, BARSING, INPUTGIVEN: BOOLEAN;
 72                        LASTXPOS, LASTGRX, LASTGRY, LASTHIY, LASTHIX: INTEGER;
 73                        BINGCASES: ARRAY[0..7] OF INTEGER;
 74                        XCEN, YCEN, XSCALE, YSCALE: REAL;
 75                        BLOCKSLEFT, MAXBLOCKS: INTEGER;
 76                        SCALED: BOOLEAN;
 77                        WINDOWWIDTH, MAXBEND: INTEGER;
 78
 79                    PROCEDURE COMPACTIFY(BP: BLPTR); EXTERNAL;  /* COMPRESSES A FREEMAN BIN */
 80                    PROCEDURE ANMODE; EXTERNAL;   /* GRAPHICS */
 81                    PROCEDURE RELBLOCK(BP: BLPTR); EXTERNAL;   /* FREE SOME STORAGE */
 82                    FUNCTION NEXTFREE(VAR P: BLPTR; VAR C: INTEGER): INTEGER; EXTERNAL;  /* GET NEXT CODE FROM A BIN */
 83                    PROCEDURE DELETE(BP: BLPTR); EXTERNAL;  /* DELETE A FREEMAN BIN */
 84                    PROCEDURE MOVEABS(X, Y: INTEGER); EXTERNAL;   /* GRAPHICS */
 85                    PROCEDURE DRAWABS(X, Y: INTEGER); EXTERNAL;   /* GRAPHICS */
 86                    FUNCTION NEWNODE(HOWMANY: INTEGER; L1, L2, L3, L4: BLPTR): BLPTR; EXTERNAL;  /* MAKES NODES */
 87                    PROCEDURE FLIP; EXTERNAL;  /* DIRECT I/O TO OTHER SERIAL LINE */
 88                    PROCEDURE HOSTWT; EXTERNAL;   /* WAIT UNTIL HOST IS READY */
 89
 90                    /*$E+*/
 91
 92                    PROCEDURE LINEIFY(BP: BLPTR);
 93
 94                    VAR EP, FP, TP: BLPTR;
 95                        COUNT, AFX, AFY, PINDEX: INTEGER;
 96                        EC, EX, EY, BX, BY, I, J, R: INTEGER;
```

```
 97                              NP: BLPTR;
 98
 99                              PROCEDURE CHECKNODE(TONODE, FROMNODE: BLPTR; X, Y, OX, OY: INTEGER);
100
101                              /*
102                                 CHECKNODE CHECKS TO SEE IF ALL THE LINES EMANATING FROM A NODE
103                                 HAVE BEEN CREATED. IF SO, THEIR ID'S ARE AVAILABLE FOR TRANSMISSION.
104                              */
105
106                              VAR I, MASK: INTEGER;
107                                  TEMP: BLPTR;
108
109                              BEGIN
110    1     3    1                IF (TONODE<>NIL) & (FROMNODE<>NIL) THEN BEGIN /* CHECK ARG EXIST */
111    3     3    3                  MASK:=1; /* FOR EDGE VERSUS LINE INFO */
112    4     3    3                  FOR I:=1 TO TONODE^.NODEUSED DO /* CHECK ALL LINKS TO FIND CURRENT BIN */
113    5     3    4                    IF TONODE^.LINES[I].LADDR=BP THEN BEGIN /* BP IS ARC TO LINIFY */
114    7     3    6                      TONODE^.LINES[I].NID:=FROMNODE^.NODEID; /* CONNECT TO OPPOSITE NODE */
115    8     3    6                      TONODE^.LINES[I].LADDR:=NIL; /* DONT'T DO IT AGAIN */
116    9     3    6                      IF BP^.EDGEFLAG=1 THEN TONODE^.UPDOWN:=TONODE^.UPDOWN ' MASK; /* CHECK EDGES */
117   11     3    6                      EXIT /* ONCE FOUND DO IT AND LEAVE */
118                                    END
119   12     3    5                    ELSE MASK:=MASK*2; /* SHIFT BIT FOR NEXT LINK */
120   13     3    3                  TONODE^.PENDING:=TONODE^.PENDING-1; /* DECR NUMBER TO DO */
121   14     3    3                  IF TONODE^.PENDING<=0 THEN BEGIN /* SEE IF READY TO GO */
122   16     3    5                    FLIP; /* LOOKS THAT WAY, TALK TO HOST */
123   17     3    5                    HOSTWT; /* MAKE SURE ITS READY */
124   18     3    5                    WRITE('1':1, TONODE^.NODEID:6, X:5, Y:5, TONODE^.UPDOWN:3, TONODE^.NODEUSED:2);
125   19     3    5                    FOR I:=1 TO TONODE^.NODEUSED DO
126   20     3    6                      WRITE(TONODE^.LINES[I].NID:6);
127   21     3    5                    WRITELN; /* ONE NODE PER LINE */
128   22     3    5                    FLIP /* BACK TO THE TERMINAL */
129                                    END
130                                  END
131                                END;
132
133                              PROCEDURE NEXTENDPOINT;
134
135                              /*
136                                 NEXTENDPOINT IS THE HEART OF THE LINE FINDING ALGORITHM. IT
137                                 WALKS DOWN THE FREEMAN CHAIN CODE KEEPING TRACK OF THE
138                                 POSITION OF THE MARKERS IN X-Y SPACE. WHEN IT FINDS A LARGE
139                                 ENOUGH DEVIATION IT RETURNS THE CURRENT ENDPOINT IN
140                                 THE NON-LOCAL VARIABLES EX AND EY.
141                              */
142
143                              VAR MP1, MP2, LASTEP: BLPTR;
144                                  WINDOW: ARRAY[1..15] OF INTEGER;
145                                  CORNERFLAG, LOCALSTATE, GLOBALSTATE: BOOLEAN;
146                                  DX, DY, BACKUP, MC1, MC2, MX1, MX2, MY1, MY2, FCODE, I, J, NUMFREES: INTEGER;
147
148                              FUNCTION GLOBAL(FCODE: INTEGER; VAR BACKUP: INTEGER): BOOLEAN;
149
150                              /*
151                                 GLOBAL DOES THE ACTUAL OUT OF BOUNDS CHECKING, RETURNING
152                                 A BOOLEAN VALUE. IF THAT VALUE IS TRUE THEN BACKUP
153                                 CONTAINS THE NUMBER OF FREEMAN CHAIN CODES THAT THE BIN
154                                 SHOULD BE BACKED UP.
155                              */
156
157                              VAR PX, PY, ERRORX, ERRORY, F, MX, MY: INTEGER;
158
159                              BEGIN
160    1     4    1                GLOBAL:=FALSE; /* ASSUME FAILURE TO BREAK LINE */
161                              /*
162                                 GLOBALSTATE FLIP FLOPS IN ORDER TO GET TWO FREEMAN
163                                 CODES AT THE END OF THE BIN FOR EVERY ONE FREEMAN CODE GOTTEN
164                                 FOR THE MIDDLE OF THE BIN FURTHERMORE IT IS NECESSARY TO WAIT UNTIL
165                                 ENOUGH CODES HAVE BEEN READ BEFORE ANYTHING CAN BE DONE THIS
166                                 IS BEACUSE OF THE USE OF AN AVERAGING WINDOW ON THE MIDDLE POSITION
167                              */
168    2     4    1                IF GLOBALSTATE & (NUMFREES>=WINDOWWIDTH) THEN BEGIN
169    4     4    3                  MX:=(MX1+MX2) DIV 2; /* GET AVERAGED MIDDLE POSITION */
170    5     4    3                  MY:=(MY1+MY2) DIV 2;
171    6     4    3                  PX:=MX*2-SX; /* EXTRAPOLATE CORRECT ENDPOINT */
172    7     4    3                  PY:=MY*2-SY;
173    8     4    3                  ERRORX:=ABS(EX-PX); /* GET X AND Y ERROR COMPONENTS */
174    9     4    3                  ERRORY:=ABS(EY-PY);
175   10     4    3                  IF SQRTABLE[ERRORX, ERRORY]>ERROR THEN BEGIN /* SEE IF TOO MUCH */
176   12     4    5                    GLOBAL:=TRUE;
177   13     4    5                    IF ERRORX>ERRORY THEN BACKUP:=ERRORX /* SET BACKUP */
178   15     4    6                                     ELSE BACKUP:=ERRORY
179                                    END;
180   16     4    3                  F:=NEXTFREE(MP1, MC1) & 7B; /* GET NEXT FREEMAN CODE FROM LAGGING MARKER */
181   17     4    3                  MX1:=MX1+FREES[F].PX; /* UPDATE POSITION */
182   18     4    3                  MY1:=MY1+FREES[F].PY;
183   19     4    3                  F:=NEXTFREE(MP2, MC2) & 7B; /* DO SAME FOR LEADING POSITION */
184   20     4    3                  MX2:=MX2+FREES[F].PX;
185   21     4    3                  MY2:=MY2+FREES[F].PY
186                                  END;
187   22     4    1                GLOBALSTATE:=NOT GLOBALSTATE /* TOGGLE STATE */
188                                END;
189
190                              BEGIN
191    1     3    1                NUMFREES:=0; /* NUMBER OF FREEMAN CODES READ FROM END MARKER */
192    2     3    1                SX:=EX; /* SET START AND MIDDLE MARKERS TO CURRENT END MARKER */
193    3     3    1                SY:=EY;
194    4     3    1                MX1:=EX;
195    5     3    1                MY1:=EY;
196    6     3    1                MC1:=EC; /* POINTER AND INDEXES TOO */
197    7     3    1                MP1:=EP;
198    8     3    1                GLOBALSTATE:=FALSE;
199    9     3    1                WHILE EP<>NIL DO /* DON'T DO IT BEYOND END OF LIST */
200   10     3    2                BEGIN
201   11     3    3                  LASTEP:=EP; /* GET CURRENT POINTER */
202   12     3    3                  FCODE:=NEXTFREE(EP, EC) & 7B; /* GET NEXT FREEMAN CODE FROM END OF LIST */
203   13     3    3                  NUMFREES:=NUMFREES+1;
204   14     3    3                  EX:=EX+FREES[FCODE].PX; /* UPDATE POSITION */
205   15     3    3                  EY:=EY+FREES[FCODE].PY;
206   16     3    3                  IF NUMFREES=WINDOWWIDTH THEN BEGIN /* SEE IF THE LAGGING MARKER CAN BE SET */
207   18     3    5                    MX2:=EX;
```

```
208    19    3    5              MY2:=EY;
209    20    3    5              MC2:=EC;
210    21    3    5              MP2:=EP
211                             END;
212    22    3    3         CORNERFLAG:=GLOBAL(FCODE,BACKUP); /* SEE IF THAT LAST CODE MADE A CORNER */
213    23    3    3         IF CORNERFLAG THEN BEGIN
214    25    3    5           IF EP=NIL THEN BEGIN /* LAST CODE MADE CORNER */
215    27    3    7             EP:=LASTEP; /* MAKE BACKUP POSSIBLE */
216    28    3    7             EC:=EP^.NUMUSED
217                             END;
218    29    3    5           IF BACKUP>NUMFREES THEN BACKUP:=NUMFREES-1; /* SEE IF BACKUP TOO MUCH */
219    31    3    5           FOR I:=1 TO BACKUP DO /* BACKUP END MARKER */
220    32    3    6           BEGIN
221    33    3    7             EC:=EC-1;
222    34    3    7             IF EC<0 THEN BEGIN
223    36    3    9               EP:=EP^.LASTCODES;
224    37    3    9               EC:=EP^.NUMUSED-1
225                               END;
226    38    3    7             J:=ORD(EP^.CODES[EC]);
227    39    3    7             EX:=EX-FREES[J].PX; /* POSITION TOO */
228    40    3    7             EY:=EY-FREES[J].PY
229                             END;
230    41    3    5           EXIT /* EXIT LOOP WHEN A CORNER IS FOUND */
231                           END
232                         END;
233    42    3    1         IF EP<>NIL THEN BEGIN /* IS THIS A CORNER IN A BIN */
234    44    3    3           NP:=NEWNODE(2,BP,BP,NIL,NIL); /* MAKE THE NODE FOR IT */
235    45    3    3           CHECKNODE(BP^.STARTNODE,NP,SX,SY,EX,EY); /* CHECK BOTH DIRECTIONS */
236    46    3    3           CHECKNODE(NP,BP^.STARTNODE,EX,EY,SX,SY);
237    47    3    3           IF BP^.STARTNODE<>NIL THEN
238    48    3    4             IF BP^.STARTNODE^.PENDING<=0 THEN RELBLOCK(BP^.STARTNODE); /* RELEASE IF TRANSMITTED */
239    50    3    3           BP^.STARTNODE:=NP; /* NP IS NOW THE STARTNODE OF THE BIN */
240    51    3    3           BP^.XSTART:=EX; /* UPDATE START POS TOO */
241    52    3    3           BP^.YSTART:=EY;
242    53    3    3           IF LINEOUTPUT THEN MOVEABS(SX,SY) /* IF DRAWING LINES SET UP FOR DRAW */
243                           END
244                         END;
245
246                  BEGIN
247     1    2    1    IF BP=NIL THEN WRITE(CHR(7):1,CHR(31):1,'NULL BIN':8) /* ERROR CHECK */
248     3    2    2    ELSE BEGIN
249     4    2    3      IF ALPHAMODE THEN BEGIN /* OUTPUT FREEMAN CODE AS CHARACTERS? */
250     6    2    5        FP:=BP^.FIRSTBUF; /* GET PTR TO FIRST BLOCK OF FREEMAN CODES */
251     7    2    5        IF FP<>NIL THEN BEGIN
252     9    2    7          COUNT:=0; /* INIT INDEX */
253    10    2    7          WHILE FP<>NIL DO /* WHILE THERE FREEMAN CODES LEFT */
254    11    2    8          BEGIN
255    12    2    9            J:=NEXTFREE(FP,COUNT) & 7B; /* GET NEXT CODE */
256    13    2    9            WRITE(CHR(J+48):1) /* WRITE CODE AS ASCII NUMERAL */
257                            END;
258    14    2    7          WRITELN; /* <CR> TO TERMINATE A CHAIN CODE */
259    15    2    7          WRITELN /* BLANK LINE TO SEPARATE */
260                           END
261                         END;
262    16    2    3      COMPACTIFY(BP); /* SQUEEZE EXTRA BLOCKS AND CORNERS OUT OF CHAIN CODE */
263    17    2    3      BUCKETID:=BUCKETID+1; /* NEED NEW ID FOR BIN */
264    18    2    3      BP^.ID:=BUCKETID;
265    19    2    3      IF FREEOUTPUT THEN BEGIN /* DRAW ACTUAL FREEMAN CODES? */
266    21    2    5        EX:=BP^.XSTART; /* INITIALIZE TO THE BEGINNING OF THE BIN */
267    22    2    5        EY:=BP^.YSTART;
268    23    2    5        MOVEABS(EX,EY);
269    24    2    5        FP:=BP^.FIRSTBUF; /* GET PTR TO CHAIN CODE BLOCKS */
270    25    2    5        IF FP<>NIL THEN BEGIN
271    27    2    7          COUNT:=0; /* INIT INDEX */
272    28    2    7          J:=NEXTFREE(FP,COUNT) & 7B; /* GET FIRST CODE */
273    29    2    7          REPEAT
274    30    2    8          BEGIN
275    31    2    9            I:=J; /* DO RUN LENGTH COMPRESSION */
276    32    2    9            R:=1; /* THE RUN LENGTH */
277    33    2    9            IF FP<>NIL THEN BEGIN
278    35    2    11             J:=NEXTFREE(FP,COUNT) & 7B; /* GET NEXT CODE */
279    36    2    11             WHILE I=J DO /* DO IT UNTIL DIFFERENT CODE IS FOUND */
280    37    2    12             BEGIN
281    38    2    13               R:=R+1;
282    39    2    13               IF FP=NIL THEN EXIT /* QUIT IF LIST EXHAUSTED */
283    41    2    14                 ELSE J:=NEXTFREE(FP,COUNT) & 7B
284                                 END
285                             END;
286    42    2    9            EX:=EX+FREES[I].PX*R; /* UPDATE POSITION */
287    43    2    9            EY:=EY+FREES[I].PY*R;
288    44    2    9            DRAWABS(EX,EY) /* DRAW TO IT */
289                           END
290                         UNTIL (FP=NIL) & (I=J) /* TERMINATE WHEN LIST DONE AND CODES ARE EQUAL */
291                         END
292    45    2    6        ELSE DRAWABS(EX,EY) /* DRAW POINT FOR EMPTY LIST */
293                         END;
294    46    2    3      IF LINEOUTPUT ! NODEOUTPUT THEN BEGIN /* TRANSMIT END POINT INFO? */
295    48    2    5        EX:=BP^.XSTART; /* INITAIZE END POSITION */
296    49    2    5        EY:=BP^.YSTART;
297    50    2    5        IF LINEOUTPUT THEN MOVEABS(EX,EY); /* SET UP LINE DRAWING */
298    52    2    5        IF BP^.FIRSTBUF<>NIL THEN BEGIN
299    54    2    7          EP:=BP^.FIRSTBUF; /* INITIALIZE MARKERS */
300    55    2    7          EC:=0;
301    56    2    7          WHILE EP<>NIL DO /* UNTIL LIST IS EMPTY */
302    57    2    8          BEGIN
303    58    2    9            NEXTENDPOINT; /* GET NEXT CORNER IN EX,EY */
304    59    2    9            IF LINEOUTPUT THEN DRAWABS(EX,EY) /* DRAW TO IT IF WANTED */
305                            END
306                           END
307    61    2    6        ELSE IF LINEOUTPUT THEN DRAWABS(EX,EY) /* NULL LIST, DRAW POINT */
308                         END;
309    63    2    3      IF NODEOUTPUT THEN BEGIN /* COMPLETE NODE TRANSMISSION? */
310    65    2    5        CHECKNODE(BP^.STARTNODE,BP^.ENDNODE,BP^.XSTART,BP^.YSTART,EX,EY); /* CHECK NODES */
311    66    2    5        CHECKNODE(BP^.ENDNODE,BP^.STARTNODE,EX,EY,BP^.XSTART,BP^.YSTART);
312    67    2    5        IF BP^.STARTNODE^.PENDING<=0 THEN RELBLOCK(BP^.STARTNODE); /* SEE IF CAN BE RELEASED */
313    69    2    5        IF (BP^.STARTNODE<>BP^.ENDNODE) &
314    70    2    6          (BP^.ENDNODE^.PENDING<=0) THEN RELBLOCK(BP^.ENDNODE)
315                         END;
316    71    2    3      FP:=BP^.FIRSTBUF; /* FREE ALL FREEMAN CODE BUFFER BLOCKS */
317    72    2    3      WHILE FP<>NIL DO
318    73    2    4      BEGIN
```

```
319    74    2    3                    TP:=FP^.NEXT;
320    75    2    3                    RELBLOCK(FP);
321    76    2    3                    FP:=TP
322                                    END;
323    77    2    3                 DELETE(BP); /* NOW DELETE ACTUAL BIN DESCRIPTOR */
324    78    2    3              END;
325    79    2    1           ENDX:=EX; /* SET END OF BIN AS SIDE EFFECT FOR 'MEMFUL' */
326    80    2    1           ENDY:=EY;
327    81    2    1           ANMODE /* LEAVE IN ALPHA MODE IN CASE OF ERROR MESSAGE */
328                            END; /* THAT'S ALL FOLKS */
329
330                         BEGIN
```

Errors detected: 0
Free memory: 11008 words

SING                   OMSI Pascal V1.2C RT11              Site 014-1  Page 1
Tektronix, Inc., Tek Labs, Building 50, Beaverton OR 97077

Line  Stat Level  Nest  Source Statement

```
  1                       PROGRAM SING;
  2
  3                       /*
  4                          SING IS THE SINGLARITY ANALYZER FOR THE TEKPCS SYSTEM
  5                          IT'S ARGUMENTS ARE THE WINDOW NUMBER, WINDOW DESCRIPTOR AND TWO
  6                          POSSIBLE FREEMAN CODES.
  7                       */
  8
  9                       TYPE RAST=ARRAY[0..511] OF BOOLEAN;
 10                            FILERAST=ARRAY[0..31] OF INTEGER;
 11                            ALFA=ARRAY[1..14] OF CHAR;
 12                            XYPAIR=RECORD
 13                               PX: INTEGER;
 14                               PY: INTEGER
 15                               END;
 16                            BLOCK=RECORD
 17                               NEXT: ^BLOCK;
 18                               CASE INTEGER OF
 19                            1:   (LAST: ^BLOCK;
 20                                  BROTHER: ^BLOCK;
 21                                  ID: INTEGER;
 22                                  XSTART: INTEGER;
 23                                  YSTART: INTEGER;
 24                                  STARTNODE: ^BLOCK;
 25                                  ENDNODE: ^BLOCK;
 26                                  FIRSTBUF: ^BLOCK;
 27                                  LASTBUF: ^BLOCK;
 28                                  COMPSTART: ^BLOCK;
 29                                  EDGEFLAG: INTEGER);
 30                            2:   (NODEID: INTEGER;
 31                                  NODEUSED: INTEGER;
 32                                  PENDING: INTEGER;
 33                                  UPDOWN: INTEGER;
 34                                  LINES: ARRAY[1..4] OF RECORD
 35                                            LADDR: ^BLOCK;
 36                                            NID: INTEGER
 37                                            END);
 38                            3:   (LASTCODES: ^BLOCK;
 39                                  NUMUSED: INTEGER;
 40                                  CODES: ARRAY[0..17] OF CHAR)
 41                                  END;
 42                            BLPTR=^BLOCK;
 43
 44                       VAR ROMDATUM, I, J, K, XPOS, YPOS, TX, TY, ERROR, ARCERROR, STKTOP, B, C, S, BUCKETID: INTEGER;
 45                           ONAME, INAME: ALFA;
 46                           ENDX, ENDY: INTEGER;
 47                           YESNO: CHAR;
 48                           NOTSPECIAL, FREEOUTPUT, LINEOUTPUT, ARCOUTPUT: BOOLEAN;
 49                           STACK: ARRAY[1..1024] OF CHAR;
 50                           FREROM: ARRAY[256..511] OF INTEGER;
 51                           LEFT, RIGHT, CURRENT, TP: BLPTR;
 52                           DECODER: ARRAY[0..31] OF XYPAIR;
 53                           FREES: ARRAY[0..7] OF XYPAIR;
 54                           COMPRESSOR: ARRAY[0..7, 0..7] OF INTEGER;
 55                           REVERSER: ARRAY[0..15] OF CHAR;
 56                           SORTABLE: ARRAY[0..7, 0..7] OF INTEGER;
 57                           OPPERROR, NEXTNODEID: INTEGER;
 58                           CYBERLINK, ALPHAMODE, FILEOUT, NODEOUTPUT, TYPE2NODE: BOOLEAN;
 59                           FREELIST: BLPTR;
 60                           FCREG ORIGIN 170010B: INTEGER;
 61                           XPOSREG ORIGIN 170012B: INTEGER;
 62                           RAMSWITCH ORIGIN 170014B: INTEGER;
 63                           RAMS ORIGIN 160000B: ARRAY[0..511] OF INTEGER;
 64                           STATUS ORIGIN 170000B: INTEGER;
 65                           MOTORREADY ORIGIN 170006B: INTEGER;
 66                           CIRCBUF ORIGIN 400B: ARRAY[0..127] OF INTEGER;
 67                           CB ORIGIN 270B: INTEGER;
 68                           TRACE, STOPPING, TESTING, IMAGEMODE, DOTTING, BARSING, INPUTGIVEN: BOOLEAN;
 69                           LASTXPOS, LASTGRX, LASTGRY, LASTHIY, LASTHIX: INTEGER;
 70                           SINGCASES: ARRAY[0..7] OF INTEGER;
 71                           XCEN, YXEN, XSCALE, YSCALE: REAL;
 72                           BLOCKSLEFT, MAXBLOCKS: INTEGER;
 73                           SCALED: BOOLEAN;
 74
 75                       PROCEDURE NEWBUCKET(VAR BPTR: BLPTR); EXTERNAL; /* CREATES A NEW BIN */
 76                       PROCEDURE RELBLOCK(BP: BLPTR); EXTERNAL; /* RELEASES A BLOCK TO THE FREE LIST */
 77                       PROCEDURE ADDFREEMAN(CODEDATA: INTEGER); EXTERNAL; /* ADDS A CODE TO THE CURRENT BIN */
 78                       PROCEDURE INSERT(BP: BLPTR); EXTERNAL; /* INSERTS THE SPECIFIED BIN BEFORE THE CURRENT BIN */
 79                       PROCEDURE DELETE(BP: BLPTR); EXTERNAL; /* DELETES THE SPECIFIED BIN */
 80                       FUNCTION NEXTFREE(VAR STREAM: BLPTR, VAR COUNT: INTEGER): INTEGER; EXTERNAL; /* GENERATES A STREAM OF C
 81                       PROCEDURE COMPACTIFY(BP: BLPTR); EXTERNAL; /* COMPRESSES A FREEMAN BIN */
 82                       PROCEDURE UNWIND; EXTERNAL; /* UNWINDS THE STACK WHEN SPECIAL MODE IS EXITTED */
 83                       PROCEDURE LINEIFY(BP: BLPTR); EXTERNAL; /* LINE FINDS IN A FREMAN BIN */
 84                       FUNCTION NEWNODE(HOWMANY: INTEGER; L1, L2, L3, L4: BLPTR): BLPTR; EXTERNAL; /* MAKES A NODE */
 85
 86                       /*$E+*/
 87
 88                       PROCEDURE SINGULARITY(ROMDEX: INTEGER, ROMDATA: INTEGER, C1: INTEGER, C2: INTEGER);
 89
 90                       VAR LASTCODE, J, K: INTEGER;
```

```
 91                              FLAG1,FLAG2,SAVESPC: BOOLEAN;
 92                              BP,N1,N2,L1,L2,L3,L4,FP1,FP2,NP,FP,FPF,FPL: BLPTR;
 93
 94                         BEGIN
 95      1    2   1          LASTCODE:=C1; /* SET TO SEE LATER IF CURRENT SHOULD BE ADVANCED */
 96      2    2   1          SAVESPC:=NOTSPECIAL;
 97      3    2   1          J:=(ROMDATA DIV 8) & 7B; /* GET SINGULARITY TYPE */
 98      4    2   1          CASE J OF
 99                              /* CONTINUE CURRENT BIN */
100      5    2   2   0:        IF NOTSPECIAL THEN ADDFREEMAN(C1) /* NORMAL MODE */
101      7    2   3            ELSE BEGIN
102      8    2   4              IF (C1 & 7B)=0 THEN BEGIN /* STACK HORIZONTAL FREMAN CODE 0 */
103     10    2   6                STKTOP:=STKTOP+1;
104     11    2   6                STACK[STKTOP]:=REVERSER[C1] /* STACK THE REVERSE OF THE CODE */
105                                END
106     12    2   5              ELSE BEGIN /* ELSE TERMINATE SPECIAL MODE */
107     13    2   6                UNWIND, /* UNWIND THE STACKED CODES */
108     14    2   6                NEWBUCKET(N1); /* MAKE A BIN FOR THE CURRENT CODE */
109     15    2   6                N1^.STARTNODE:=NEWNODE(2,N1,CURRENT,NIL,NIL); /* MAKE NODES FOR IT */
110     16    2   6                CURRENT^.STARTNODE:=N1^.STARTNODE;
111     17    2   6                CURRENT:=CURRENT^.NEXT; /* INSERT NEW BIN AFTER UNSTACKED BIN */
112     18    2   6                INSERT(N1);
113     19    2   6                ADDFREEMAN(C1) /* ADD FREEMAN CODE TO THE NEWLY INSERTED BIN */
114                                END
115                              END;
116                            /* ONE START SINGULARITY */
117     20    2   2   1:        BEGIN
118     21    2   3              NEWBUCKET(N1); /* MAKE AND INSERT THE NEW BIN */
119     22    2   3              INSERT(N1);
120     23    2   3              IF ROMDATA=010B THEN BEGIN /* SPECIAL CASE SINGLE PIXEL WINDOW */
121     25    2   5                RELBLOCK(N1^.FIRSTBUF);
122     26    2   5                N1^.FIRSTBUF:=NIL; /* NO FREEMAN CHAIN CODES */
123     27    2   5                N1^.LASTBUF:=NIL;
124     28    2   5                N1^.COMPSTART:=NIL;
125     29    2   5                N1^.STARTNODE:=NEWNODE(2,N1,N1,NIL,NIL); /* MAKE SELF REFERENTIAL NODE */
126     30    2   5                N1^.ENDNODE:=N1^.STARTNODE;
127     31    2   5                LINEIFY(N1);
128     32    2   5                LASTCODE:=0 /* SET TO NOT ADVANCE CURRENT */
129                                END
130     33    2   4              ELSE BEGIN
131     34    2   5                N1^.STARTNODE:=NEWNODE(1,N1,NIL,NIL,NIL); /* MAKE A 1 NODE FOR THE START */
132     35    2   5                ADDFREEMAN(C1) /* ADD THE FREEMAN CODE */
133                                END
134                              END.
135                            /* ONE END SINGULARITY */
136     36    2   2   2:        IF NOTSPECIAL THEN BEGIN /* NORMAL MODE */
137     38    2   4              CURRENT^.ENDNODE:=NEWNODE(1,CURRENT,NIL,NIL,NIL); /* MAKE AN END NODE FOR CURRENT BIN */
138     39    2   4              LINEIFY(CURRENT); /* LINE FIND AND DELETE CURRENT BIN */
139     40    2   4              LASTCODE:=0 /* NO ADVANCE */
140                              END
141     41    2   3            ELSE BEGIN /* ELSE UNSTACK AND TREAT AS ONE START */
142     42    2   4              UNWIND;
143     43    2   4              CURRENT^.STARTNODE:=NEWNODE(1,CURRENT,NIL,NIL,NIL); /* MAKE START NODE */
144     44    2   4              LASTCODE:=-1 /* FORCE ADVANCE */
145                              END;
146                            /* TWO START SINGULARITY */
147     45    2   2   3:        IF (C2 & 7B)<>0 THEN BEGIN /* SEE IF SECOND CODE IS HORIZONTAL */
148     47    2   4              NEWBUCKET(N1); /* NO, SO MAKE TWO NEW BINS */
149     48    2   4              INSERT(N1); /* AND INSERT THEM */
150     49    2   4              ADDFREEMAN(C1); /* DON'T FORGET TO ADD THE CODES */
151     50    2   4              CURRENT:=CURRENT^.NEXT;
152     51    2   4              NEWBUCKET(N2);
153     52    2   4              INSERT(N2);
154     53    2   4              ADDFREEMAN(C2);
155     54    2   4              N1^.STARTNODE:=NEWNODE(2,N1,N2,NIL,NIL); /* MAKE START NODE */
156     55    2   4              N2^.STARTNODE:=N1^.STARTNODE;
157     56    2   4              LASTCODE:=C2 /* C2<>0 SO AN ADVANCE WILL HAPPEN */
158                              END
159     57    2   3            ELSE BEGIN /* INITIATE SPECIAL MODE */
160     58    2   4              STACK[1]:=CHR(C1);
161     59    2   4              STACK[2]:=REVERSER[C2];
162     60    2   4              STKTOP:=2;
163     61    2   4              NOTSPECIAL:=FALSE;
164     62    2   4              LASTCODE:=0 /* FORCE NO ADVANCE */
165                              END;
166                            /* TWO END SINGULARITY */
167     63    2   2   4:        IF NOTSPECIAL THEN BEGIN /* NORMAL MODE */
168     65    2   4              CURRENT^.ENDNODE:=NEWNODE(2,CURRENT,CURRENT^.NEXT,NIL,NIL); /* MAKE END NODE */
169     66    2   4              CURRENT^.NEXT^.ENDNODE:=CURRENT^.ENDNODE;
170     67    2   4              LINEIFY(CURRENT); /* LINE FIND, DELETE, ADVANCE CURRENT */
171     68    2   4              LINEIFY(CURRENT); /* DO IT AGAIN */
172     69    2   4              LASTCODE:=0 /* NO ADVANCE */
173                              END
174     70    2   3            ELSE BEGIN /* UNWIND STACK AND APPEND */
175     71    2   4              UNWIND;
176     72    2   4              L1:=CURRENT; /* CURRENT IS NEWLY UNWOUND BIN */
177     73    2   4              L2:=CURRENT^.NEXT;
178     74    2   4              L2^.LASTBUF^.NEXT:=L1^.FIRSTBUF; /* APPEND CHAIN CODE LIST */
179     75    2   4              L1^.FIRSTBUF^.LAST:=L2^.LASTBUF;
180     76    2   4              L2^.LASTBUF:=L1^.LASTBUF;
181     77    2   4              COMPACTIFY(L2); /* SQUEEZE IT DOWN */
182     78    2   4              DELETE(L1); /* TRASH UNWOUND BIN */
183     79    2   4              LASTCODE:=-1 /* FORCE AN ADVANCE */
184                              END;
185                            /* TWO ENDS, ONE START SINGULARITY */
186     80    2   2   5:        BEGIN
187     81    2   3              NEWBUCKET(N1); /* MAKE THE NEW BIN */
188     82    2   3              IF NOTSPECIAL THEN BEGIN /* NORMAL MODE */
189     84    2   5                N1^.STARTNODE:=NEWNODE(3,N1,CURRENT,CURRENT^.NEXT,NIL); /* MAKE 3 NODE */
190     85    2   5                CURRENT^.ENDNODE:=N1^.STARTNODE;
191     86    2   5                CURRENT^.NEXT^.ENDNODE:=N1^.STARTNODE;
192     87    2   5                LINEIFY(CURRENT); /* TAKE CARE OF THE TWO ENDS */
193     88    2   5                LINEIFY(CURRENT);
194     89    2   5                END
195     90    2   4              ELSE BEGIN /* TERMINATE SPECIAL MODE */
196     91    2   5                UNWIND;
197     92    2   5                L1:=CURRENT; /* GET ADDR OF NEWLY UNWOUND BIN */
198     93    2   5                CURRENT:=CURRENT^.NEXT; /* ADVANCE TO BIN TO DELETE */
199     94    2   5                NP:=NEWNODE(3,L1,CURRENT,N1,NIL); /* MAKE NODE FOR THE INTERSECTION */
200     95    2   5                N1^.STARTNODE:=NP;
201     96    2   5                L1^.STARTNODE:=NP;
```

```
202   97   2   3              CURRENT^.ENDNODE:=NP;
203   98   2   3              LINEIFY(CURRENT) /* EMIT THE ENDING BIN */
204                          END;
205   99   2   3          INSERT(N1); /* INSERT THE STARTING BIN */
206  100   2   3          ADDFREEMAN(C1) /* AND ADD THE FREMAN CODE */
207                       END;
208                   /* TWO START; ONE END SINGULARITY */
209  101   2   2   6:  BEGIN
210  102   2   3          NEWBUCKET(N1); /* MAKE TWO NEW BINS */
211  103   2   3          NEWBUCKET(N2);
212  104   2   3          IF NOTSPECIAL THEN BEGIN /* NORMAL MODE */
213  106   2   5              N1^.STARTNODE:=NEWNODE(3,N1,N2,CURRENT,NIL); /* MAKE A 3 NODE */
214  107   2   5              N2^.STARTNODE:=N1^.STARTNODE;
215  108   2   5              CURRENT^.ENDNODE:=N1^.STARTNODE;
216  109   2   5              LINEIFY(CURRENT) /* PROCESS ENDING BIN */
217                          END
218  110   2   4          ELSE BEGIN /* MAKE A "3" START NODE */
219  111   2   5              UNWIND;
220  112   2   5              NP:=NEWNODE(3,CURRENT,N1,N2,NIL); /* MAKE NODE */
221  113   2   5              CURRENT^.STARTNODE.=NP;
222  114   2   5.             N1^.STARTNODE:=NP;
223  115   2   5              N2^.STARTNODE:=NP;
224  116   2   5              CURRENT:=CURRENT^.NEXT /* INSERT NEW BINS AFTER UNWOUND BIN */
225                          END;
226  117   2   3          INSERT(N1); /* INSERT FIRST BIN. ADD CODE TO IT */
227  118   2   3          ADDFREEMAN(C1);
228  119   2   3          CURRENT:=CURRENT^.NEXT; /* INSERT SECOND AFTER FIRST */
229  120   2   3          INSERT(N2);
230  121   2   3          ADDFREEMAN(C2);
231  122   2   3          LASTCODE:=C2 /* USE SECOND CODE TO CHECK ADVANCE */
232                       END;
233                  /* TWO START; TWO END SINGULARITY */
234  123   2   2   7:  BEGIN
235  124   2   3          NEWBUCKET(N1); /* MAKE 2 NEW BINS */
236  125   2   3          NEWBUCKET(N2);
237  126   2   3          IF NOTSPECIAL THEN BEGIN /* NORMAL MODE */
238  128   2   5              N1^.STARTNODE:=NEWNODE(4,CURRENT^.NEXT,CURRENT,N1,N2); /* MAKE A 4 NODE */
239  129   2   5              N2^.STARTNODE:=N1^.STARTNODE;
240  130   2   5              CURRENT^.ENDNODE:=N1^.STARTNODE;
241  131   2   5              CURRENT^.NEXT^.ENDNODE:=N1^.STARTNODE;
242  132   2   5              IF ROMDEX=375 THEN BEGIN /* FUDGE TO MAKE FILL WORK BY PAIRING EDGES */
243  134   2   7                  L1:=N1^.STARTNODE;
244  135   2   7                  L2:=L1^.LINES[1].LADDR;
245  136   2   7                  L1^.LINES[1].LADDR:=L1^.LINES[4].LADDR;
246  137   2   7                  L1^.LINES[4].LADDR:=L2
247                              END.
248  138   2   5              LINEIFY(CURRENT); /* PROCESS THE ENDING BINS */
249  139   2   5              LINEIFY(CURRENT)
250                          END
251  140   2   4          ELSE BEGIN /* TERMINATE SPECIAL MODE */
252  141   2   5              UNWIND; /* UNWIND THE CHAIN CODE STACK */
253  142   2   5              L2:=CURRENT; /* GET ADDR OF THAT NEW BIN */
254  143   2   5              CURRENT:=CURRENT^.NEXT; /* GET ADDR OF BIN THAT IS ENDING */
255  144   2   5              NP:=NEWNODE(4,CURRENT,L2,N1,N2); /* MAKE A 4 NODE FOR THE INTERSECTION */
256  145   2   5              L2^.STARTNODE:=NP;
257  146   2   5              N1^.STARTNODE:=NP;
258  147   2   5              N2^.STARTNODE:=NP;
259  148   2   5              CURRENT^.ENDNODE:=NP;
260  149   2   5              IF ROMDEX=375 THEN BEGIN /* SAME DELICIOUS FUDGE */
261  151   2   7                  L1:=N1^.STARTNODE;
262  152   2   7                  L2:=L1^.LINES[2].LADDR;
263  153   2   7                  L1^.LINES[2].LADDR:=L1^.LINES[4].LADDR;
264  154   2   7                  L1^.LINES[4].LADDR:=L2
265                              END.
266  155   2   5              LINEIFY(CURRENT) /* PROCESS THE BIN THAT ENDS */
267                          END.
268  156   2   3          INSERT(N1); /* INSERT NEW BINS, ADD FREEMAN CODES TO THEM */
269  157   2   3          ADDFREEMAN(C1);
270  158   2   3          CURRENT:=CURRENT^.NEXT;
271  159   2   3          INSERT(N2);
272  160   2   3          ADDFREEMAN(C2);
273  161   2   3          LASTCODE:=C2 /* ADVANCE ON THE STATE OF C2 */
274                       END
275                  END.
276  162   2   1   IF (LASTCODE & 781)<>0 THEN CURRENT:=CURRENT^.NEXT /* ADVANCE CURRENT? */
277                  END;
278              BEGIN
```

Errors detected: 0
Free memory: 11306 words

FREMAN                OMSI Pascal V1.2C RT11                  Site 014-1  Page 1
Tektronix, Inc., Tek Labs, Building 50, Beaverton OR 97077

Line  Stat Level  Nest  Source Statement

```
 1                        PROGRAM FREMAN;
 2                        /*
 3                            FREMAN IS THE MAIN SUPERVISOR OF THE
 4                            TEKPCB DIGITIZING SYSTEM.
 5
 6                            ITS FUNCTIONS:
 7                                COMMAND INTERPRETER
 8                                STATE CONTROL
 9                                FREMAN CODE DE-QUEING
10                        */
11
12                        TYPE RAST=ARRAY[0..511] OF BOOLEAN;
13                             FILERAST=ARRAY[0..31] OF INTEGER;
14                             ALFA=ARRAY[1..14] OF CHAR;
15                             XYPAIR=RECORD
16                                 PX: INTEGER;
17                                 PY: INTEGER
18                             END;
19                        /*
20                            BLOCK IS THE MAIN DESCRIPTOR OF THE INTERNAL DATA
21                            STRUCTURES. IT HAS ONE OF THREE PURPOSES:
22                                DEFINITION OF A FREMAN BIN
23                                DEFINITION OF A NODE
24                                STORAGE FOR FREMAN CHAIN CODES
25                        */
```

```
        BLOCK=RECORD
            NEXT: ^BLOCK;
            CASE INTEGER OF
        1:      (LAST: ^BLOCK;   /* FREMAN BIN DESCRIPTOR */
                 BROTHER: ^BLOCK;
                 ID: INTEGER;
                 XSTART: INTEGER;
                 YSTART: INTEGER;
                 STARTNODE: ^BLOCK;
                 ENDNODE: ^BLOCK;
                 FIRSTBUF: ^BLOCK;
                 LASTBUF: ^BLOCK;
                 COMPSTART: ^BLOCK;
                 EDGEFLAG: INTEGER);
        2:      (NODEID: INTEGER;    /* NODE DESCRIPTOR */
                 NODEUSED: INTEGER;
                 PENDING: INTEGER;
                 UPDOWN: INTEGER;
                 LINES: ARRAY[1..4] OF RECORD
                     LADDR: ^BLOCK;
                     NID: INTEGER
                     END);
        3:      (LASTCODES: ^BLOCK;  /* FREMAN CHAIN CODE BUFFER */
                 NUMUSED: INTEGER;
                 CODES: ARRAY[0..17] OF CHAR)
                 END.
        BLPTR=^BLOCK;

VAR ROMDATUM, I, J, K, XPOS, YPOS, TX, TY, ERROR, IMXPOS, STKTOP, B, C, S, BUCKETID  INTEGER;
    ONAME, INAME: ALFA;
    ENDX, ENDY: INTEGER;
    YESNO: CHAR;
    NOTSPECIAL, FREEOUTPUT, LINEOUTPUT, STATISTICS: BOOLEAN;
    STACK: ARRAY[1..1024] OF CHAR;
/*
    THE FOLLOWING DATA STRUCTURES DEFINE THE ACTIONS TO BE
    TAKE ON THE RECEPTION OF A GIVEN 3 X 3 WINDOW

FREROM IS A ARRAY WHERE THE INDEX IS THE WINDOW NUMBER
        IT USES ONLY THE LOW ORDER 8 BITS OF EACH INTEGER
        IN THE FOLLOWING FIELDS:
            BIT 7: ON IF THE FIRST FREMAN CODE FROM THE WINDOW IS AN EDGE
            BIT 6: ON IF THE SECOND FREMAN CODE IS AN EDGE
            BITS 5-3: THE SINGULARITY TYPE (0-7)
                0 CONTINUATION WINDOW
                1 ONE START WINDOW
                2 ONE END WINDOW
                3 TWO START WINDOW
                4 TWO END WINDOW
                5 ONE START; TWO END WINDOW
                6 TWO START; ONE END WINDOW
                7 TWO START; TWO END WINDOW
            BITS 2-0: THE NUMBER(S) OF THE FREMAN CODES
            LEAVING THE WINDOW. THEY ARE ENCODED AS FOLLOWS.
                0 NO CHAIN CODE; USED ONLY FOR WINDOW 256
                1 CODE #1=0
                2 CODE #1=5
                3 CODE #1=6
                4 CODE #1=7
                5 CODE #1=0; CODE #2=5
                6 CODE #1=0; CODE #2=6
                7 CODE #1=5; CODE #2=7
        THE COMPRESSION OF THIS DATA INTO 8 BITS WAS DONE FOR
        HISTORICAL REASONS; IT WAS THOUGHT THAT THIS DATA WOULD BE
        PUT INTO ROM IN THE ACTUAL APCS HARDWARE.

DECODER IS AN ARRAY WHICH CONTAINS THE TRUE FREMAN CODES
        GIVEN THE FIRST 2 AND LAST 3 BITS OF THE FREROM ENTRY. THE
        FREMAN CODE WILL HAVE 8 ADDED TO IT IF THAT FREMAN CODE
        IS ON AN EDGE RATHER THAN ON A LINE. THAT BIT, BIT 3, IS
        STRIPPED IN THE ROUTINE ADDFREEMAN WHEN IT USED TO SET THE
        FREMAN BIN EDGEFLAG.

FREES IS AN ARRAY WHICH IS INDEXED BY A FREMAN CODE AND OUTPUTS
        THE TRUE DX AND DY WHICH ARE CAUSED BY THAT FREMAN CODE.

COMPRESSOR TAKES TWO FREMAN CODES AND OUTPUTS THE DIAGONAL ANALOG
        OF THOSE CODES IF POSSIBLE; OR ITS OUTPUTS 0.

REVERSER TAKES AFREMAN CODE AND RETURNS THE
        OPPOSITE POINTING FREMAN CODE.

SORTABLE TAKES A SMALL DX AND DY DISTANCE AND CONTAINS
        THE EXACT DISTANCE, DEFINED BY PYTHAGORAS, SCALED UP BY A FACTOR
        OF 1000. IT IS USED BY THE LINE FINDING ROUTINE
*/

FREROM: ARRAY[256..511] OF INTEGER.
    LEFT, RIGHT, CURRENT, TP: BLPTR.
    DECODER: ARRAY[0..31] OF XYPAIR.
    FREES: ARRAY[0..7] OF XYPAIR.
    COMPRESSOR: ARRAY[0..7, 0..7] OF INTEGER.
    REVERSER: ARRAY[0..15] OF CHAR;
    SORTABLE: ARRAY[0..7, 0..7] OF INTEGER;

OPPERROR, NEXTNODEID: INTEGER;
    CYBERLINK, ALPHAMODE, FILEOUT, NODEOUTPUT, AQUIRE  BOOLEAN;

FREELIST: BLPTR; /* PTR TO UNUSED BLOCK LIST */

FCREG ORIGIN 170010B: INTEGER; /* 3X3 WINDOW OUTPUT REGISTER */
    XPOSREG ORIGIN 170012B: INTEGER; /* X POSITION REGISTER FOR THE WINDOW */
    RAMSWITCH ORIGIN 170014B: INTEGER; /* REGISTER FOR SELECTING THE RAM BANKS */
    RAMS ORIGIN 160000B: ARRAY[0..511] OF INTEGER. /* THE WINDOW PROCESSOR RAMS */
/*
        THERE ARE 16 SEQUENTIAL STAGES OF WINDOW PROCESSOR WHICH ACTUALLY HAVE 1024
        BITS OF RAM EACH. THE RAMSWITCH SELECTS WHICH HALF OF THIS RAM WILL
        BE ACCESSED BY THE POSSIBLE 512 WINDOWS  IN EACH STAGE THE LOWER HALF
        OF THE RAM IS AN IDENTITY FUNCTION WHICH PERFORMS NO TRANSFORMATIONS
        THE UPPER HALF PERFORMS VARIOUS FUNCTIONS. THEY ARE:
```

```
136                         STAGE 1: FULL GROW
137                         STAGE 2: SEMI-GROW
138                         STAGE 3: QUARTER GROW
139                         STAGES 4-15: THINNING
140                         STAGE 16: INTERUPT ENABLE
141                   THE SIXTEENTH STAGE TELLS THE HARDWARE WHICH WINDOWS TO NOTIFY THE
142                   SOFTWARE. THIS STAGE IS BASICALLY 256 NO'S FOLLOWED BY 256 YES'S.
143             */
144             STATUS ORIGIN 170000B:INTEGER; /* STATUS REGISTER FOR APCS HARDWARE */
145             /*
146                   STATUS BITS:
147                         100000 FREEMAN CHAIN CODE READY FLAG
148                         040000 NEW LINE READY FLAG
149                         020000 UNUSED
150                         010000 TEST DATA NEEDED FLAG
151                         004000 UNUSED
152                         002000 CCD CARRIAGE DETECT (USED FOR KNOWING REWIND COMPLETE)
153                         001000 REAL TIME CLOCK FLAG
154                         000400 CCD FULL FLAG
155                         000200 UNUSED. BUT CAN BE WRITTEN BY SOFTWARE
156                         000100 LIGHT SWITCH. 1=ON
157                         000040 TEST MODE ENABLE
158                         000020 TEST MODE INTERUPT ENABLE
159                         000010 NEW LINE INTERUPT ENABLE
160                         000004 FREEMAN CHAIN CODE READY INTERUPT ENABLE
161                         000002 REAL TIME CLOCK INTERUPT ENABLE
162                         000001 CCD FULL INTERUPT ENABLE
163             */
164             MOTORREADY ORIGIN 170006B:INTEGER; /* FLAG REGISTER TO TELL HARDWARE TO AQUIRE DATA */
165             CIRCBUF ORIGIN 154000B:ARRAY[0..511] OF XYPAIR; /* FREMAN CODE AND XPOS QUE */
166             CBIN ORIGIN 270B:INTEGER; /* INPUT POSITION */
167             CBOUT ORIGIN 272B:INTEGER; /* OUTPUT POSITION */
168             CBLEN ORIGIN 274B INTEGER; /* NUMBER OF CODES IN THE QUE */
169             CBBAIP ORIGIN 276B:INTEGER; /* UNUSED COUNTER FOR COUNTING SOFTWARE WAITS */
170
171             RAMCHANGE,STOPPING,TESTING,IMAGEMODE,DOTTING,BARSING,INPUTGIVEN:BOOLEAN,
172             LASTXPOS,LASTGRX,LASTLOY,LASTHIV,LASTHIX,INTEGER;
173             SINGCASES:ARRAY[0..7] OF INTEGER;
174             XCEN,YCEN,XSCALE,YSCALE:REAL;
175             BLOCKSLEFT,MAXBLOCKS:INTEGER;
176             SCALED:BOOLEAN;
177             WINDOWWIDTH,MAXBEND:INTEGER;
178
179      /**C
180             .GLOBL  $START
181             JMP     $START      ;FOR LSI-11 ODT HARD RESTARTS
182      */
183
184      PROCEDURE MTRSET; EXTERNAL; /* REWINDS THE CCD CARRIAGE */
185      PROCEDURE PAGE; EXTERNAL; /* CLEAR 4014 SCREEN */
186      PROCEDURE INIT; EXTERNAL; /* READ DATA STRUCTURES FROM HOST */
187      PROCEDURE MOVEABS(X,Y:INTEGER); EXTERNAL; /* GRAPHICS SUPPORT */
188      PROCEDURE DRAWABS(X,Y:INTEGER); EXTERNAL;
189      PROCEDURE ANMODE; EXTERNAL;
190      PROCEDURE CURSOR(VAR C,X,Y:INTEGER); EXTERNAL; /* GRAPHICAL INPUT */
191      PROCEDURE SINGULARITY(ROMDEX,ROMDATA,C1,C2:INTEGER); EXTERNAL; /* THE SINGULARITY HANDLER */
192      FUNCTION NEWNODE(HOWMANY:INTEGER;L1,L2,L3,L4:BLPTR):BLPTR; EXTERNAL; /* MAKES A NODE */
193      PROCEDURE FLIP; EXTERNAL; /* MAKES SUBSEQUENT I/O GOTO OTHER SERIAL PORT */
194                                /* THE INITIAL AND USUAL STATE IS TO TALK TO THE TERMINAL */
195      PROCEDURE FLUSH; EXTERNAL; /* FLUSH OUT THE OUTPUT BUFFERS */
196      PROCEDURE STOP; EXTERNAL; /* COMMAND HOST THAT WE ARE DONE */
197      PROCEDURE ENDNODE; EXTERNAL; /* COMMAND HOST THAT IMAGE IS FINISHED */
198      PROCEDURE MORINFO; EXTERNAL; /* GET FILE NAME FOR NODE FILE ON HOST */
199      PROCEDURE TSTSET; EXTERNAL; /* SET UP TEST MODE FOR HARDWARE */
200      PROCEDURE LINEIFY(BINPTR:BLPTR); EXTERNAL; /* THE LINE FINDER */
201      PROCEDURE CLRSFT; EXTERNAL; /* SET UP ZERO FILL FOR WINDOW PROCESSOR */
202      PROCEDURE MEMFUL; EXTERNAL; /* RECLAIMS MEMORY WHEN NONE LEFT */
203
204      BEGIN
205             STATUS:=3; /* CCD FULL AND REAL TIME CLOCK INTERUPTS ON */
206             CYBERLINK:=FALSE;
207             INIT;
208      /*
209             COMMAND LINE INTERPRETER SECTION
210      */
211             WRITELN('SPECIFY OPTIONS ON ONE LINE, OPTIONS: LINES,NODES');
212             WRITELN('FREEMANS,QUIT,RAMSET,TEST,IMAGE,MAGNIFY,SAVE');
213             WHILE TRUE DO
214             BEGIN
215                   CBIN:=0;
216                   CBOUT:=0;
217                   CBLEN:=0;
218                   NOTSPECIAL:=TRUE;
219                   LEFT:=NIL; /* FREMAN BIN POINTER INITIALIZATION */
220                   RIGHT:=NIL;
221                   CURRENT:=NIL;
222                   INPUTGIVEN:=FALSE;
223                   WHILE NOT INPUTGIVEN DO
224                   BEGIN
225                         SCALED:=FALSE, /* CLEAR VARIOUS COMMAND FLAGS */
226                         LINEOUTPUT:=FALSE;
227                         NODEOUTPUT:=FALSE;
228                         RAMCHANGE:=FALSE;
229                         STOPPING:=FALSE;
230                         TESTING:=FALSE;
231                         IMAGEMODE:=FALSE;
232                         FREEOUTPUT:=FALSE;
233                         AQUIRE:=FALSE;
234                         ALPHAMODE:=FALSE;
235                         WHILE NOT EOLN DO
236                         BEGIN
237                               READ(INAME); /* READ COMMAND, ONLY NEED FIRST CHARACTER */
238                               IF INAME[1]='A' THEN ALPHAMODE:=TRUE.
239                               IF INAME[1]='L' THEN LINEOUTPUT:=TRUE.
240                               IF INAME[1]='N' THEN NODEOUTPUT:=TRUE.
241                               IF INAME[1]='I' THEN IMAGEMODE:=TRUE.
242                               IF INAME[1]='S' THEN AQUIRE:=TRUE.
243                               IF INAME[1]='R' THEN RAMCHANGE:=TRUE.
244                               IF INAME[1]='Q' THEN STOPPING:=TRUE.
245                               IF INAME[1]='F' THEN FREEOUTPUT:=TRUE.
```

```
246   47   1   7           IF INAME[1]='T' THEN TESTING:=TRUE.
247   49   1   7           IF INAME[1]='M' THEN SCALED:=TRUE.
248   51   1   7           INPUTGIVEN:=ALPHAMODE ! LINEOUTPUT ! NODEOUTPUT ! FREEOUTPUT ! IMAGEMODE ! STOPPING ! TE
249   52   1   7           END;
250   53   1   5       READLN;
251   54   1   5       IF RAMCHANGE THEN BEGIN /* SET UP WINDOW PROC OPTIONS */
252   56   1   7           S:=0;
253   57   1   7           WRITE('WHICH TYPE OF GROW? (FULL,SEMI,QUARTER,NONE): ');
254   58   1   7           WHILE NOT EOLN DO
255   59   1   8           BEGIN
256   60   1   9               READ(INAME);
257   61   1   9               IF INAME[1]='F' THEN S:=S ! 1000000;
258   63   1   9               IF INAME[1]='S' THEN S:=S ! 400000B;
259   65   1   9               IF INAME[1]='Q' THEN S:=S ! 200000B
260                            END;
261   67   1   7           READLN;
262   68   1   7           I:=100000B;
263   69   1   7           WRITE('NUMBER OF THIN PASSES: ');
264   70   1   7           READLN(J);
265   71   1   7           IF J>12 THEN J:=12;
266   73   1   7           FOR K:=1 TO J DO
267   74   1   8           BEGIN
268   75   1   9               S:=S ! I;
269   76   1   9               I:=I DIV 2
270                            END;
271   77   1   7           WRITE('SHOW BLACK AREAS? (Y OR N) ');
272   78   1   7           READLN(YESNO);
273   79   1   7           IF YESNO='Y' THEN S:=S ! 1;
274   81   1   7           RAMSWITCH:=S
275                        END;
276   82   1   5       IF NOT INPUTGIVEN THEN BEGIN
277   84   1   7           WRITELN('SPECIFY OPTIONS ON ONE LINE. OPTIONS  LINES,NODES').
278   85   1   7           WRITELN('FREEMANS,QUIT,RAMSET,TEST,IMAGE,MAGNIFY,SAVE');
279   86   1   7           END
280                        END;
281
282   87   1   3   IF STOPPING THEN EXIT; /* TIME TO GO HOME */
283   89   1   3   IF AQUIRE THEN BEGIN /* SEND ALL WINDOW NUMBERS TO THE HOST */
284   91   1   5       WRITE('NAME OF BINARY IMAGE FILE: ');
285   92   1   5       READLN(INAME);
286   93   1   5       FLIP; /* TALK TO THE HOST */
287   94   1   5       WRITELN('AQUIRE          ');
288   95   1   5       WRITELN(INAME);
289   96   1   5       READLN(INAME); /* FOR VERIFICATION */
290   97   1   5       FLIP; /* NOW BACK TO THE TERMINAL */
291   98   1   5       WRITELN(INAME)
292                    END
293   99   1   4   ELSE IF LINEOUTPUT ! NODEOUTPUT THEN BEGIN /* EMITTING LINES OR NODES? */
294  101   1   6       IF NODEOUTPUT THEN MORINFO; /* GET FILE NAME, ETC. */
295  103   1   6       WRITE('LINE ERROR FACTOR: ');
296  104   1   6       READLN(ERROR);
297  105   1   6       WINDOWWIDTH:=3
298                    END;
299  106   1   3   IF SCALED THEN BEGIN /* SET UP SCALING PARAMETERS */
300  108   1   5       WRITELN('SELECT THE WINDOW ');
301  109   1   5       CURSOR(K,XPOS,YPOS);
302  110   1   5       FOR K:=1 TO 10000 DO K:=K;
303  112   1   5       CURSOR(K,I,J);
304  113   1   5       SCALED:=FALSE;
305  114   1   5       MOVEABS(I,J);
306  115   1   5       DRAWABS(XPOS,J);
307  116   1   5       DRAWABS(XPOS,YPOS);
308  117   1   5       DRAWABS(I,YPOS);
309  118   1   5       DRAWABS(I,J);
310  119   1   5       SCALED:=TRUE;
311  120   1   5       XCEN:=(XPOS+I) DIV 2;
312  121   1   5       YCEN:=(YPOS+J) DIV 2;
313  122   1   5       XSCALE:=1024 DIV ABS(XPOS-I);
314  123   1   5       YSCALE:=1400 DIV ABS(YPOS-J);
315  124   1   5       END;
316  125   1   3   YPOS:=0;
317  126   1   3   BUCKETID:=0;
318  127   1   3   NEXTNODEID:=0;
319  128   1   3   MTRSET; /* REWIND */
320  129   1   3   CLRSFT; /* BEGIN FLUSHING SHIFT REGISTERS */
321  130   1   3   MOTORREADY:=0; /* NOTIFY HARDWARE ALL IS READY */
322  131   1   3   WHILE YPOS<30 DO /* POLL HARDWARE UNTIL 30 RASTERS ARE CLEARED */
323  132   1   4   BEGIN
324  133   1   5       I:=FCREG;
325  134   1   5       IF (I & 400000B)<>0 THEN YPOS:=YPOS+1 /* NEW RASTER? */
326                    END;
327  136   1   3   MTRSET; /* REWIND AGAIN */
328  137   1   3   IF TESTING THEN BEGIN /* SET UP IMAGE DOWNLOAD */
329  139   1   5       WRITE('NAME OF BINARY IMAGE FILE: ');
330  140   1   5       READLN(INAME);
331  141   1   5       FLIP;
332  142   1   5       WRITELN('TESTING          ');
333  143   1   5       WRITELN(INAME);
334  144   1   5       FLIP;
335  145   1   5       STATUS:=30 /* NO LIGHTS */
336                    END
337  146   1   4   ELSE STATUS:=103B; /* TURN ON LIGHTS */
338  147   1   3   PAGE; /* SET UP GRAPHICS */
339  148   1   3   LASTLOY:=0;
340  149   1   3   LASTHIY:=0;
341  150   1   3   LASTHIX:=0;
342  151   1   3   MOVEABS(0,0);
343  152   1   3   DRAWABS(0,1400);
344  153   1   3   DRAWABS(1023,1400);
345  154   1   3   DRAWABS(1023,0);
346  155   1   3   DRAWABS(0,0);
347  156   1   3   STATUS:=STATUS ! 14B; /* TURN ON NEWLINE, FREMAN CODE INTERUPTS ON */
348  157   1   3   YPOS:=-14; /* IGNORE FIRST RASTERS, ALL ZEROES */
349  158   1   3   IF TESTING THEN TSTSET; /* TELL HARDWARE WE'RE TESTING */
350  160   1   3   MOTORREADY:=0; /* BEGIN DIGITIZING */
351  161   1   3   LASTXPOS:=-1;
352  162   1   3   WHILE YPOS<=1400 DO /* DIGITIZE 1400 RASTERS */
353  163   1   4   BEGIN
354  164   1   5       I:=0;
355  165   1   5       WHILE (I=0) & (YPOS<=1400) DO
```

```
356  166   1   6         BEGIN
357  167   1   7           WHILE CBLEN<=0 DO I:=1;  /* WAIT TILL SOMETHING IN QUE */
358  169   1   7           I:=CIRCBUF[CBOUT].PX;   /* GET WINDOW NUMBER */
359  170   1   7           XPOS:=CIRCBUF[CBOUT].PY;
360  171   1   7           CBOUT:=(CBOUT+1) & 511;
361  172   1   7           CBLEN:=CBLEN-1;
362  173   1   7           IF CBLEN=128 THEN STATUS:=STATUS ! 148;  /* RENABLE INTERUPTS? */
363  175   1   7           IF (I & 400008)<>0 THEN BEGIN  /* END OF RASTER? */
364  177   1   9             IF CURRENT<>NIL THEN WRITE(CHR(7):1,CHR(31):1,'TOO FEW ':8);  /* ERROR */
365  179   1   9             IF IMAGEMODE & (LASTXPOS<>-1) THEN BEGIN
366  181   1  11                MOVEABS(IMXPOS,YPOS);
367  182   1  11                DRAWABS(LASTXPOS,YPOS)
368                            END;
369  183   1   9             LASTXPOS:=-1;
370  184   1   9             YPOS:=YPOS+1;
371  185   1   9             IF AQUIRE THEN BEGIN
372  187   1  11                FLIP;
373  188   1  11                READLN(INAME);
374  189   1  11                WRITELN(' 1024');  /* WRITE END OF RASTER DELIMITER */
375  190   1  11                FLIP
376                            END;
377  191   1   9             CURRENT:=LEFT /* RESET CHUTE */
378                          END;
379  192   1   7           IF I<0 THEN I:=(I & 37700)+256  /* MSB SET FOR WINDOW. GET NUMBER */
380  194   1   8                ELSE I:=0
381                         END;
382  195   1   5           IF I<>0 THEN BEGIN
383  197   1   7             J:=I;
384  198   1   7             IF XPOS<0 THEN I:=0;  /* STRIP WINDOW FOR BOUNDARY CONDITIONS */
385  200   1   7             IF XPOS=0 THEN I:=I & 7078;
386  202   1   7             IF XPOS>1023 THEN I:=0;
387  204   1   7             IF XPOS=1023 THEN I:=I & 5748;
388  206   1   7             IF IMAGEMODE THEN BEGIN
389  208   1   9               IF LASTXPOS=-1 THEN IMXPOS:=XPOS
390  210   1  10               ELSE IF XPOS<>LASTXPOS+1 THEN BEGIN
391  212   1  12                  MOVEABS(IMXPOS,YPOS);
392  213   1  12                  DRAWABS(LASTXPOS,YPOS);
393  214   1  12                  IMXPOS:=XPOS
394                              END
395                            END;
396  215   1   7             IF AQUIRE & (I<>0) THEN BEGIN
397  217   1   9               FLIP;
398  218   1   9               READLN(INAME);  /* READ PROMPT */
399  219   1   9               WRITELN(XPOS:5);  /* SEND POSITION */
400  220   1   9               FLIP
401                            END;
402  221   1   7             IF ((I<>511) & (I<>0)) THEN BEGIN  /* PROCESS WINDOW? */
403  223   1   9               ROMDATUM:=FREROM[I];  /* GET DESCRIPTOR */
404  224   1   9               C:=(ROMDATUM & 78) ! ((ROMDATUM & 3008) DIV 8);
405  225   1   9               SINGULARITY(I,ROMDATUM,DECODER[C].PX,DECODER[C].PY);  /* ANALYZE */
406  226   1   9               IF BLOCKSLEFT<(STKTOP DIV 16)+32 THEN MEMFUL  /* CHECK HOW MUCH MEM LEFT */
407                            END;
408  228   1   7             LASTXPOS:=XPOS
409                          END
410                         END;
411  229   1   3           STATUS:=3;  /* SHUT DOWN ALL BUT REAL TIME CLOCK AND CCD FULL */
412  230   1   3           CURRENT:=LEFT;  /* RESET CHUTE TO FLUSH ANY REMAINING BINS */
413  231   1   3           WHILE CURRENT<>NIL DO  /* FLUSH OUT */
414  232   1   4             LINEIFY(CURRENT);
415  233   1   3           SCALED:=FALSE;
416  234   1   3           MOVEABS(-87,1400);  /* RESET CURSOR ON 4014 */
417  235   1   3           ANMODE;
418  236   1   3           IF NODEOUTPUT THEN BEGIN  /* TELL HOST WE'RE DONE IF NECESSARY */
419  238   1   5             FLIP;
420  239   1   5             ENDNODE;
421  240   1   5             FLIP;
422  241   1   5             END;
423  242   1   3           IF AQUIRE THEN BEGIN  /* DITTO */
424  244   1   5             FLIP;
425  245   1   5             READLN(INAME);
426  246   1   5             WRITELN('-1');
427  247   1   5             FLIP
428                          END;
429  248   1   3           MTRSET  /* REWIND CARRIAGE */
430                         END;
431  249   1   1         FLIP;
432  250   1   1         STOP;  /* TELL HOST WE'RE ALL DONE */
433  251   1   1         FLUSH  /* FLUSH OUT ALL OUTPUT BUFFERS */
434                       END.

Errors detected:  0
Free memory: 10882 words
```

What is claimed is:

1. A method of encoding pictures, comprising the steps of:

raster scanning a picture;

generating, as the picture is being scanned, a bit map representative of the features of the picture;

regenerating the bit map, as the picture is acquired during the scanning and generating steps, as a bit stream representative of line and edge features of the picture;

temporarily storing, as the bit stream is regenerated, those portions of the bit stream which represent the line and edge features of the picture, said temporary storing step including the steps of converting the bit stream, as it is regenerated, into a plurality of chain-coded line segments; and storing the plurality of chain-coded line segments, as the scanning and regenerating steps continue, in a corresponding plurality of storage elements linked in an order corresponding with the order in which the features of the picture are encountered during the scanning, generating and regenerating steps;

converting each stored line segment to vectorial data;

transmitting the vectorial data to a user device; and continuing the preceding steps until the entire picture is scanned and encoded.

2. The method of claim 1, wherein the first converting step includes the step of generating a chain code for each element of the bit stream, the chain code having a directional component corresponding with the direction of the associated line segment in directions corresponding with the general directions in which the picture is raster scanned.

3. The method of claim 1, which includes the steps of:
allocating each of the plurality of storage elements when the corresponding line segment is first regenerated; and
deallocating each of the plurality of storage elements after the corresponding line segment is converted to vectorial data.

4. The method of claim 1, wherein the first converting step includes the step of delimiting the start and the end of each line segment.

5. The method of claim 4, comprising the steps of:
allocating each of the plurality of storage elements when the start of the corresponding line segment is delimited; and
deallocating each of the plurality of storage elements after the corresponding line segment is converted to vectorial data.

6. The method of claim 4, wherein the storing step includes the step of storing the spatial location of the start of each of the line segments in the corresponding one of the plurality of storage elements.

7. The method of claim 1, wherein the regenerating step includes thinning the features of the bit-map representation of the picture.

8. The method of claim 1, wherein the storing step includes concatenating two or more line segments which together have a spatial orientation transverse to the general direction of scanning of the picture for storage in a single one of the plurality of storage elements.

9. A method of encoding pictures, comprising the steps of:
raster scanning a picture with a detection device;
acquiring, as the picture is being scanned, a representation of successive portions of the picture in the form of a bit map;
regenerating the bit map as the picture is acquired during the scanning step as a bit stream representative of line and edge features of the picture;
encoding the bit stream as it is generated in the previous step as a plurality of chain codes representing discontinuous contours, each contour representing a segment of the regenerated features of the picture, each of the contours including at least one of the chain codes, each of the chain codes having a directional component corresponding with the general directions in which the picture is scanned;
storing each of the chain codes successively in a storage element corresponding with the contour with which the chain code is associated, the storage elements being ordered in the same order in which the contours are intercepted as the picture is scanned;
converting each of the chain-coded contours, as each is completely generated, to a vectorial signal set representing an abstraction of the chain-coded contour; and
transmitting the converted contours to an output device for display, archival storage, or further processing.

10. The method of claim 9 which includes simultaneously with the transmitting step, the step of:
removing from the ordered storage elements each of the storage elements corresponding with a transmitted contour.

11. The method of claim 9, wherein the encoding step includes the steps of:
classifying each element of the regenerated bit stream as at least one of the classes of contour elements including a contour beginning, a contour end, and a contour continuation; and
generating one of said chain codes for each contour beginning and each contour continuation.

12. The method of claim 11, which includes, simultaneously with the transmitting step, the step of:
removing from the ordered storage elements those storage elements corresponding with a converted contour, when the converted contour has been transmitted.

13. Apparatus for automatically converting a document to machine script, comprising:
means for raster scanning said document;
means coupled to said scanning means for generating a series of tessellations of black and white pixels from said scanned document, each of the tessellations including a center pixel and adjacent pixels surrounding the center pixel;
means for regenerating the series of tessellations as a bit stream having a plurality of elements, each element of the bit stream corresponding with a tessellation having a black center pixel, the bit stream being representative of line and edge features of the scanned document, such features including a plurality of discontinuous contours;
means receiving the bit stream for classifying in succession each element of the bit stream as a unique set of contour segments, which set includes at least one of the contour segments representing a contour start, a contour end, and a contour continuation;
means for generating a data item representing the directional orientation of each of the contour start segments and each of the contour continuation segments in directions corresponding with the general directions in which the document is scanned;
means for storing the data items representing each of the plurality of contours, each said storage means being associated with one contour and allocated responsive to said classifying means when a contour start segment associated with said one contour is received, the one contour being stored in the associated storage means as the data items representing the contour continuation segments of the one contour are successively received while the document is being scanned by said raster scanning means, each of the plurality of storage means being ordered in accordance with the relative order of the contours as successively received in the bit stream;
means responsive to said classifying means receiving a contour end segment for converting the stored contour associated with the received contour end segment to a vectorial data set representing an abstraction of the associated stored contour, and including means for deallocating the storage means corresponding with the converted contour; and
means for utilizing the vectorial data set.

14. The apparatus of claim 13, wherein each said storage means includes means for storing a data item representing a starting location on said scanned document of the contour stored therein.

15. A method of encoding pictures, comprising the steps of:
raster scanning a picture;
generating, as the picture is being scanned, a bit map representative of black and white pixels of the scanned picture;

regenerating from the bit map as it is acquired during the scanning step, a bit stream having a plurality of elements representing line and edge features of the picture, the bit stream representing a linear concatenation of successive rasters of the bit-map representation of the picture;

temporarily storing the line and edge features of the picture, said temporary storing step including the steps of decoding each element of the bit stream successively as it is generated, the decoding step including the steps of partitioning the features of the picture into a plurality of linear contours, each of the contours including one or more contour segments, each contour segment having an orientation with respect to the picture being scanned;

classifying each contour segment as one of a class of contour segments including a contour-start segment, a contour-end segment, and a contour-continuation segment; and assigning a chain code to each contour-start segment and each contour-continuation segment of the bit stream element according to its orientation and in the general directions in which the picture is raster scanned;

allocating a storage element for each contour-start segment decoded;

storing in the allocated storage element a data item representing the spatial location of the contour-start segment;

storing the chain code corresponding with the contour-start segment in the allocated storage element;

linking the allocated storage element with other such storage elements in an order corresponding with the order in which the contours are decoded; and storing each chain code representing a contour-continuation segment in the storage element associated with the contour;

converting each of the temporarily stored chain-coded contours to a vectorial signal set which is an abstraction of the chain-coded contour when a contour-end segment associated with the contour is decoded;

transmitting each of the converted contours to a user device;

unlinking and deallocating each of the storage elements associated with the converted contours; and repeating the above steps until the entire picture is scanned and encoded.

16. The method of claim 15, wherein the classifying step includes the steps of:

detecting a combination of contour segments including two contour-start segments together having an orientation transverse to the general direction of scanning of the picture;

temporarily storing in another storage element the detected combination of contour segments, thereby concatenating the transversely oriented contour segments; and copying the contents of the other storage element into one of the allocated storage elements.

17. The method of claim 16, further including after the copying step the step of storing another contour in the one allocated storage element, thereby appending the other contour to the concatenated contour segments.

18. The method of claim 16, wherein the copying step includes the step of appending the concatenated contour segments to another contour previously stored in the one allocated storage element.

* * * * *